(12) United States Patent
Nitsuma

(10) Patent No.: US 8,550,552 B2
(45) Date of Patent: Oct. 8, 2013

(54) VEHICLE SEAT

(75) Inventor: Kenichi Nitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 729 days.

(21) Appl. No.: 12/691,069

(22) Filed: Jan. 21, 2010

(65) Prior Publication Data

US 2010/0187876 A1    Jul. 29, 2010

(30) Foreign Application Priority Data

| Jan. 26, 2009 | (JP) | 2009-014423 |
| Jan. 28, 2009 | (JP) | 2009-017390 |
| Jan. 28, 2009 | (JP) | 2009-017391 |
| Feb. 2, 2009 | (JP) | 2009-021843 |
| Feb. 4, 2009 | (JP) | 2009-024347 |

(51) Int. Cl.
  *B60N 2/42* (2006.01)
(52) U.S. Cl.
  USPC .................. 297/216.14; 297/216.12
(58) Field of Classification Search
  USPC ............. 297/216.13, 284.4, 216.14, 216.12
  See application file for complete search history.

(56) References Cited

U.S. PATENT DOCUMENTS

| 4,564,235 A * | 1/1986 | Hatsutta et al. ............. 297/284.4 |
| 4,896,918 A * | 1/1990 | Hoshihara ................... 297/284.4 |
| 6,769,737 B2 * | 8/2004 | Choi ........................ 297/216.14 |
| 7,731,285 B2 * | 6/2010 | Koike ......................... 297/284.4 |
| 7,997,650 B2 * | 8/2011 | McMillen et al. ......... 297/284.4 |
| 2003/0085600 A1 * | 5/2003 | Mori ........................... 297/284.4 |
| 2006/0232114 A1 * | 10/2006 | Sugiyama et al. ......... 297/284.4 |

FOREIGN PATENT DOCUMENTS

| JP | 61-172515 A | 8/1986 |
| JP | 2000-211412 A | 8/2000 |
| JP | 2000-217660 A | 8/2000 |
| JP | 2000-272395 A | 10/2000 |
| JP | 2001-253282 A | 9/2001 |
| JP | 2003-341402 A | 12/2003 |
| JP | 2005-028956 A | 2/2005 |
| JP | 2006-035965 A | 2/2006 |
| JP | 2007-062522 A | 3/2007 |
| JP | 2007-065522 A | 3/2007 |
| JP | 2008-037267 A | 2/2008 |
| WO | 2009/011388 A1 | 1/2009 |

OTHER PUBLICATIONS

Office Action issued for JP 2009-014423 (Jul. 16, 2013).

(Continued)

*Primary Examiner* — Sarah B McPartlin
(74) *Attorney, Agent, or Firm* — Drinker Biddle & Reath LLP

(57) ABSTRACT

A vehicle seat is provided where an urging element(s) is engaged with a shock reducing member in an optimum state under a normal seating load or in a rear-end collision, a number of parts can be reduced without using a separate member to mount the urging element(s), and at the same time, a high degree of design freedom is created. The seat comprises a seat back frame, a headrest, a pressure receiving member connected to the seat back frame via a connecting member to move independently from the headrest, a rotating member that is disposed on a side part on each side and is connected to the connecting member to rotate independently from the headrest, and a spring mounted to the rotating member and the seat back frame. At least one of mounting parts is formed integrally with the rotating member or the seat back frame.

20 Claims, 45 Drawing Sheets

(56) References Cited

OTHER PUBLICATIONS

Office Action issued for JP 2009-017390 (Jul. 23, 2013).

Office Action issued for JP 2009-017391 (Aug. 6, 2013).
Office Action issued for JP 2009-021843 (Jul. 23, 2013).
Office Action issued for JP 2009-024347 (Jul. 23, 2013).

* cited by examiner

VEHICLE SEAT

CROSS-REFERENCE TO RELATED APPLICATIONS

This application claims the benefit of Japanese Patent Application No. 2009-014423, filed Jan. 26, 2009, Japanese Patent Application No. 2009-017390, filed Jan. 28, 2009, Japanese Patent Application No. 2009-017391, filed Jan. 28, 2009, Japanese Patent Application No. 2009-021843, filed Feb. 2, 2009, and Japanese Patent Application No. 2009-024347, filed Feb. 4, 2009, the entire contents of which are incorporated herein by reference.

BACKGROUND

The present invention relates to a vehicle seat and, more particularly, to a vehicle seat configured so as to reduce a shock at the time of rear-end collision.

Generally, in a so-called rear-end collision, in which the rear part of a vehicle such as an automobile is struck from behind, or collides heavily when running backward, the head of a passenger on a vehicle seat is tilted to the rear suddenly by an inertial force, and the neck of the passenger may get a shock.

Therefore, conventionally, the seat for a vehicle such as an automobile is provided with a headrest, which supports the passenger's head, above a seat back to protect the passenger's head and neck from a shock caused by rear-end collision and to reduce the shock to the neck.

However, if the headrest is merely provided, the shock to the passenger's body cannot be reduced, and also, in some cases, the shock applied to the neck cannot be reduced sufficiently unless a gap between the passenger's head and the headrest is decreased quickly when a rear-end collision occurs.

To solve the above-described problems, there has been disclosed a technique in which at the time of rear-end collision, the headrest is moved to the front by a rearward movement load of the passenger to support the passenger's head and reduce a shock to the neck (for example, refer to Japanese Unexamined Patent Application Publication No. 2003-341402 ("the '402 Publication")).

Also, there has been known a technique in which in a vehicle seat provided with a seat back in which a seat back cushion is supported by a seat back frame, an abutting part of the seat back on which the back part of the passenger abuts in rear-end collision has a spring coefficient smaller than that of other parts and a damping coefficient larger than that of other parts (for example, refer to Japanese Unexamined Patent Application Publication No. 2005-028956 ("the '956 Publication")).

Further, there has been proposed a vehicle seat in which in a seat back having a headrest, a movable frame having a spring body for supporting a cushion material is attached to a fixed frame to which the headrest is mounted in an upper part so that the upper part of the movable frame rotates to the rear around the lower part thereof, and between the fixed frame and the movable frame is provided a spring that carries a usual seating load but permits the movable frame to rotate rearward when an impact load not lower than a predetermined value is applied (refer to Japanese Unexamined Patent Application Publication No. 2000-272395 ("the '395 Publication")).

Also, there has been known a technique in which both of the right and left sides of a headrest mounting rod are attached to a seat back frame via an upper side link for moving the headrest back and forth (refer to Japanese Unexamined Patent Application Publication No. 2007-062522 ("the '522 Publication")).

The technique disclosed in the '402 Publication is a technique in which at the time of rear-end collision, the rearward movement of the passenger's chest (upper torso region) is received by a pressure receiving member, and the headrest is moved to the front in association with the rearward movement of the pressure receiving member. In such a technique, to move the headrest in association with the pressure receiving member, a moving mechanism for the headrest must be provided, so that not only the mechanism is intricate and the cost is high, but also a moving part for moving the headrest must be provided on the seat back frame. Therefore, the rigidity must be prevented from decreasing, and the need for increasing the rigidity than usual arises.

In the technique disclosed in the '956 Publication, by decreasing the spring coefficient of the abutting part of seat back on which the back part ("the chest part" in this publication) of the passenger abuts, the rearward displacement of the upper body is increased, and the relative displacement of the head with respect to the back part is decreased. Also, by increasing the damping coefficient by using a low resilience cushion material, the rebound of the upper body is restrained to decrease the relative speed of the head with respect to the back part. Thereby, a shearing force acting on the neck is decreased.

Unfortunately, the technique in which the spring coefficient is decreased and the technique in which the low resilience cushion material is used have a disadvantage that the sinking of the body to the vehicle rear cannot be increased (that is, the displacement cannot be increased).

Also, the technique disclosed in the '395 Publication has an advantage that a working load for rearward movement of a central support part can be predicted with certainty with only setting an elasticity of the spring with respect to the impact load, the central support part always moves rearward, and the operation is certain.

However, the technique disclosed in this publication has a disadvantage that the movability of the movable frame with respect to the fixed frame near the lower part position is very poor, so that all of the seated body cannot sink to the rear side of vehicle because the fixed frame and the movable frame are fixed to each other by a mounting shaft in the lower part. Also, in this publication, since the movable frame is used, the apparatus increases in size as a whole, and therefore this technique also has a disadvantage that it is difficult to reduce the weight.

Also, the technique disclosed in the '522 Publication is a technique in which for the upper side link, one end (rear-end) of a first link rod constituting a part of the upper side link is attached to a movable-side bracket fixed to both of the right and left ends of the headrest mounting rod by a shaft, the other end of the first link rod is attached rotatably to a fixed-side bracket provided above both of the right and left sides of the seat back frame by a shaft, one end of a second link rod is pivotally mounted to the movable-side bracket below the first link bar by a shaft, the middle part of the second link rod is rotatably attached to the fixed-side bracket by a shaft, and further, a plate body is attached to be movable back and forth via wire springs provided in parallel with each other in the up and down direction. In this technique, the tip end of a mounting end part on both of the right and left sides of the wire spring is positioned in front of the plate body in a plan view, so that a large space in which the cushion material can be installed can be provided between the tip end of the mounting end part and the plate body, and the cushioning performance can be improved.

In the technique disclosed in the '522 Publication, however, in order to make the headrest rotatable in a predetermined range, an inhibiting part for regulating the rotation must be provided on the link rod and the like constituting the upper side link. Thus, a link mechanism is formed by using many members including the upper side link consisting of the plurality of link rods. Therefore, this technique has a disadvantage that not only the number of parts increases, but also the link itself increases in size.

The techniques disclosed in the '402 Publication, the '956 Publication, and the '522 Publication have a problem in that a means for transmitting the impact load to the headrest is needed, and the configuration is intricate. Therefore, a technique has been needed in which the construction is simple, the means for transmitting the impact load to the headrest is unnecessary, the side part of the seat back frame is utilized and the degree of freedom in designing is high, and a shock applied to the passenger at the time of rear-end collision can be reduced effectively.

Also, in the technique in which the pressure receiving member (plate body) is attached to the seat frame with a wire, and the headrest is moved in association with the pressure receiving member, the posture is held by the pressure receiving member, and the headrest is moved by a load created in the pressure receiving member, so that the deformation of a wire serving as a connecting member must be prevented as far as possible. Since the wire is not deformed, the sinking amount is hindered. Therefore, this technique has a disadvantage that it is difficult to increase the displacement, and the coexistence with a normal seating feeling is difficult to achieve.

Therefore, there is conceivable a technique in which by using a shock reducing member such as to be in the optimum state under a usual seating load or in rear-end collision, in the case of a technique for attaching an urging element(s) to the shock reducing member, an engagement part such as an engagement pin is formed on the seat back frame as a separate member by welding or the like, an engagement part such as a pin is formed on the shock reducing member as a separate member by welding or the like, and the end parts of the urging element(s) are locked to these engagement parts formed by welding or the like.

In the technique in which the engagement parts are formed by welding or the like as described above, a disadvantage is considered that in addition to the need for using the engagement part such as the pin, which is a separate member, the process for welding or the like is needed, so that the number of manufacturing processes increases.

In particular, in the case where the urging element(s) is disposed to be located in the rear of a side frame constituting a part of the seat back frame, the seat back conceivably has a disadvantage of interference of the urging element(s) itself. In the case where the urging element(s) is located at a rear position of the side frame, a force such as to always rotate the shock reducing member to the rear acts, so that a disadvantage that the normal seating feeling is bad as the seat back for supporting the back surface is present. Furthermore, if the shock reducing member is disposed in the lower part of the side frame, since other members including electric equipment represented by a motor are installed in the lower part of the side frame, a disadvantage that the arrangement of the shock reducing member interferes with the arrangement of other members is present.

SUMMARY

An object of the present invention is to provide a vehicle seat in which by the use of a shock reducing member and an urging element(s), a mechanism for transmitting a load applied to a pressure receiving member to a headrest is made unnecessary, the increase in size of the mechanism is suppressed, a higher rigidity than is necessary is avoided, the number of parts is reduced, the construction is simplified, the amount of sinking (movement) of the passenger's body to the vehicle rear at the time of rear-end collision can be increased, and a shock applied to a passenger at the time of rear-end collision can be reduced effectively independently from the headrest.

Another object of the present invention is to provide a vehicle seat in which by using a shock reducing member such as to be in the optimum state under a usual seating load or in rear-end collision, in the case where an urging element(s) is mounted to this shock reducing member, the number of parts can be reduced without the use of a separate member to mount the urging element(s), and at the same time, the number of assembling processes can be reduced and the work efficiency can be increased, and a load applied to the passenger's body, neck and the like at the time of rear-end collision can be reduced effectively.

Still another object of the present invention is to provide a vehicle seat in which the shock reducing member and the urging member can be decreased in size, the interference of the urging member with other members is restrained, and the arrangement region of other members is secured, by which a high degree of freedom in designing is achieved.

To achieve the above objects, various embodiments of the present invention provide a vehicle seat including a seat back frame comprising side parts located on both sides and an upper part disposed above; a headrest disposed above the seat back frame; a pressure receiving member connected to the seat back frame via a connecting member that is movable independently from the headrest; a shock reducing member that is disposed at least on one side of the both-side side parts of the seat back frame and is connected to the connecting member that is rotatable around a rotating shaft independently from the headrest; and an urging element(s) disposed by attaching end parts thereof to a mounting part formed in the shock reducing member and a mounting part formed in the seat back frame, wherein at least one of the mounting part formed in the shock reducing member and the mounting part formed in the seat back frame is formed integrally with the shock reducing member or integrally with the side part of the seat back frame.

As described above, the shock reducing member and the urging element(s) are used, and at least one of the mounting part formed in the shock reducing member and the mounting part formed in the seat back frame is formed integrally with the shock reducing member or integrally with the side part of the seat back frame. Therefore, the strength is secured by the highly rigid seat back frame, and the number of parts can be reduced. In particular, since the urging element(s) can be mounted directly, a separate member such as a pin is unnecessary, so that the number of parts can be reduced, and also the arrangement space for other members can be secured, so that a high degree of freedom in designing can be achieved, and at the same time, the number of assembling processes can be reduced, and the work efficiency can be enhanced.

Also, since the shock reducing member is connected to the connecting member and is rotated around the rotating shaft independently from the headrest, a mechanism for transmitting a load applied to the pressure receiving member to the headrest is unnecessary, the increase in size of the mechanism is suppressed, and rigidity than necessary is not needed.

It is preferable that the rotating shaft of the shock reducing member be disposed between the mounting part formed in the seat back frame and the mounting part formed in the shock reducing member. In this way, since the mounting part formed in the seat back frame and the mounting part formed in the shock reducing member holds the rotating shaft of the shock reducing member therebetween, the shock reducing member and the urging element(s) can be made compact.

It is preferable that the seat back frame formed with the mounting part be a side frame; the side frame have a front edge part folded to the inside in a U shape from the end part located on the vehicle front side; and the mounting part be formed in an extension part formed by extending the front edge part to the rear. If the mounting part is formed in the front edge part in this manner, since the front edge part is folded to the inside in a U shape, rigidity is provided. Also, since the mounting part is formed in the extension part formed by extending the front edge part to the rear, the urging element(s) is easy to mount, and does not interfere with other folded front edges of side frame.

It is preferable that the side part include a side frame having a U-shaped cross section in which both end parts of a plate body disposed in the vehicle longitudinal direction are bent to the seat inside direction, and the shock reducing member be disposed in a portion having a U-shaped cross section of the side frame. Thus, since the shock reducing member is disposed in the portion having a U-shaped cross section of the side frame, the shock reducing member and members connected to the shock reducing member are located in the portion having a U-shaped cross section. Therefore, the shock reducing member and the members connected to the shock reducing member can be disposed in the side frame, and can be restrained from projecting to the inside of the seat back frame. In this way, even if the sizes of the shock reducing member and the members connected to the shock reducing member (for example, a tensile coil spring) increase, these elements are kept away from the passenger, and the influence of these elements can be prevented.

Further, if the urging element(s) is always located on the vehicle lower side of the rotating shaft of the shock reducing member during the time from before the operation to after the operation of the shock reducing member, at the time of rear-end collision, the amount of sinking (movement) of the passenger's body to the vehicle rear can be increased while the interference with the urging element(s) is restrained.

It is preferable that the side part be mounted with a pipe member; the side part have an enlarged part enlarged to the vehicle front of the pipe member; and the shock reducing member and the urging element(s) be disposed in the enlarged part. By disposing the enlarged part in this manner, in the case where the urging element(s) elongates like a tensile coil spring, a region corresponding to this elongation can be secured. Therefore, an optimum urging element(s) can be selected, the arrangement region of the urging element(s) and the like increases, and the option of arrangement of the urging element(s) and the connecting member increases, by which the degree of freedom in designing can be secured.

If the shock reducing member has a connecting part for connecting the connecting member, and the mounting part of the urging element(s) formed in the shock reducing member is provided on the vehicle lower side of the connecting part, the interference of the connecting member with the urging element(s) can be restrained, and the urging element(s) can easily be provided at a position at which no influence is exerted on the sinking (rearward movement) of the passenger's body.

It is preferable that the urging element(s) be configured so that one end thereof is locked to a mounting part formed in the seat back frame, the other end thereof is locked to a mounting part formed in the shock reducing member, and a coil part consists of a torsion spring disposed at an outer periphery of the rotating shaft of the shock reducing member. If the urging element(s) is formed by the torsion spring as described above, the urging element(s) is not increased in size, and the urging element(s) can be located to be overlapped on the shock reducing member. Thus, the urging element(s) can be disposed in a compact manner, by which the degree of freedom in designing can be secured, and the amount of sinking (movement) of the passenger's body to the vehicle rear can be secured while the interference of the urging element(s) with the passenger is restrained at the time of rear-end of collision.

It is preferable that the shock reducing member have a raised part raised in the seat inside direction, and the torsion spring be disposed on the seat outside of the inner end of the raised part. By this configuration, the torsion spring can be disposed by effectively utilizing a space on the outside of the portion raised to the seat inside of the shock reducing member. Therefore, the amount of sinking (movement) of the passenger's body to the vehicle rear is secured easily while the interference of the torsion spring with the passenger is avoided.

The torsion spring is preferably disposed between the side part and the shock reducing member. If the torsion spring is disposed by effectively utilizing a space between the side part and the shock reducing member, the interference of the torsion spring with the passenger can be prevented with certainty, and the amount of sinking (movement) of the passenger's body to the vehicle rear is secured easily.

The configuration can be made such that each of the seat back frame and the shock reducing member is formed with a plurality of mounting parts for mounting a plurality of urging elements, and the urging elements are disposed in plural numbers. By disposing the urging elements in plural numbers, the individual urging elements can be decreased in size, and accordingly the shock reducing member can also be decreased in size. Therefore, the degree of freedom of mounting position of the urging elements is secured, and at the same time, the shock reducing member and the urging elements can be made such as not to give a sense of discomfort to the passenger.

It is preferable that the plurality of urging elements be disposed at positions at which the urging elements do not always overlap on a member constituting the rotating shaft in the rotating range of the shock reducing member. Since the configuration is made such that the urging elements do not always overlap on the member constituting the rotating shaft in the rotating range of the shock reducing member, the urging elements that comes close to the rotating shaft at the time of rotating of the shock reducing member can be disposed close to the shock reducing member, so that the configuration can be made such that the urging elements is kept away from the passenger side.

It is preferable that at least one of the plurality of urging elements be disposed at a position at which the urging element overlaps on a member constituting the rotating shaft when the shock reducing member rotates, and the urging element that overlaps on the member constituting the rotating shaft have a width narrower than the widths of other urging elements.

Herein, the width means a dimension in the transverse direction (perpendicular direction) with respect to the lengthwise direction of the urging element. If the configuration is made such that the urging element that overlaps on the member constituting the rotating shaft has a width narrower than the widths of other urging elements, when the shock reducing member rotates, even if the member constituting the rotating shaft has a convex portion, this member does not become a hindrance at the time of overlapping because of its narrow width, so that the configuration can be made such that the urging elements is kept away from the passenger side.

It is preferable that the shock reducing member have a connecting part for connecting the connecting member, and the rotating shaft of the shock reducing member be formed at a lower position of at least one of the connecting part formed in the shock reducing member and the mounting part formed in the shock reducing member. By this configuration, the whole of the shock reducing member can be formed at a position separate from the passenger, so that the shock reducing member is kept away from the passenger, by which a sense of discomfort can be prevented.

It is preferable that the configuration be made such that when a predetermined impact load higher than the usual seating load is applied to the pressure receiving member, the connecting member moves the connecting part between the shock reducing member and the connecting member in the upward direction, and then moves it downward, by which the whole of the pressure receiving member is moved to the vehicle rear. Thus, the connecting part of the shock reducing member and the connecting member move in the upward direction, and then move downward, by which the whole of the pressure receiving member is moved to the vehicle rear. Therefore, even if the seat back is tilted to the rear by rear-end collision, the pressure receiving member can be moved along the tilt direction. Therefore, at the time of rear-end collision, the load transmission efficiency is high, and the sinking movement of the whole of the passenger's body can be secured.

It is preferable that the configuration be made such that when a predetermined impact load higher than the usual seating load is applied to the pressure receiving member, the connecting member moves the connecting part between the shock reducing member and the connecting member downward, by which the whole of the pressure receiving member is moved to the vehicle rear. By this configuration, the passenger moves easily to the sinking direction, and even in the case where the shock is great, the floating of the passenger can be restrained.

In the vehicle seat in accordance with various embodiments of the present invention, by using the shock reducing member and the urging element(s), a mechanism for transmitting a load applied to the pressure receiving member to the headrest is made unnecessary, the increase in size of the mechanism is suppressed, more rigidity than necessary is not needed, the number of parts is reduced, the construction is simplified, the amount of sinking (movement) of the passenger's body to the vehicle rear at the time of rear-end collision can be increased, and a shock applied to the passenger at the time of rear-end collision can be reduced effectively independently from the headrest.

Also, by using the shock reducing member such as to be in the optimum state under a usual seating load or in rear-end collision, in the case where the urging element(s) is mounted to this shock reducing member, the number of parts can be reduced without the use of a separate member to mount the urging element(s), and at the same time, the number of assembling processes can be reduced and the work efficiency can be increased. Further, the shock reducing member and the urging member can be decreased in size, the interference of the urging member with other members is restrained, and the arrangement region of other members is secured, by which a high degree of freedom in designing can be achieved.

BRIEF DESCRIPTION OF THE DRAWINGS

The invention is described below with reference to various embodiments illustrated in the following drawing figures.

DETAILED DESCRIPTION OF THE PREFERRED EMBODIMENTS

Embodiments of the present invention will now be described with reference to the accompanying drawings. The description of the members, arrangements, and the like described below does not restrict the present invention, and can be modified and changed variously in light of the teachings of the present invention. In this specification, a vehicle is defined as a moving object that is mounted with a seat, including a on-ground running vehicle having wheels, such as an automobile and a railroad car, and an aircraft and a ship moving in a space excluding on the ground. A usual seating load includes a seating shock caused when a passenger sits down and a load at the time of acceleration imposed by sudden start of vehicle. A load at the time of rear-end collision is a high load imposed by rear-end collision, including a heavy rear-end collision caused by a vehicle from the rear side and a heavy collision at the time of backward running, and excludes a collision in a load region similar to the usual seating load.

First Embodiment

Figure 1:
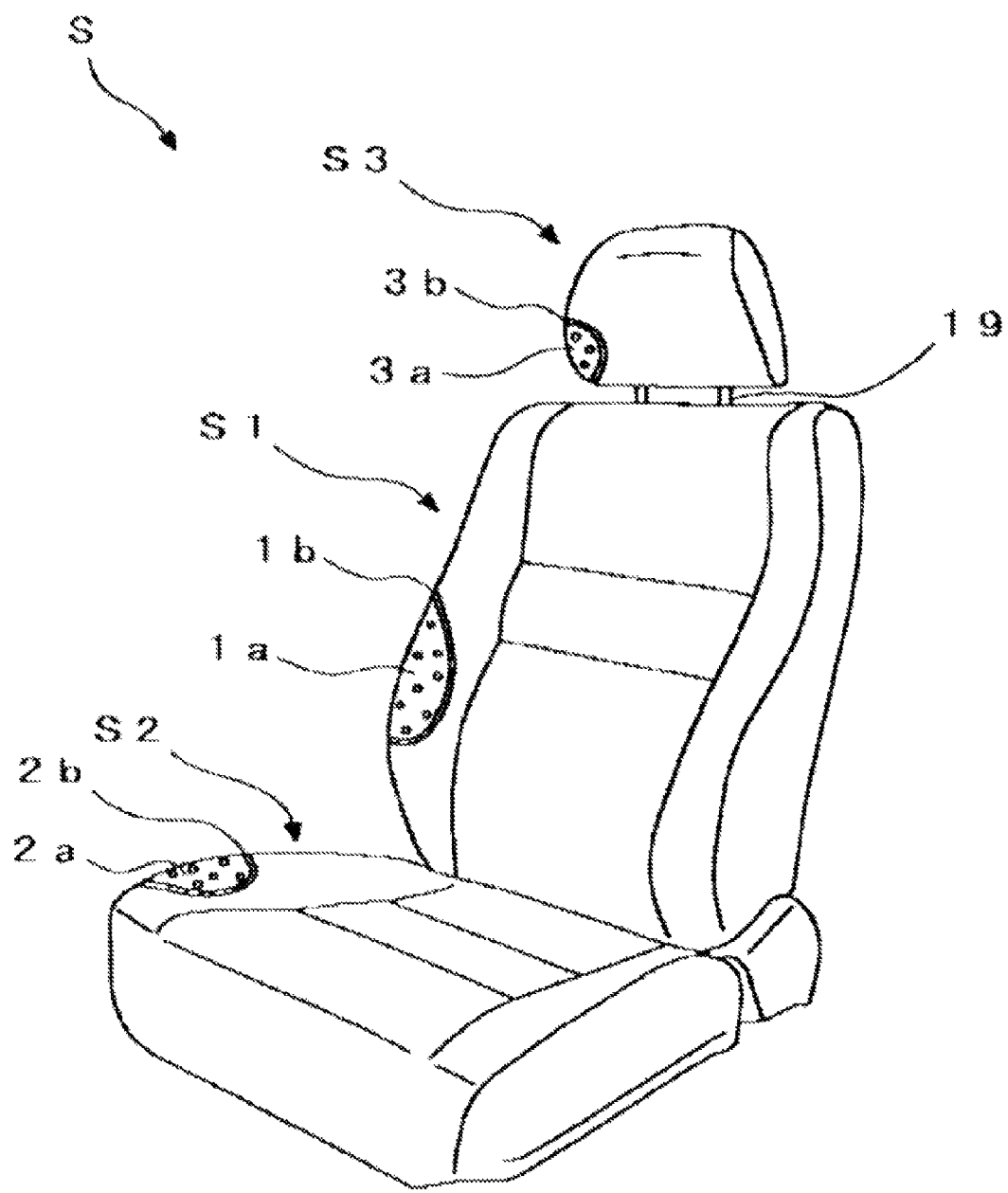
FIG. 1 is a schematic perspective view of a seat.

FIGS. 1 to 10 show a first embodiment in accordance with the present invention. As shown in FIG. 1, a vehicle seat S in accordance with this embodiment is made up of a seat back S1 (a back part), a seat cushion S2, and a headrest S3. The seat back S1 (the back part) and the seat cushion S2 are formed by placing cushion pads 1a and 2a on a seat frame F and by covering the cushion pads 1a and 2a with cover materials 1b and 2b, respectively. The headrest S3 is formed by placing a pad material 3a on a core material (not shown) in the head part and by covering the pad material 3a with a cover material 3b. Reference numeral 19 denotes a headrest pillar for supporting the headrest S3.

Figure 2:
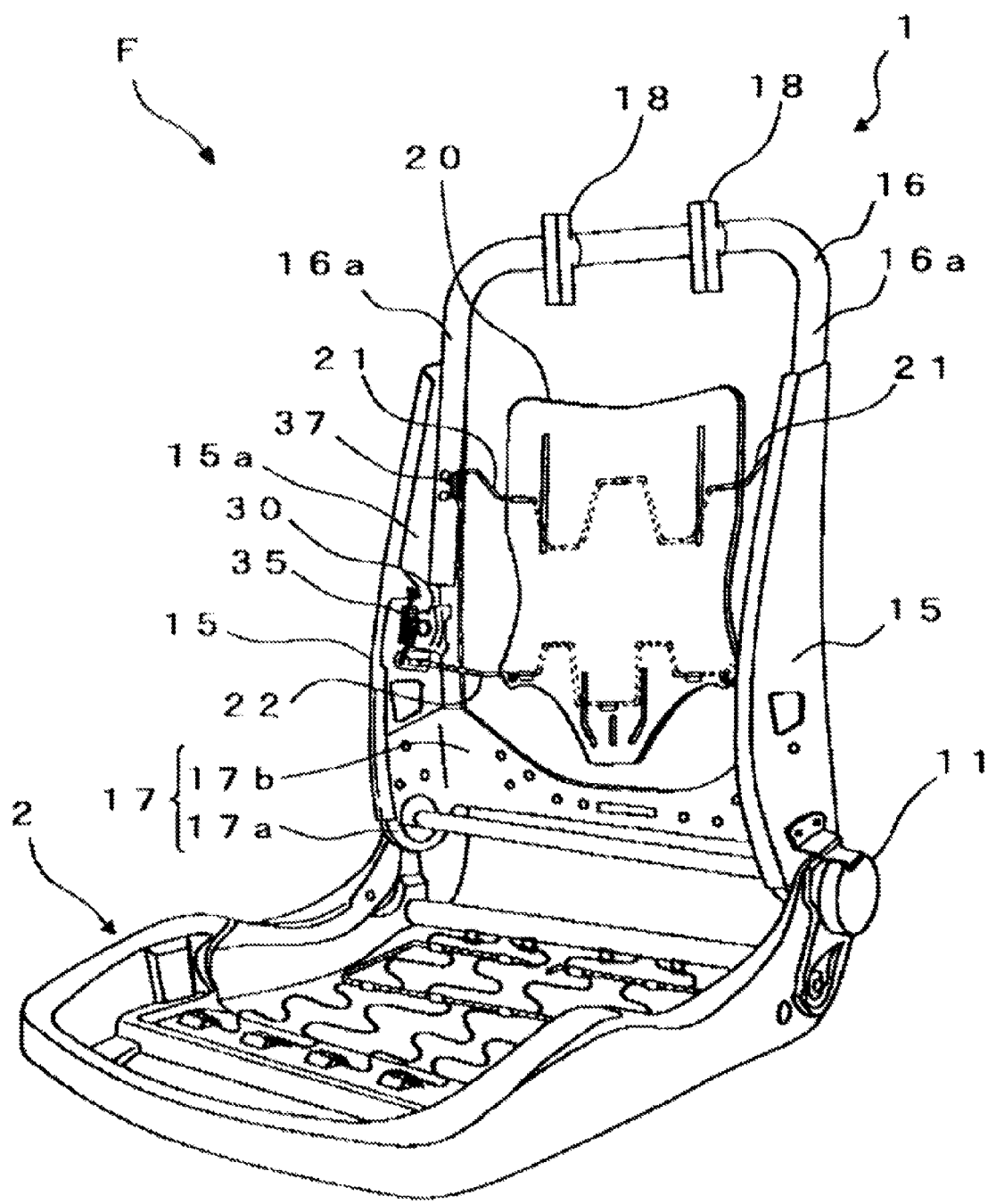
FIG. 2 is a schematic perspective view of a seat frame.

As shown in FIG. 2, the seat frame F of the vehicle seat S is made up of a seat back frame 1 constituting the seat back S1 and a seat cushion frame 2 constituting the seat cushion S2.

The seat cushion S2 is formed, as described above, by placing the cushion pad 2a on the seat cushion frame 2 and by covering the cushion pad 2a with the cover material 2b, and is configured so as to support a passenger from the downside. The seat cushion frame 2 is supported by a leg part. The leg part is mounted with an inner rail (not shown), and is assembled into a slide system such that the longitudinal position of the seat cushion frame 2 can be adjusted between the inner rail and an outer rail provided on a vehicle body floor.

The rear-end part of the seat cushion frame 2 is connected to the seat back frame 1 via a reclining mechanism 11.

The seat back S1 is formed, as described above, by placing the cushion pad 1a on the seat back frame 1 and by covering the cushion pad 1a with the cover material 1b, and is configured so as to support the passenger's back from the rear side. In this embodiment, as shown in FIG. 2, the seat back frame 1 has a substantially rectangular frame body, and includes a side part, an upper part, and a lower part.

The side part is disposed to be separated in the right and left direction to constitute a seat back width, and has two side frames 15 each extending in the up and down direction. An upper frame 16 that connects the upper end sides of the side frames 15 extends upward from the side part, and constitutes the upper part. The upper frame 16 in this embodiment is formed by a pipe member.

As shown in FIG. 2, the upper frame 16 is a substantially U-shaped member. Side portions 16a of the upper frame 16 are disposed so as to overlap partially on the side plates 15a of the side frames 15, and are fixedly joined to the side frames 15 in the overlapping portions.

The lower part of the seat back frame 1 is formed by connecting the lower end sides of the side frames 15 by a lower frame 17. The lower frame 17 has an extension part 17a that is connected to the lower sides of the side frames 15 and extends in a lower portion of the lower frame 17 and an intermediate part 17b that connects both sides. The extension part 17a is extended in a no-hindrance range in connection with the seat cushion frame 2.

The seat back frame 1 is formed by separate members of the side frames 15, the upper frame 16, and the lower frame 17. However, the seat back frame 1 can be formed by an integral pipe frame, an integral plate frame, or the like.

Figure 3:
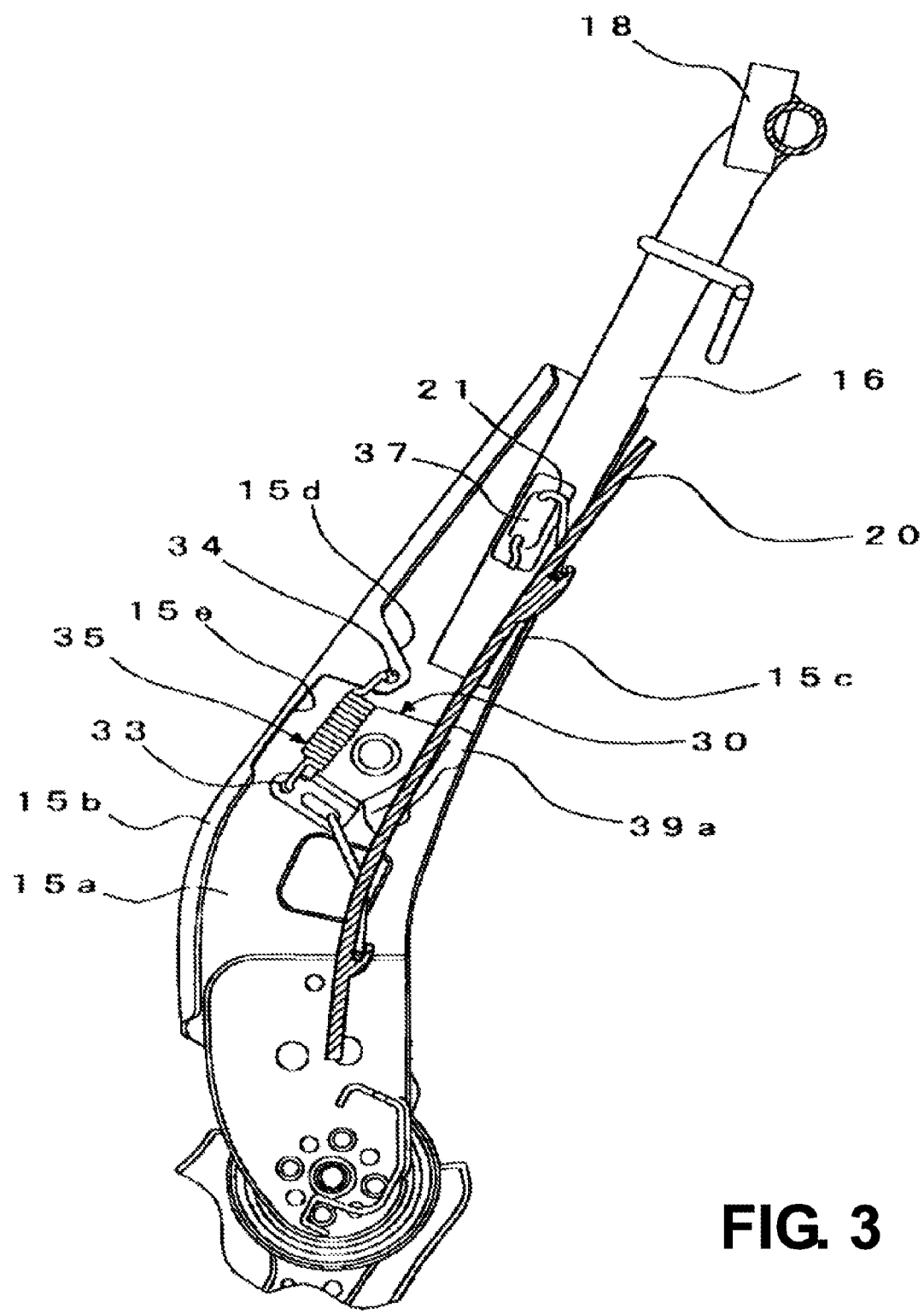
FIG. 3 is a schematic cross-sectional view of a seat back frame before the movement of a shock reducing member.
Figure 6:
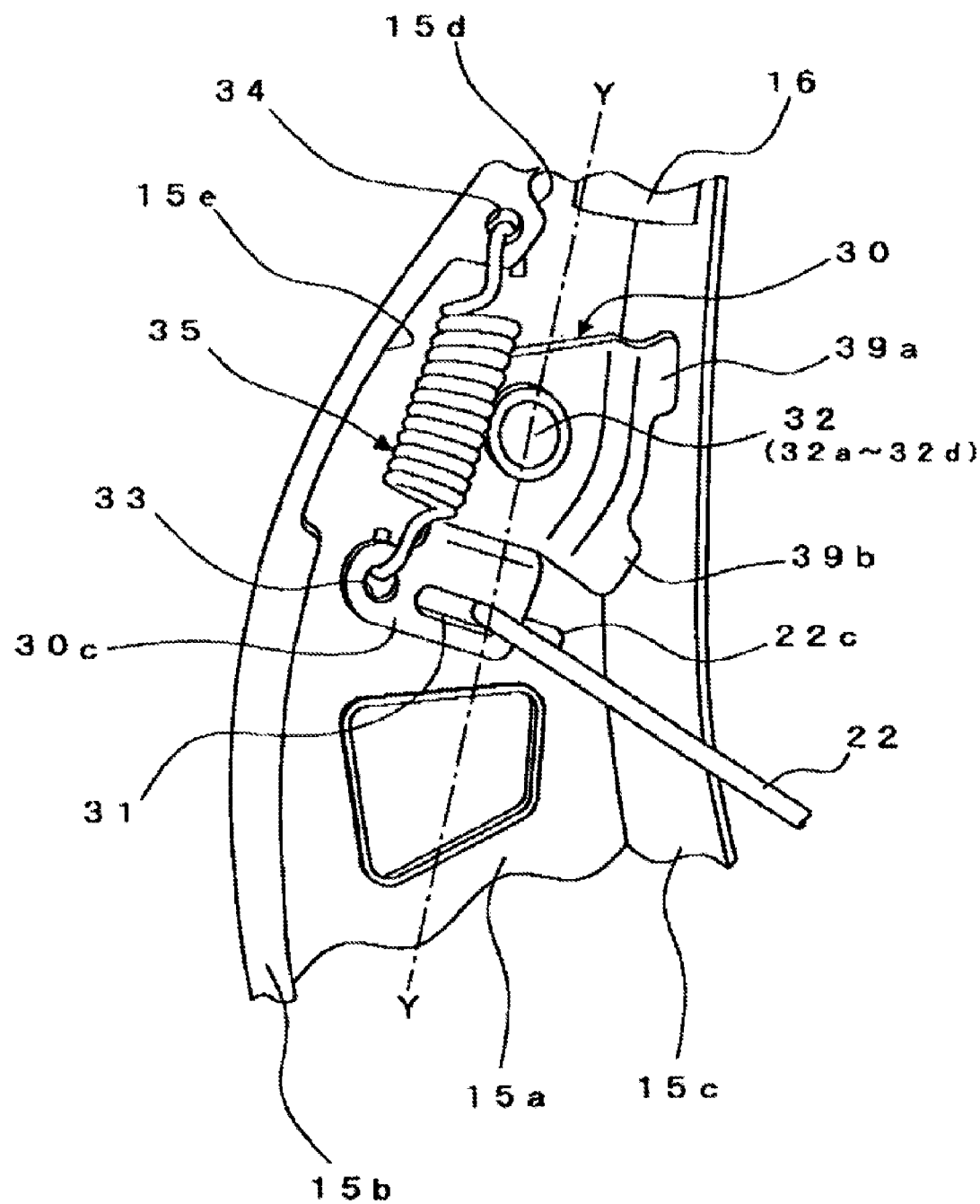
FIG. 6 is an enlarged perspective view showing the relationship between a shock reducing member and an urging element(s)

The side frame 15 in this embodiment is an extending member constituting the side surface of the seat back frame 1, and, as shown in FIG. 6, has a flat plate shaped side plate 15a, a front edge part 15b folded inward in a U shape from the front end part (the end part located on the vehicle front side) of the side plate 15a, and a rear edge part 15c bent inward in an L shape from the rear-end part thereof. The side frame 15 has a U-shaped cross section such that both the end parts (the front edge part 15b and the rear edge part 15c) of the side plate 15a disposed in the vehicle longitudinal direction are bent to the inside direction of the seat back frame 1 (that is, the seat). As shown in FIG. 3, the side frame 15 has an enlarged part in which the side plate 15a becomes wide in the vehicle longitudinal direction in a lower portion thereof, and is especially enlarged to the vehicle front beyond the side portion 16a consisting of a pipe member.

Figure 7:
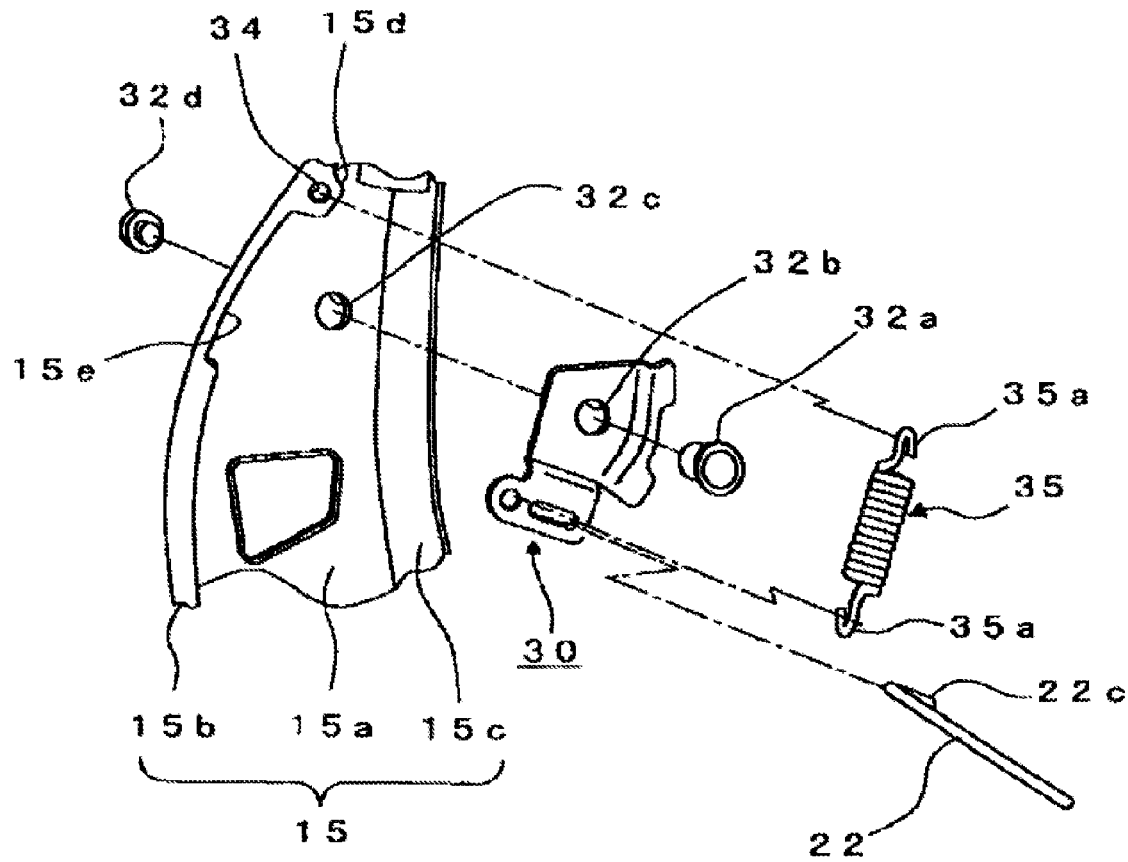
FIG. 7 is an exploded perspective view of a shock reducing member and an urging element(s)

As shown in FIGS. 3, 6 and 7, the front edge part 15b of this embodiment is formed with a projecting part 15d serving as an extension part projecting in the rear edge part 15c direction, and the projecting part 15d is formed with a locking hole 34 serving as a mounting part for mounting the end portion of a tensile coil spring 35 serving as an urging element(s) (mounting part formed on the seat back frame).

The mounting part (the locking hole 34) of the tensile coil spring 35 provided in the side frame 15 as described above is formed by providing the projecting part 15d in the front edge part 15b (folded flange part) of the side frame 15, so that the tensile coil spring 35 is easily attached as compared with the case where the projecting part 15d serving as the extension part is not provided. Also, if a hook-shaped protrusion is attached directly to the front edge part 15b, the rigidity of the protrusion becomes low, so that the accuracy is difficult to obtain when the side frame 15 is formed by using a mold or the like. However, if the locking hole 34 is formed by providing the projecting part 15d in the front edge part 15b (folded flange part), the strength can be secured, and additionally, the tensile coil spring 35 can be attached at a position having a high rigidity. Also, the tensile coil spring 35 serving as the urging element(s) can be kept away from the passenger, so that the stability can be secured, and passenger discomfort is prevented.

A notch part 15e, which is formed by cutting the front edge part 15b to the vehicle front side to decrease the width, is formed in the range from the lower part of the projecting part 15d of the front edge part 15b to a portion opposed to the position at which the tensile coil spring 35 serving as the urging element is disposed. By this notch part 15e, the interference of the tensile coil spring 35 with the side part can be prevented even in a narrow arrangement space.

Above the upper frame 16 constituting the upper part, the headrest S3 is disposed. The headrest S3 is, as described above, formed by placing the pad material 3a in the outer peripheral part of the core material (not shown) and by covering the outer periphery of the pad material 3a with the cover material 3b. The upper frame 16 is provided with pillar supporting parts 18. To the pillar supporting part 18, the head rest pillar 19 (refer to FIG. 1) for supporting the headrest S3 is attached via a guide lock (not shown) so that the headrest S3 is installed.

As described above, the side frames 15 constituting the side part forming a part of the seat back frame 1 have a predetermined length in the up and down direction, and are disposed in an opposing manner with a predetermined space being provided therebetween in the right and left direction. In an inside region of the seat back frame 1 in the seat back frame 1 (between the side frames 15 on both sides), a pressure receiving member 20 serving as a posture holding member that supports the cushion pad 1a from the rear is disposed.

Figure 5:
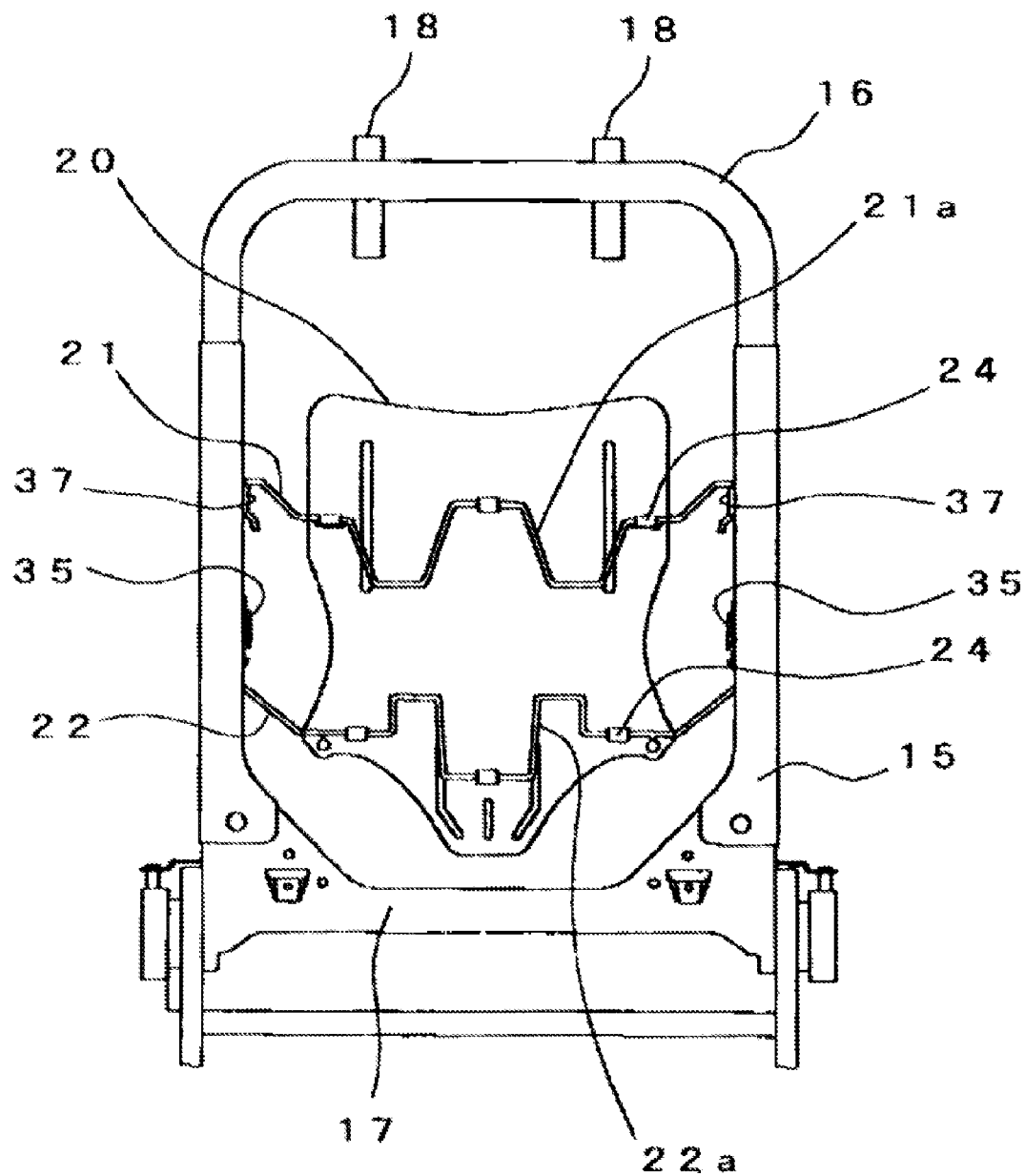
FIG. 5 is a schematic view of a seat back frame viewed from the back side.

The pressure receiving member 20 of this embodiment is configured without communication with the headrest S3. The pressure receiving member 20 is a member formed by molding a resin into a substantially rectangular plate shape, and on the surface thereof on the side in contact with the cushion pad 1a, smooth irregularities are formed. As shown in FIG. 5, on the upper side and the lower side of the back side of the pressure receiving member 20, claw parts 24, 24, . . . for locking wires 21 and 22 are formed.

The pressure receiving member 20 of this embodiment is supported by connecting members. Specifically, as the connecting members, the two wires 21 and 22 are provided between the side frames 15 on both sides, being engaged with the pressure receiving member 20 by the claw parts 24 formed at predetermined positions on the upper side and the lower side of the back side of the pressure receiving member 20, and supports the pressure receiving member 20 on the back surface of the cushion pad 1a. The wires 21 and 22 each are formed of a steel wire rod having spring properties, and, as shown in FIG. 5, are formed with irregular parts 21a and 22a, respectively, which are bend parts, in the middle between the side frames 15 on both sides.

In particular, of the two wires 21 and 22 locked to the pressure receiving member 20 of this embodiment, the wire 22 located in the lower portion is deformed greatly by a load not lower than a predetermined value (a load higher than the load of moving or rotating of the shock reducing member, described below) because the irregular part 22a is formed, and the pressure receiving member 20 is configured so as to move rearward through a larger displacement.

Figure 4:
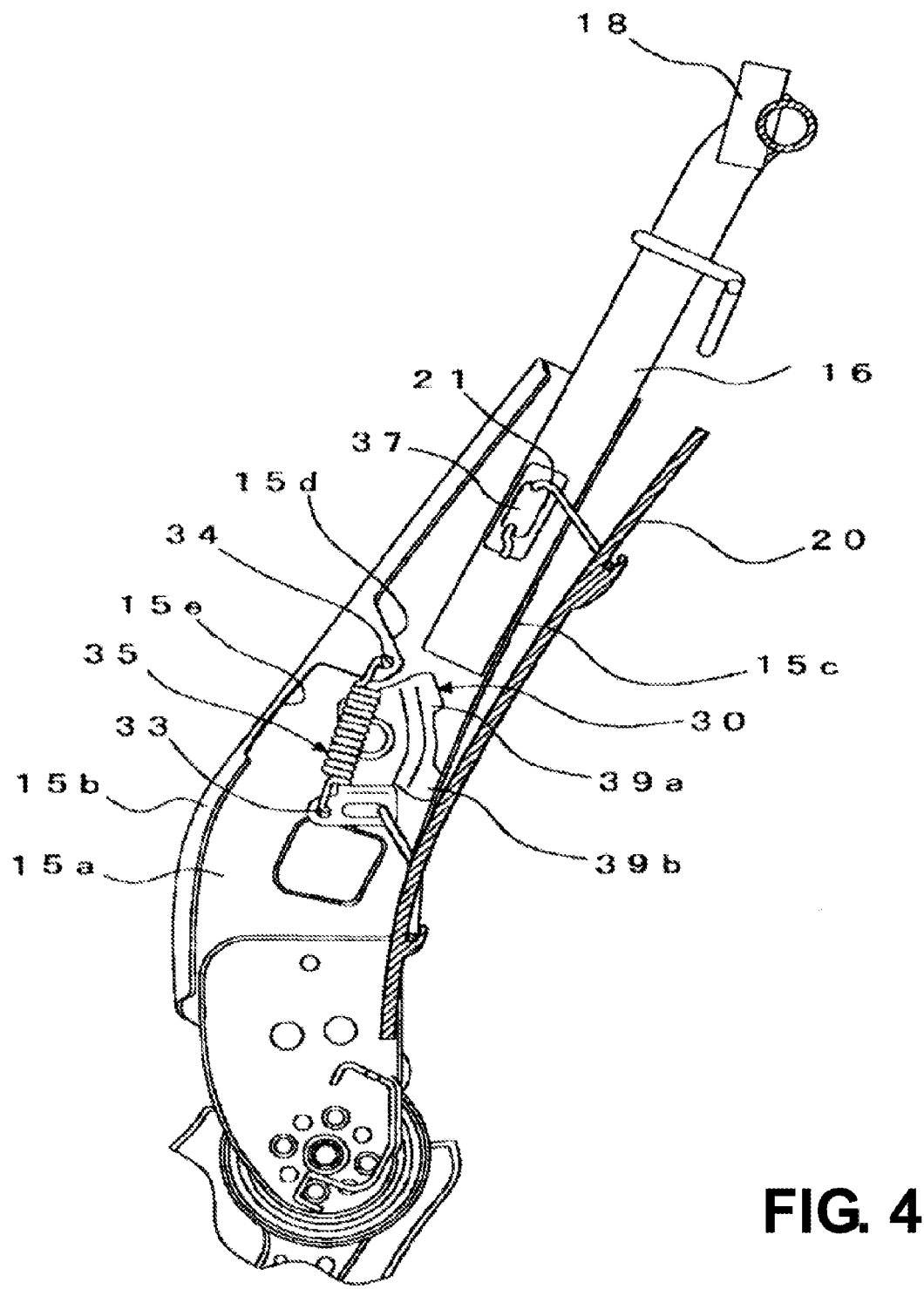
FIG. 4 is a schematic cross-sectional view of a seat back frame after the movement of a shock reducing member.

As shown in FIGS. 3, 4 and 6, of the two wires 21 and 22 locked to the pressure receiving member 20 of this embodiment, both end parts of the wire 21 locked to the upper side are hooked to mounting hooks 37 provided on the side frames 15 on both sides (in more detail, a pipe member of the upper frame 16 attached to the side frame 15). On the other hand, both end parts of the wire 22 locked to the lower side are hooked to locking parts 31 of rotating members 30 mounted on the right and left side frames 15.

The rotating member 30 serving as the shock reducing member is rotated to the vehicle rear by an impact load transmitted via the connecting member (the wire 22) when an impact load not lower than the predetermined value is applied to the pressure receiving member 20 by rear-end collision or the like. By the movement of the rotating member 30 to the vehicle rear, the pressure receiving member 20 can be moved significantly to the vehicle rear, and thereby a shock applied to the passenger can be reduced.

As shown in FIGS. 3 and 6, the rotating member 30 of this embodiment is pivotally supported on the inside of the side plates 15a of the side frames 15 on both sides, that is, on the inside of the enlarged part that is wide in the vehicle longitudinal direction and becomes wide to the front beyond the side portion 16a of the upper frame 16, via a shaft part 32 (described below) to be rotatable. The rotating member 30 locks the wire 22 at the lower position serving as the connecting member, and is connected to the spring (the tensile coil spring 35) serving as the urging element for urging the wire 22. That is to say, the rotating member 30 is connected to the urging element so that the pressure receiving member 20 is urged to the front side of the seat back frame via the connecting member.

At this time, since the side frame 15 has a U-shaped cross section bent to the inside direction of the seat back frame 1 (that is, the seat) as described above, the projection in the inside direction of the seat from the side frame 15 can be prevented, so that even if the sizes of the rotating member 30 and the tensile coil spring 35 connected to the rotating member 30 are increased, these elements are kept away from the passenger.

As shown in FIGS. 2 and 3, the rotating member 30 is provided on the vehicle lower side of the side portion 16a of the upper frame 16 comprising of a pipe member constituting the side part. Therefore, the rotating member 30 and the tensile coil spring 35 connected to the rotating member 30 do not interfere with the side portion 16a, and especially when the tensile coil spring 35 vibrates, an unusual sound can be restrained from being generated.

The rotating member 30 of this embodiment includes the rotatable shaft part 32, the locking part 31 for the connecting member formed at a position at a predetermined distance from the shaft part 32, a locking part (a locking hole 33) for the urging element(s), and a rotate inhibiting part 39 (stopper parts 39a and 39b) that inhibits the rotating.

As shown in FIG. 7, the shaft part 32 includes a shaft member 32a, a shaft hole 32b provided in the rotating member 30, a hole part 32c provided in the side plate 15a of the side frame 15, and a fitting member 32d. The shaft member 32a is inserted through the shaft hole 32b and fitted in the hole part 32c, and the fitting member 32d is fitted from the tip end side of the shaft member 32a, by which the rotating member 30 is pivotally supported to be rotatable.

The locking part 31 for the connecting member (the wire 22) of this embodiment is formed into an elongated hole to make it easy to install a bent hook-shaped end part of the wire 22 serving as the connecting member. A formation part 30c of the locking part 31 is formed to be continuous with the outer periphery side of a base part 30a constituting the rotating member 30 and to extend in the outer periphery direction from a first rising part 30b rising from the base part 30a. The first rising part 30b is formed at a position separating through approximately 90 degrees from a position at a predetermined interval between the stopper parts 39a and 39b of the rotate inhibiting part 39 with the shaft part 32 being the center.

The locking hole 33 serving as the mounting part (the mounting part formed on the shock reducing member) of the urging element of this embodiment, which is used to lock the end part of the tensile coil spring 35 serving as the urging element, is formed on the vehicle front side of the locking part 31 in the formation part 30c in which the locking part 31 is formed. That is to say, as shown in FIG. 6, the locking hole 33 is formed at a position on the vehicle front side of a line Y connecting the shaft part 32 to a position at which the wire 22 is hooked to the locking part 31.

If the mounting part of the urging element is formed by a hole as described above, the mounting part can be formed easily, and additionally, unlike a protrusion, the mounting part does not become a hindrance in the installation space of other members. Also, since the end part of the tensile coil spring 35 can be insertedly mounted, the assembling work is also made easy.

The urging element of this embodiment is the tensile coil spring 35 formed by coiling a spring wire rod. As shown in FIG. 6, the tensile coil spring 35 is locked to the locking hole 33 in the rotating member 30 and the locking hole 34 in the projecting part 15d of the side frame 15. Thereby, the tensile coil spring 35 urges the rotating member 30 to the front side of the seat back frame 1. In both end parts of the tensile coil spring 35, hooks 35a for locking are formed into a semicircular shape.

Figure 8:
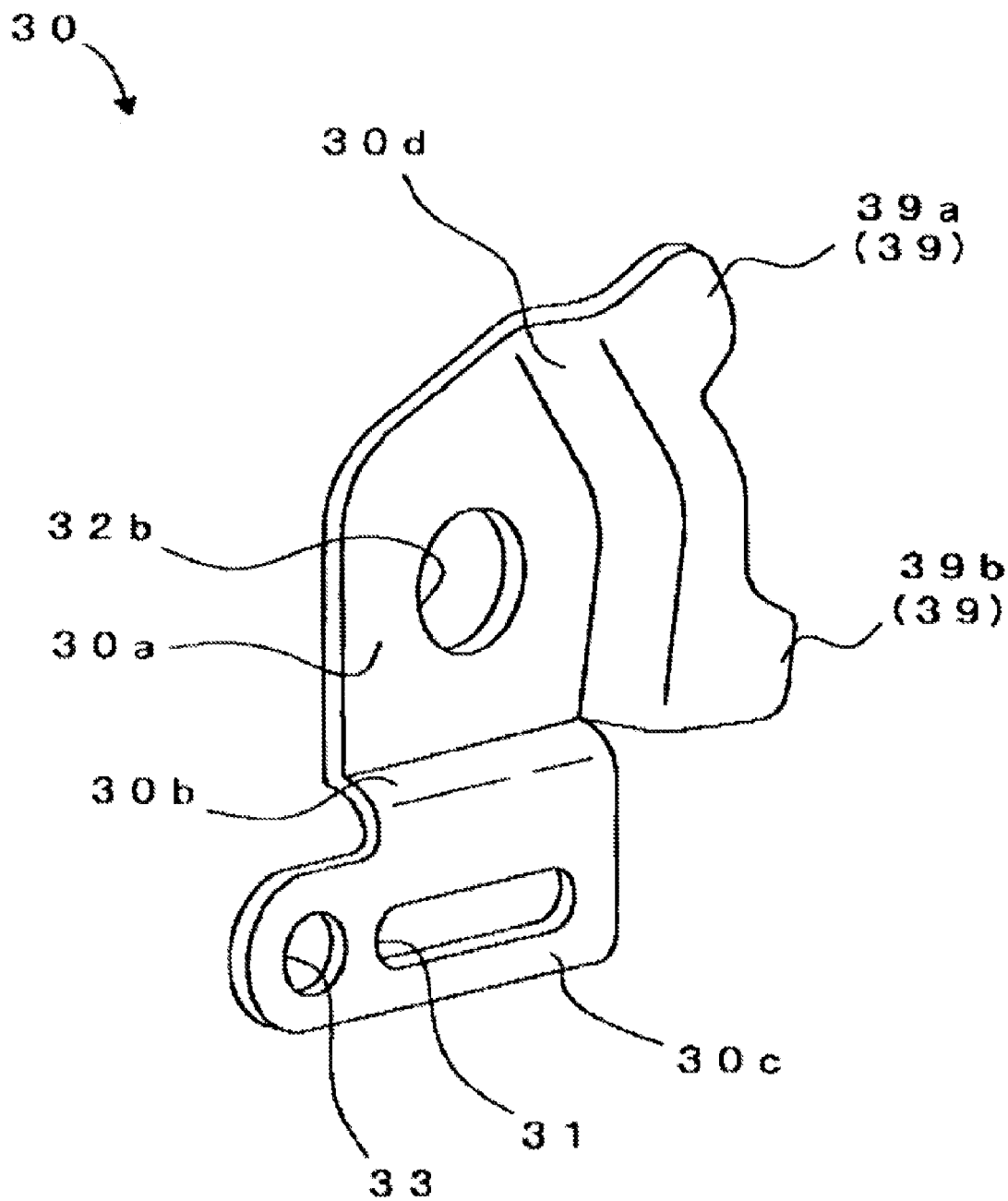
FIG. 8 is a perspective view of a shock reducing member.

As shown in FIG. 8, the rotate inhibiting part 39 (the stopper parts 39a and 39b) of this embodiment is formed at two places at a predetermined interval so as to further extend toward the outer periphery direction from a second rising part 30d rising from the base part 30a, which comes into sliding contact with the side plate 15a when the rotating member 30 rotates around the shaft part 32, to be continuous with the outer periphery side of the base part 30a. This extending part forms the stopper parts 39a and 39b, and a notch part 39c is formed between the stopper parts 39a and 39b. The stopper parts 39a and 39b regulate the rotating of the rotating member 30.

Specifically, as shown in FIG. 6, the second rising part 30d forms a bend part raised by being bent in the direction parallel with the rear edge part 15c of the side frame 15 and in the direction of separating from the side plate 15a, and the stopper parts 39a and 39b are further continuous with the bend part and are bent in the direction perpendicular to the rear edge part 15c. Thus, the stopper parts 39a and 39b are formed on the vehicle rear side of the shaft part 32 of the rotating member 30.

As described below, the stopper parts 39a and 39b are contact parts that come into contact with the rear edge part 15c before and after the rotating of the rotating member 30 to inhibit the rotating. The faces in the thickness direction of the stopper parts 39a and 39b being in contact with the rear edge part 15c are formed to be flush with the rear edge part 15c at the time of contact.

The predetermined interval between the stopper parts 39a and 39b is set so that, to regulate the rotating at the upper limit and lower limit positions of the rotate setting range of the rotating member 30, at the normal time (i.e., under normal loading), the stopper part 39a is in contact with the rear edge part 15c of the side frame 15 to inhibit the rotating of the rotating member 30, and when the rotating member 30 is rotated by rear-end collision, the stopper part 39b comes into contact with the rear edge part 15c to stop the rotating. That is to say, to regulate the rotating at the upper limit and lower limit positions of the rotate setting range of the rotating member 30, the stopper part 39a that sets the initial position before rotating and the stopper part 39b that sets the stop position after rotating are formed at the predetermined interval.

Thus, the rotate inhibiting part 39 of the rotating member 30 is integrally formed by extending the rotating member 30 toward the outer periphery direction, and the contact faces thereof come into contact with the rear edge part 15c to be flush therewith before and after rotating. Therefore, the rotating of the rotating member 30 can be stopped stably and with certainty by the configuration that is simple and secures the strength.

This rotate inhibiting part 39 (the stopper parts 39a and 39b) is formed at a position at which it does not interfere with the urging element(s) (the tensile coil spring 35) and the connecting member (the wire 22), which are described below.

The above-described rotating member 30 is attached to the side frames 15 on both sides, and hook parts 22c of both end parts of the wire 22 are hooked to the locking parts 31 of the rotating members 30 so that the rotating members 30 operate individually. Also, the rotating members 30 are configured so as to operate independently from the headrest S3.

In this embodiment, the rotating members 30 are attached to the side frames 15 on both sides, and these rotating members 30 attached to both sides are configured so as to rotate independently from each other. Therefore, when an off-center load is applied, the rotating members 30 rotate independently in the side parts on both sides according to the load, so that the passenger's body can sink according to the magnitude of impact load.

At the usual seating time when the passenger is seated normally, a tension that rotates the rotating member 30 to the rear via the cushion pad 1a, the pressure receiving member 20, and the wire 22 in the seat back S1 is produced, and on the other hand, the tensile coil spring 35 urges the rotating member 30 so as to rotate it to the front side of the seat back frame 1. Since the tensile coil spring 35 connected to the rotating member 30 has a load property such as not to deflect in the region of load applied at the usual seating time, the stopper part 39a on the initial position side of the rotating member 30 is always in contact with the rear edge part 15c of the side frame 15, and is stopped at the initial position. That is to say, the configuration is made such that a force for restoring the rotating member 30 to the initial state against a force for rotating the rotating member 30 becomes greatest at the usual seating time.

Figure 9:
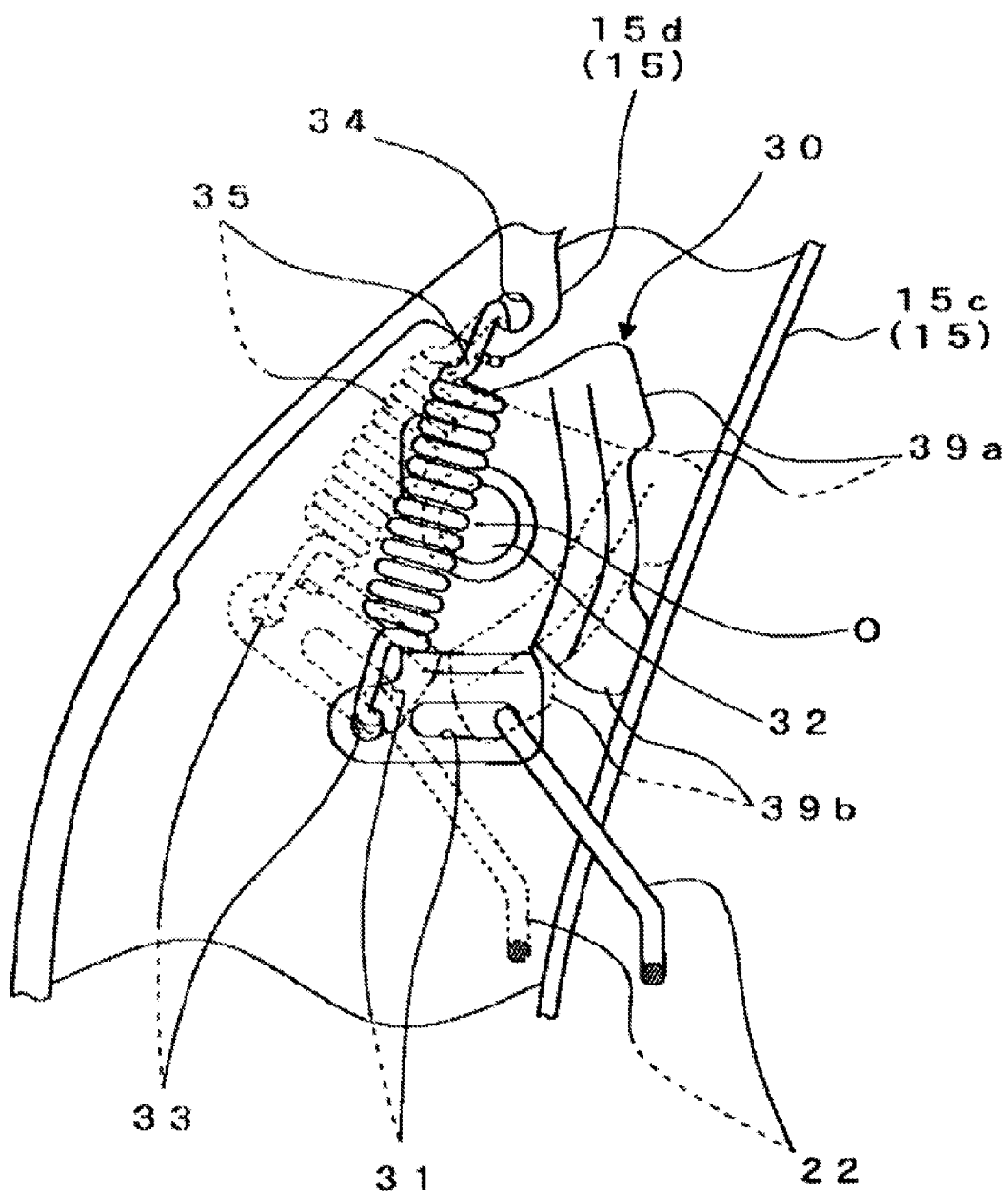
FIG. 9 is an explanatory side view showing a state of a shock reducing member and an urging element(s) before and during rear-end collision.
Figure 10A:
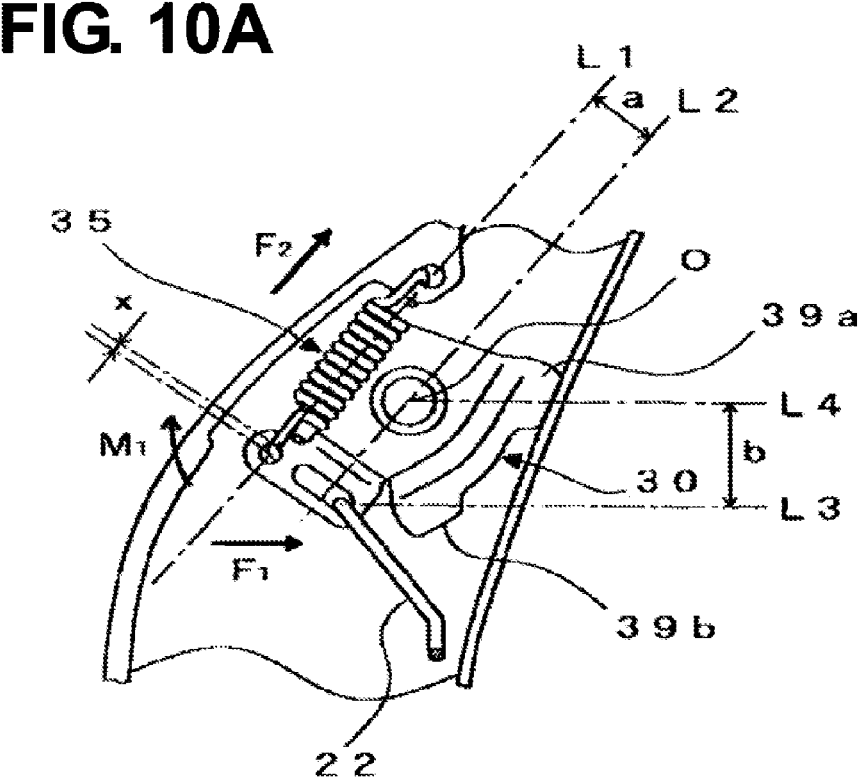
FIGS. 10A, B are explanatory side views showing a state of a shock reducing member and an urging element(s) before and during rear-end collision.
Figure 10B:
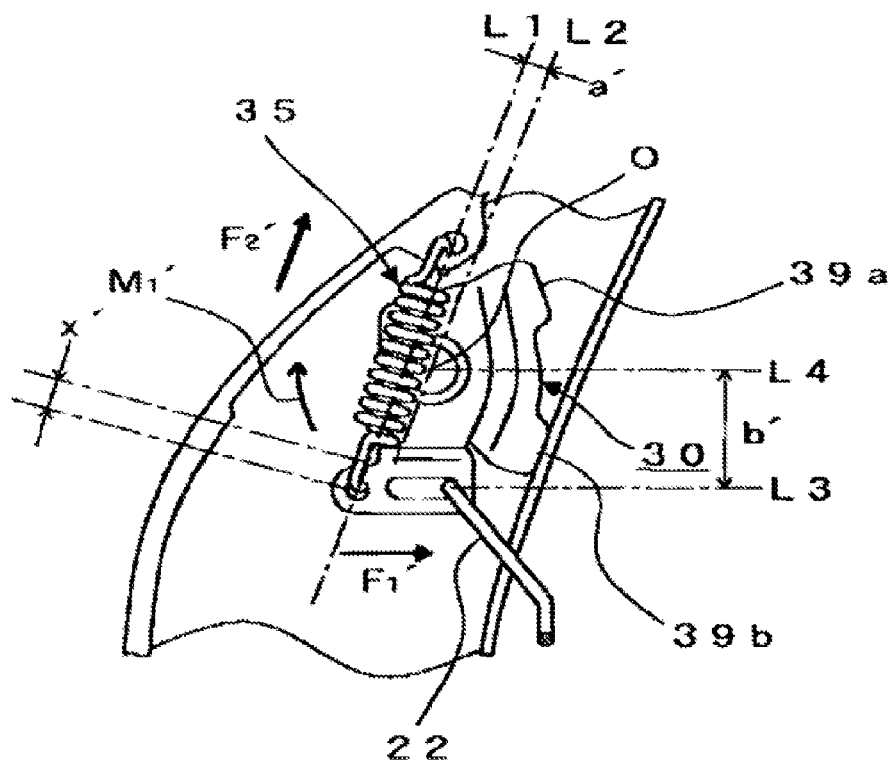

For the rotating member 30 at the time of rear-end collision, FIG. 3 shows the state before the shock reducing member rotates, and FIG. 4 shows the state after the shock reducing member rotates. In FIG. 9, dashed lines indicate the state before rear-end collision, and solid lines indicate the state during rear-end collision. In FIG. 10, FIG. 10(a) shows the state before rear-end collision, and FIG. 10(b) shows the state during rear-end collision. At the time of rear-end collision, as shown in FIGS. 9 and 10, when an impact load is applied from the rear and the passenger begins to move to the rear due to the inertia, this load produces a tension such that the rotating member 30 is rotated to the rear (in FIGS. 9 and 10, to the right-hand side) via the pressure receiving member 20 (not shown in FIGS. 9 and 10) and the wire 22 locked to the pressure receiving member 20. The tension produced at this time is sufficient for the tensile coil spring 35, which allows the rotating member 30 to stay at the initial position, to extend and for the rotating member 30 to rotate to the rear.

The threshold value of a force by which the rotating member 30 is allowed to start rotating is set at a value larger than the usual seating load.

As for the threshold value of a force by which the rotating member 30 is allowed to start rotating, the threshold value is preferably larger than 150N because the load applied to the seat back S1 in the state in which the passenger is seated normally (herein, a seating shock caused when a passenger sits down and a weak shock caused by sudden start of vehicle are excluded) is about 150N. If the threshold value is smaller than this value, the rotating member 30 moves at the usual seating time. Therefore, such a small threshold value is not preferable because of poor stability.

Furthermore, considering a seating shock caused when a passenger sits down or a load at the time of acceleration imposed by sudden start of vehicle and the like, the threshold value is preferably set at a value larger than 250N. In this case, the rotating member 30 operates only at the time of rear-end collision, so that a stable state can be maintained.

As described above, by rotating the rotating member 30 to the rear, the wire 22 hooked to the locking part 31 moves to the rear, and at the same time, the pressure receiving member 20 locked to the wire 22 and the cushion pad 1a supported on the pressure receiving member 20 move to the rear, by which the passenger can be allowed to sink in the seat back S1.

Hereunder, the rotating characteristics of the rotating member 30 are explained in more detail with reference to FIGS. 9 and 11.

At the initial position of the rotating member 30 before rotating, the locking part 31 for locking the wire 22 and the locking hole 33 for locking the lower end part of the tensile coil spring 35 are located on the vehicle front side of the shaft part 32, and the upper end part of the tensile coil spring 35 is locked to the locking hole 34 formed in the projecting part 15d of the side frame 15 located above the rotating member 30.

That is to say, in the initial state, the tensile coil spring 35 extends through a distance x, and thereby the rotating member 30 is urged in the rotating direction indicated by an arrow mark in FIG. 10A by an angular moment $M_1$, and the connecting member (the wire 22) connected to the rotating member 30 is urged to the front side. At this time, the stopper part 39a of the rotate inhibiting part 39 comes into contact with the rear edge part 15c of the side frame 15, so that the rotating member 30 is restrained from being rotated in the $M_1$ direction by the tensile coil spring 35.

When a tension not lower than a predetermined value is produced in the wire 22 by rear-end collision, and the rotating member begins to rotate against the urging force of the tensile coil spring 35, the tensile coil spring 35 extends, and the locking hole 33 provided in the rotating member 30 moves to the rear while rotating around the rotate center O of the shaft part 32. Then, as shown in FIG. 9, the rotating member 30 is rotated until the stopper part 39b of the rotate inhibiting part 39 comes into contact with the rear edge part 15c of the side frame 15 to inhibit the rotating of the rotating member 30. Thereby, the pressure receiving member 20 is moved greatly to the rear of the seat frame 1 from the state shown in FIG. 3 to the state shown in FIG. 4, so that the sinking amount increases.

In this embodiment, when the rotating member 30 rotates and the pressure receiving member 20 moves, the upper end part of the tensile coil spring 35 is fixed to the locking hole 34 above the rotating member 30. Therefore, the configuration is such that the movement direction of the locking hole 33 and the direction in which the tensile coil spring 35 extends do not agree with each other.

That is to say, the configuration is such that the rotating amount of the rotating member 30 is not proportional to the tensile load (deflection amount) of the tensile coil spring 35. In other words, a relationship holds such that the rotating angle of the rotating member 30 is not simply proportional to the torque (rotational force) in the front rotating direction given by the tensile coil spring 35.

That is to say, the locking hole 33 for locking the lower end part of the tensile coil spring 35 follows an arcuate path with the shaft part 32 being the rotation center, whereas the locking hole 34 for locking the upper end part of the tensile coil spring 35 is formed as a fixing end fixedly joined above the rotating member 30.

Therefore, when the rotate center O of the shaft part 32 and the locking holes 33 and 34 to which both ends of the tensile coil spring 35 are locked lay on a straight line, the tensile load (deflection amount) of the tensile coil spring 35 is at a maximum. In the vicinity of the rotating amount in which a region is just before this maximum load point, that is, the path followed by the locking hole 33 provided on the rotating member 30 side is at a position farthest from the locking hole 34 to which the other end part of the tensile coil spring 35 is locked, the change amount of the distance between the locking holes 33 and 34 to which the tensile coil spring 35 is locked is small. Therefore, a region is produced in which the change amount of the tensile load of the tensile coil spring 35 with respect to the rotating angle is minute.

In this embodiment, the rearward rotating amount of a position at which the rotating member 30 is stopped by the stopper part 39b is set to be just before the maximum load point of the tensile coil spring 35.

Therefore, comparing with the tension produced via the wire 22 at the time when the rotating member 30 begins to rotate, the tension produced when the stopper part 39b comes in contact and the rotating is restricted (when the rotating is finished) takes an approximately equal value.

Hereunder, the relationship between the urging element (the tensile coil spring 35), the connecting member (the wire 22), the shock reducing member (the rotating member 30), and the load is explained further. The symbols shown in FIGS. 10A and 10B are as follows:

$$M1 = F2 \times a, M1' = F2' \times a'$$

M1, M1': angular moment
F1, F1': rearward load
F2, F2': tensile force of spring a, a': distance between rotate center and fixed position of urging element (spring). Specifically, distance between first imaginary line L1 connecting both ends of urging element and second imaginary line L2 that is parallel with this first imaginary line L1 and passes rotate center, a being the distance before rotating, and a' being the distance after rotating.

b, b': distance between rotate center and connecting member (wire). Specifically, distance between third imaginary line L3 parallel with horizontal line passing connecting part of shock reducing member and connecting member (wire) and fourth imaginary line L4 that is parallel with this third imaginary line L3 and passes rotate center, b being the distance before rotating, and b' being the distance after rotating.

x, x': extension of spring $F2'=F2+\Delta x \times k$, in which $k$ is spring constant, and
$\Delta x = x' - x$ In this embodiment, in order to keep the seating state proper even at the usual (normal) seating time, some degree of reaction force must be provided, so that it is preferable that the working load at the collision time be low while the holding load of the rotating member 30 at the usual seating time is fixed. Therefore, the load at the time when the rotating member 30 operates is preferably set low. The reaction force against the force for rotating the rotating member 30, that is, the moment with which the tensile coil spring 35 rotates the rotating member 30 is set to be highest at the initial time (the usual seating time) and low at the rotating time.

In this embodiment, as shown in FIGS. 10A, B, the configuration is made such that as the rotating member 30 rotates further, the tensile coil spring 35 approaches the rotate center O, and the distance a becomes short. Therefore, the tensile coil spring 35 is used such that the angular moment $M_1$ ($F_2 \times a$) in the initial state is highest, and the angular moment $M_1'$ ($F_2' \times a'$) during rotating (and after rotating) is lower than the angular moment $M_1$, so that the angular moment for rotating the rotating member 30 is high at the initial time and decreases gradually as the rotating member 30 rotates.

For example, if the spring tensile force $F_2'$ is doubled, and the distance a' between the rotate center and the spring fixing position is shorter than a half, it can be understood that the force for rotating the shock reducing member weakens.

Thus, for the rotating member 30 serving as the shock reducing member, the angular moment $M_1$ ($F_2 \times a$) in the initial state is highest, and the angular moment $M_1'$ ($F_2' \times a'$) becomes lower than the angular moment $M_1$ as the rotating member 30 rotates, that is, the force such that the tensile coil spring 35 restores the rotating member 30 to the initial state decreases gradually. Therefore, at the time of rear-end collision, after the start of rotating, the rotating member 30 becomes easy to move subsequently.

In FIGS. 10A and 10B, in order for the rotating member 30, the tensile coil spring 35, and the connecting member (the wire 22) to be balanced in the stationary state, when the angular moment is taken as ($M_1 = F_2 \times a$), the rearward load as ($F_1$), the spring tensile force as ($F_2$), the distance between the rotate center and the spring fixing position as (a), and the distance between the rotate center and the connecting member (the wire 22) as (b), as shown in Formula 1, $F_1 \times b$: force from passenger (force for moving the rotating member 30) and $F_2 \times a$: angular moment (staying force) must be in equilibrium, or the angular moment must be high. In the case where the angular moment is high, the rotating of the rotating member 30 is inhibited by the stopper part 39a.

$F_1 \times b \leq F_2 \times a$ (Formula 1)

On the other hand, in order for the rotating member 30, the tensile coil spring 35, and the connecting member to be balanced in the state in which the rotating member 30 moves, as shown in Formula 2, $F_1' \times b'$: force from passenger (force for moving the rotating member 30) and $F_2' \times a'$: angular moment (staying force) must be in equilibrium, or the force from the passenger must be high. In the case where the force from the passenger is high, and the rotating member 30 has moved to a predetermined position, the rotating of the rotating member 30 is inhibited by the stopper part 39b.

$F_1' \times b' \leq F_2' \times a'$ (Formula 2)

As described above, the threshold value of tension at the time when the rotating member 30 begins to rotate is set at a large value such that the rotating member 30 is not rotated by the usual seating load. On the other hand, since the tension applied to the rotating member 30 via the wire 22 at the time of rear-end collision is an impact energy, the tension has a value larger than the threshold value. Also, the force such that the tensile coil spring 35 restores the rotating member 30 to the initial state decreases as the rotating member 30 rotates.

Therefore, when the rotating member 30 begins to be rotated by rear-end collision, the rotating member 30 rotates until being stopped by the stopper part 39b without being stopped on the way, so that the passenger can be allowed to sink with certainty in the seat back S1.

Since the rotating member 30 has the above-described rotating characteristics against the tension produced via the wire 22, when rear-end collision occurs, the passenger can be allowed to sink in the cushion pad of the seat back S1 with certainty and efficiently.

At this time, the passenger's back is moved to the rear by the sinking in the seat back S1, but the position of the headrest S3 is unchanged relatively. Therefore, a gap between the headrest S3 and the head decreases, and the head can be supported by the headrest S3, so that an effect of effectively reducing a shock applied to the neck is achieved.

Also, when the passenger sinks in the seat back S1, since the sinking is not associated with the frontward movement of the headrest S3, the loss of rearward movement energy of the passenger at the time of rear-end collision is low, and the passenger can be allowed to sink in the seat cushion more deeply, so that a shock applied to the neck can be reduced more effectively.

FIGS. 11 to 15 are enlarged explanatory views similar to FIG. 6, showing modifications of this embodiment. FIGS. 11 to 15 show examples in which the mounting part formed on the rotating member 30 serving as the shock reducing member and the mounting part formed on the side frame 15 serving as the seat back frame are different.

Figure 11:
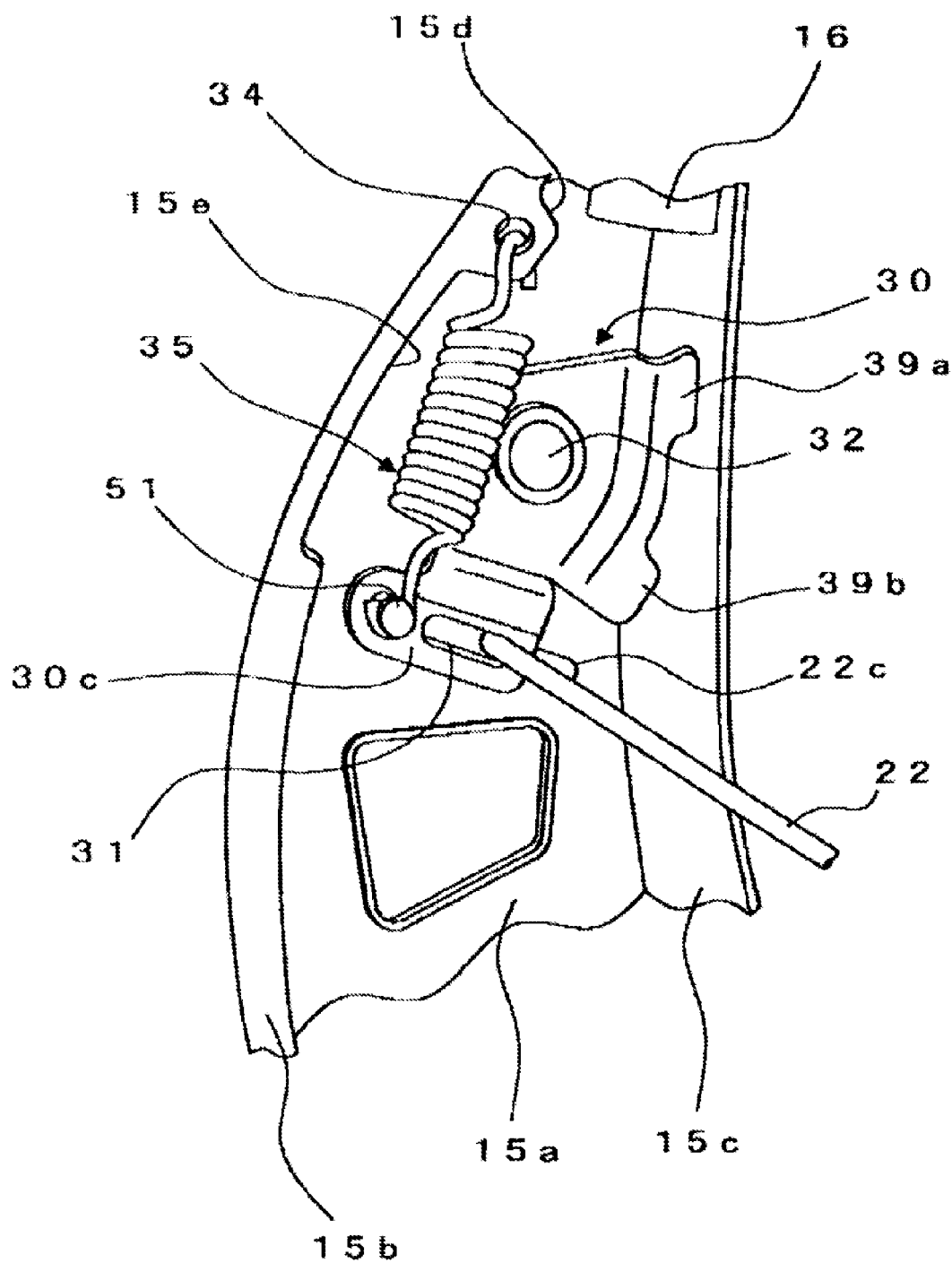
FIG. 11 is an enlarged perspective view similar to FIG. 6, showing another example.
Figure 12:
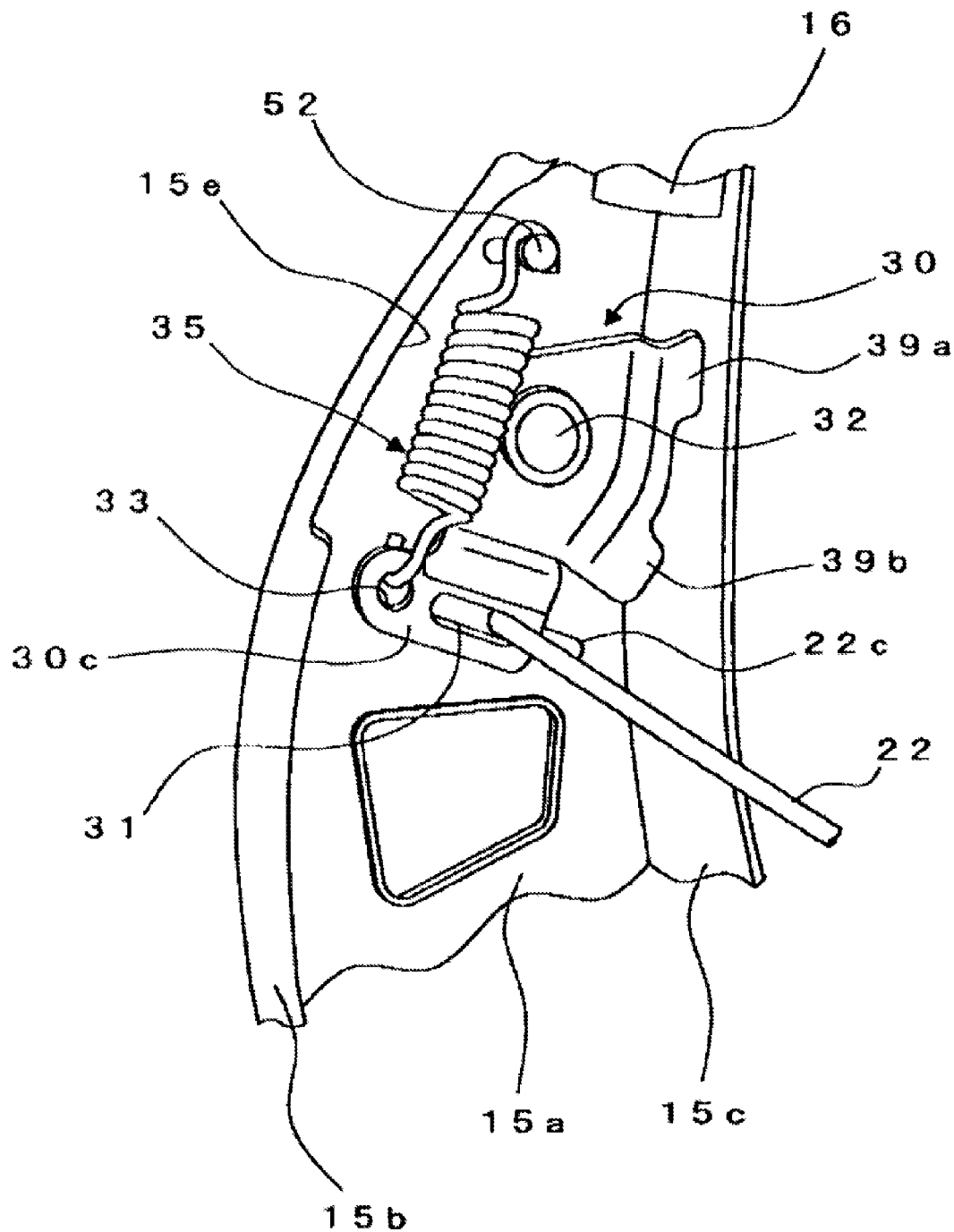
FIG. 12 is an enlarged perspective view similar to FIG. 6, showing another example.

The example shown in FIG. 11 shows a modification of the mounting part on the rotating member 30 side. In this example, the locking hole 33 in the formation part 30c in the example shown in FIG. 6 is replaced with a protrusion pin 51. This configuration has an advantage that the operation and effects similar to those as described above can be achieved, and also the work for hooking the end part of the tensile coil spring 35 can be performed easily because the protrusion pin 51 projects from the formation part 30c.

The examples shown in FIGS. 12 to 15 show modifications of the mounting part on the side frame 15 side. In the example shown in FIG. 12, a protrusion pin 52 projecting in the separation direction from the surface of the side plate 15a of the side frame 15 is used as an engagement projecting part.

Figure 13:
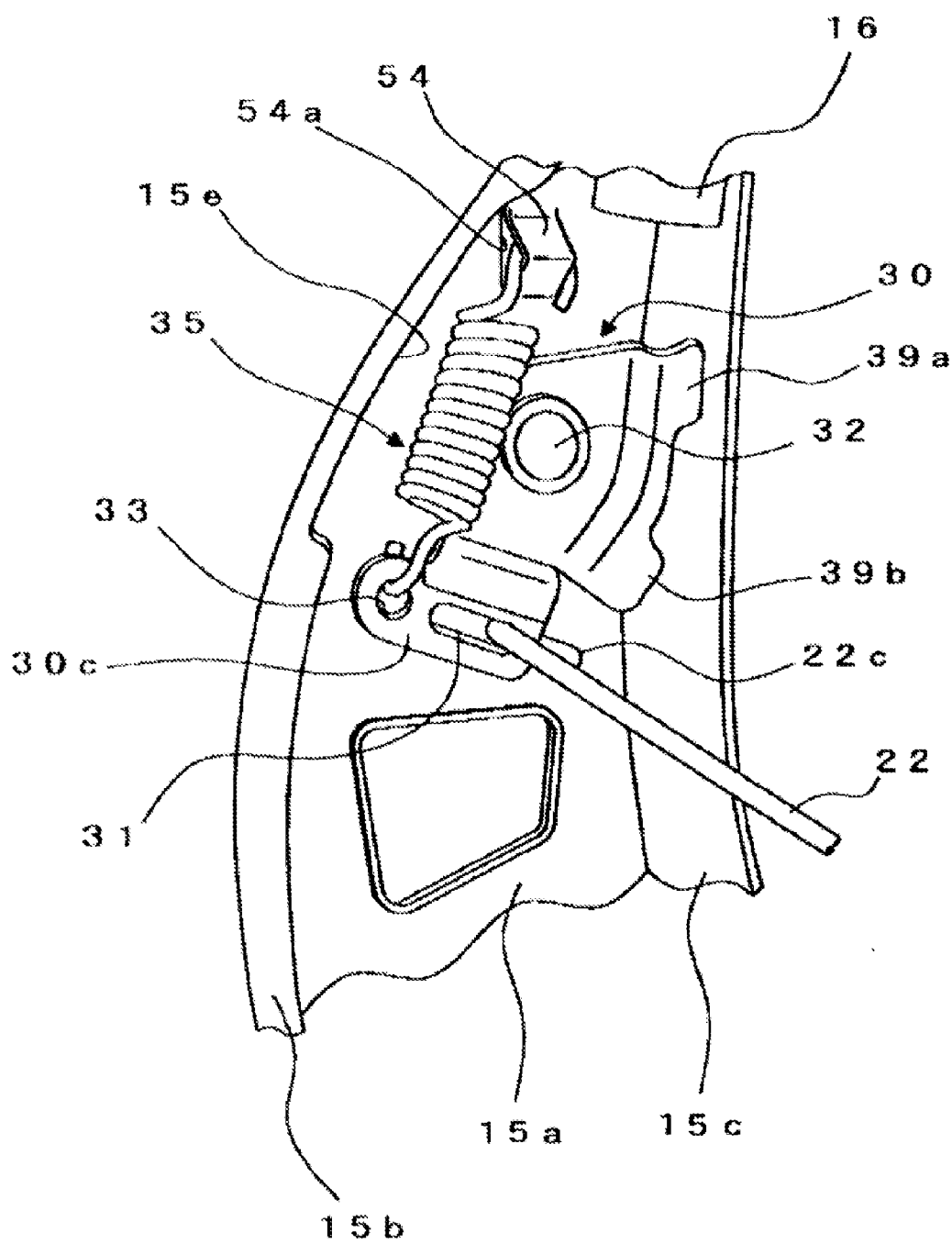
FIG. 13 is an enlarged perspective view similar to FIG. 6, showing another example.

In the example shown in FIG. 13, a cut and raised part 54 is formed by cutting and raising the flat-plane shaped surface of the side plate 15a of the side frame 15, and a locking hole 54a is formed in this cut and raised part 54.

Figure 14:
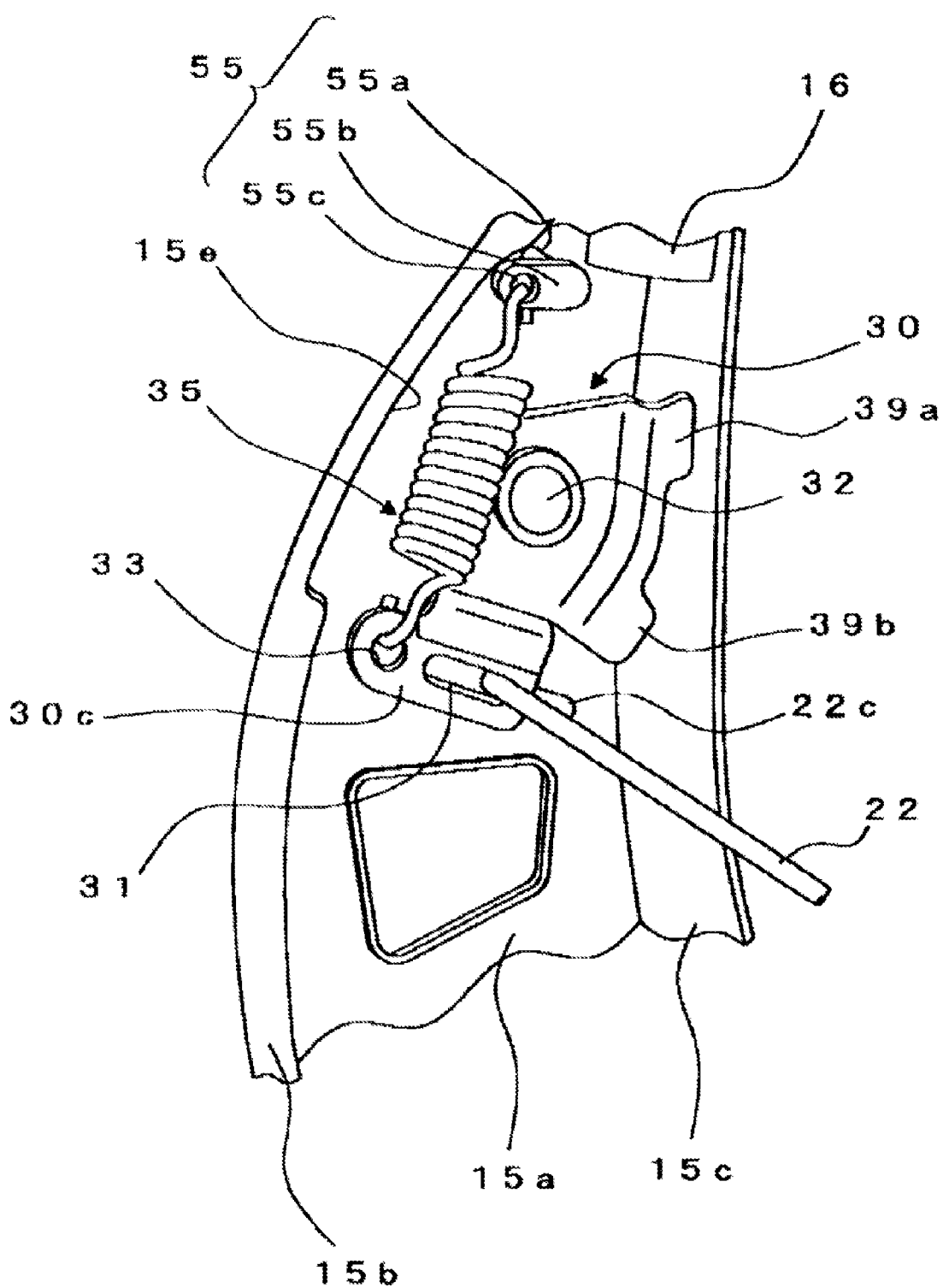
FIG. 14 is an enlarged perspective view similar to FIG. 6, showing another example.

In the example shown in FIG. 14, a mounting part 55 is configured so that a support 55a extending in the separation direction from the side plate 15a of the side frame 15 is formed, an engagement plate part 55b is formed to be continuous with the support 55a, and a locking hole 55c is formed in the engagement plate part 55b.

Figure 15:
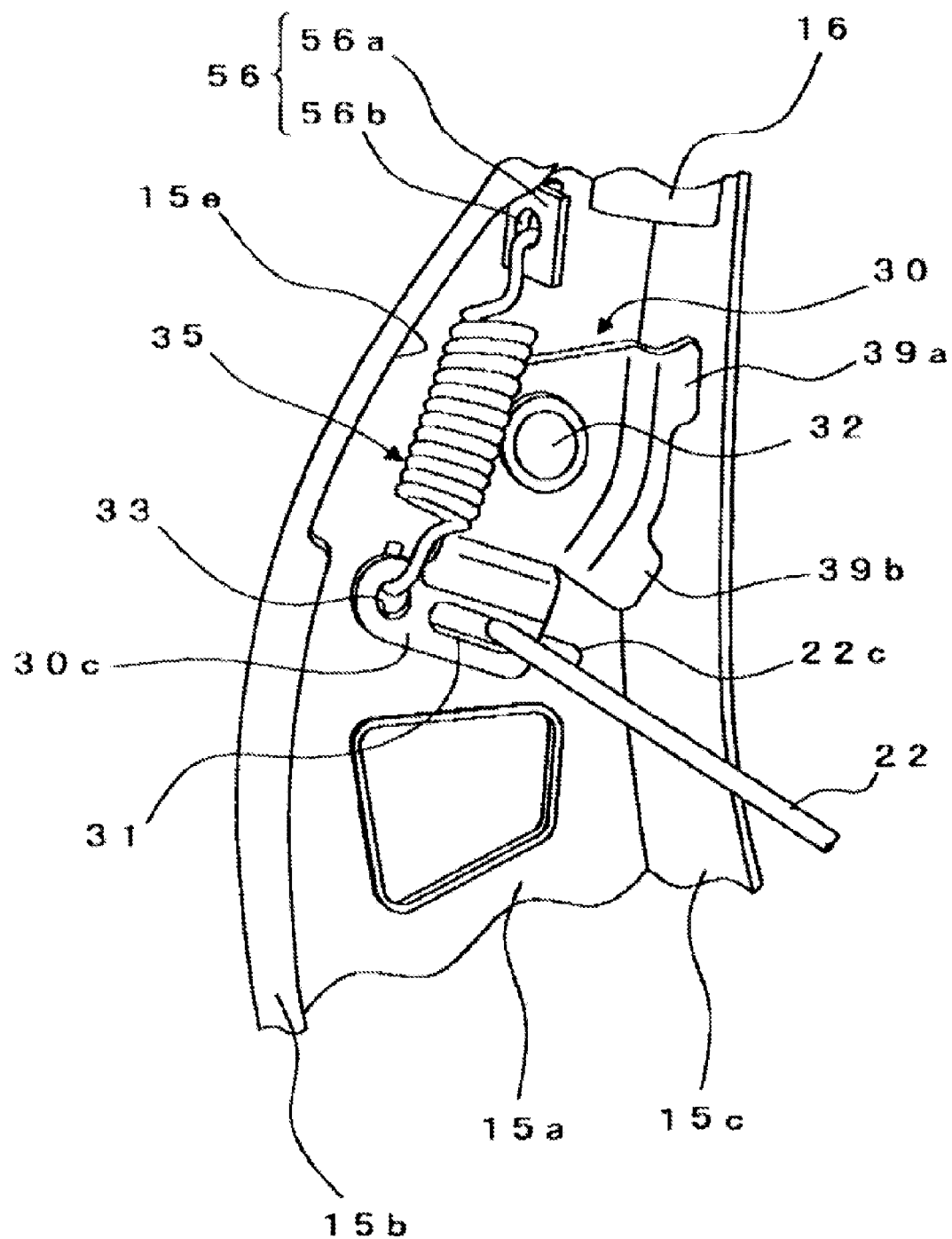
FIG. 15 is an enlarged perspective view similar to FIG. 6, showing another example.

In the example shown in FIG. 15, a vertical wall 56a of a mounting part 56 is formed by cutting and raising the side plate 15a of the side frame 15, and a locking hole 56 is formed in this vertical wall 56a.

By making the configuration such as shown in the above-described embodiment or any of the modifications thereof, when the tensile coil spring 35 serving as the urging element is disposed, the interference with other members including the shock reducing member is prevented, and the arrangement space of other members is secured. Therefore, the degree of freedom in designing can be secured, and additionally, the assembly of the tensile coil spring 35 is made easy.

Second Embodiment

FIGS. 16 to 20 show a second embodiment in accordance with the present invention. In this embodiment, the same symbols are applied to members, arrangements, and the like that are essentially the same as those in the first embodiment, and the explanation of these members, arrangements, and the like is omitted.

In this embodiment, the urging element(s) is disposed to be always located on the vehicle lower side of the rotating shaft of the shock reducing member during the time from before the rotating to after the rotating of the shock reducing member.

Figure 16:
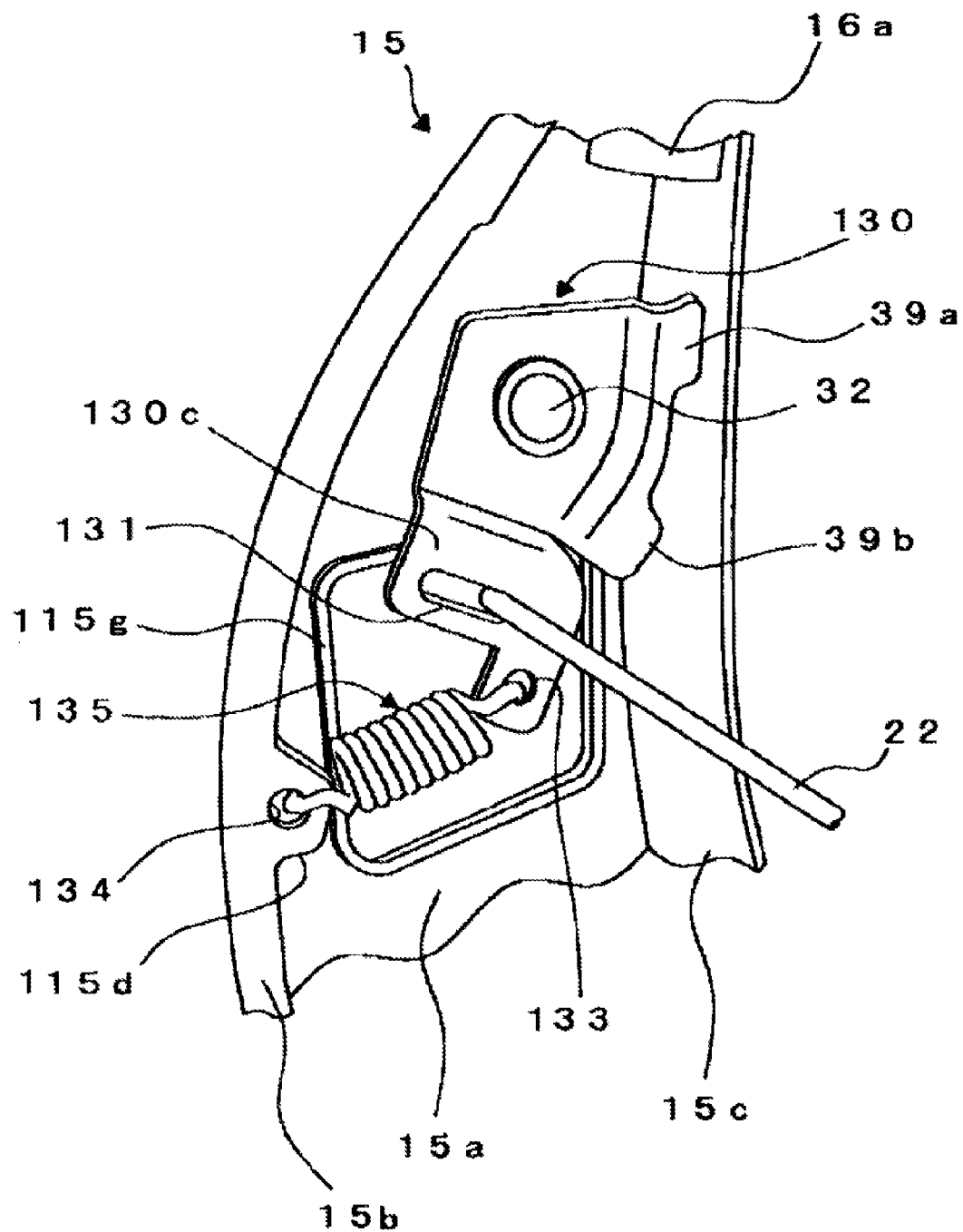
FIG. 16 is an enlarged perspective view showing the relationship between a shock reducing member and an urging element(s) in accordance with a second embodiment.
Figure 18:
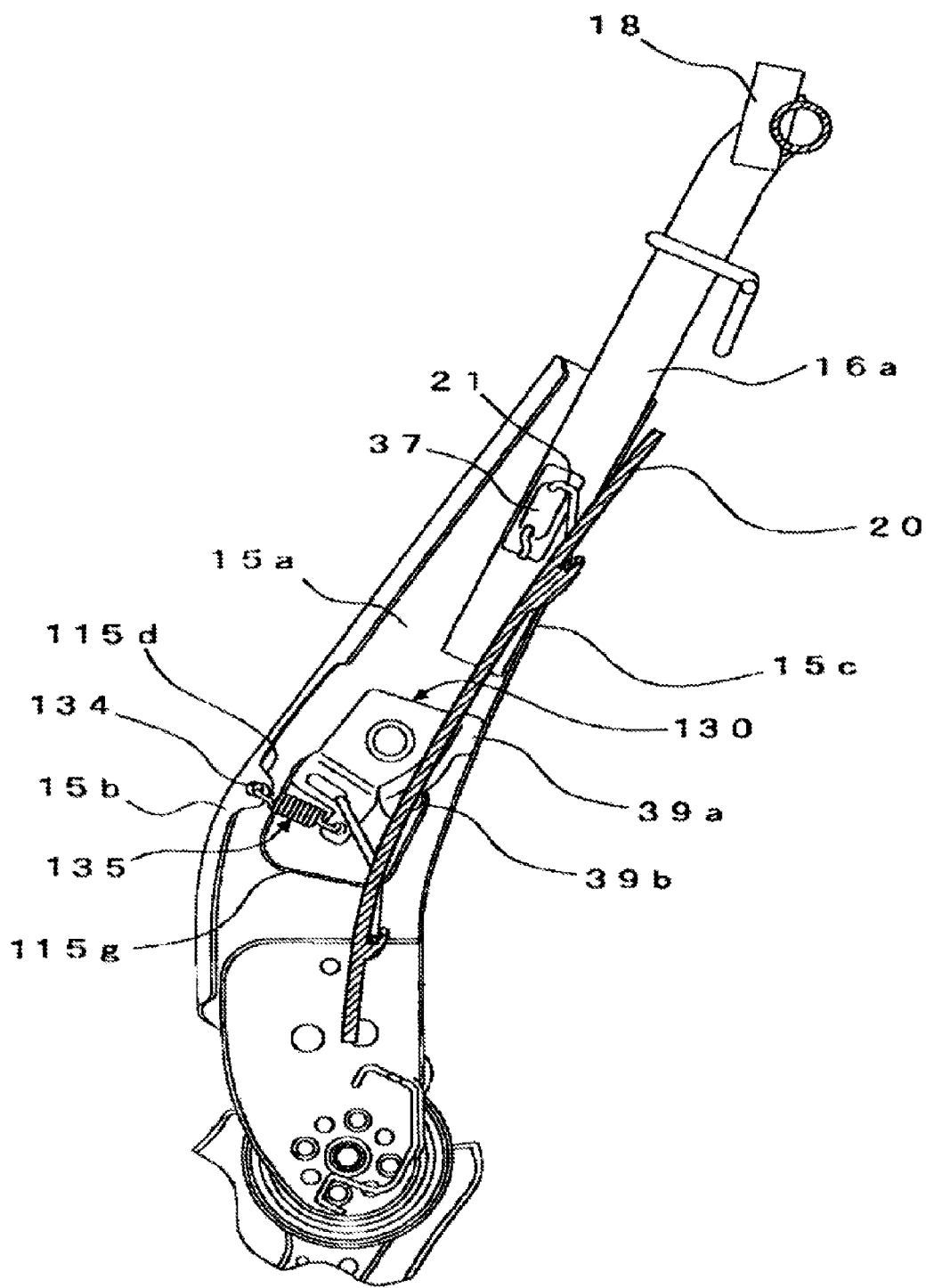
FIG. 18 is a schematic cross-sectional view of a seat back frame before the movement of a shock reducing member in accordance with a second embodiment.

As shown in FIGS. 16 and 18, in this embodiment, a projecting part 115d serving as an extension part projecting to the rear edge part 15c side is formed in the front edge part 15b at a position of the enlarged part in which the side frame 15 widens in the vehicle longitudinal direction (in this embodiment, a portion having the maximum width in the vehicle longitudinal direction). The projecting part 115d is formed with a locking hole 134 serving as a mounting part for mounting the end part of a tensile coil spring 135 serving as an urging element(s).

The side plate 15a is formed with an opening 115g at a position corresponding to a locking part 131 serving as a connecting part of the connecting member (the wire 22) in a rotating member 130, described later, and a locking hole 133 serving as a mounting part of the urging member (the tensile coil spring 135). By this opening 115g, when the connecting member and the urging element(s) are mounted to the rotating member 130 attached to the side frame 15, the side plate 15a does not become a hindrance, and the mounting work becomes easy, by which the workability is improved. Further, the mounting state can be checked through the opening 115g after mounting the connecting member and urging element(s), so that the mounting work can be performed with certainty.

In the embodiment shown in FIG. 6 as well, similarly, an opening can be provided at a position corresponding to the locking part 31 and the locking hole 33 of the side plate 15a. By doing this, similarly, the workability at the time when the connecting member and the urging element(s) are mounted to the rotating member 30 is improved.

Figure 17:
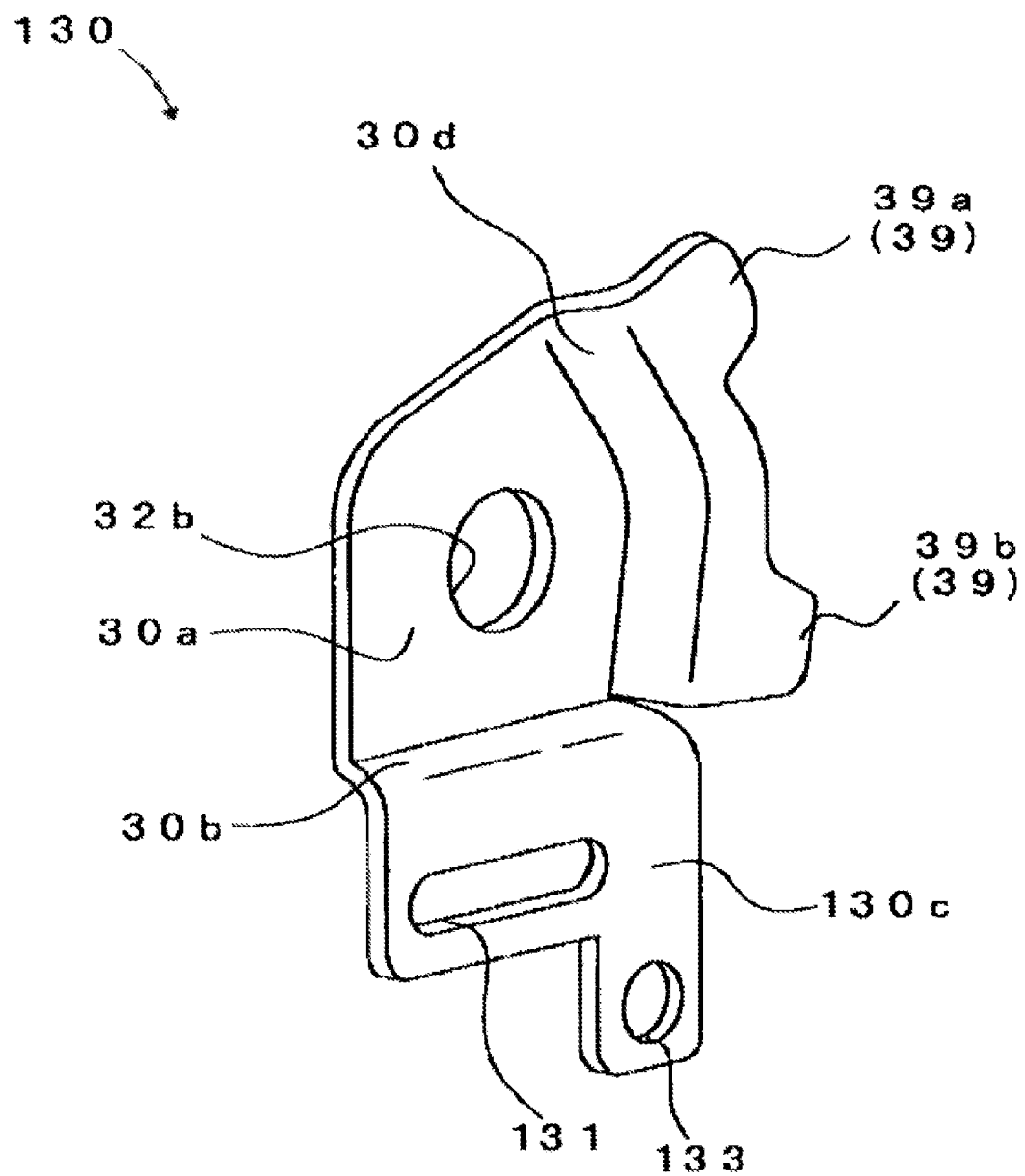
FIG. 17 is a perspective view of a shock reducing member in accordance with a second embodiment.

In the rotating member 130 of this embodiment, as shown in FIG. 17, a formation part 130c is formed so as to extend in the outer periphery direction from the first rising part 30b rising continuously from the outer periphery side of the base part 30a, and the side close to the stopper parts 39a and 39b, that is, the vehicle rear side thereof is formed in an inverse L shape extending further to the vehicle lower side.

The locking part 131 serving as the connecting part of the connecting member of this embodiment is formed as an elongated hole at a position close to the first rising part 30b on the vehicle front side of the formation part 130c.

The locking hole 133 serving as the mounting part of the urging element(s) of this embodiment is provided in a portion extending to the vehicle lower side on the vehicle rear side of the formation part 130c, and is formed so that the distance between the shaft hole 32b and the locking hole 133 is larger than the distance between the shaft hole 32b and the locking part 131. That is to say, as shown in FIG. 16, the locking hole 133 is formed at a position more distant from the shaft part 32 than the locking part 131 and on the vehicle lower side. By disposing the locking hole 133 in this manner, the locking hole 133 can be provided at a position at which the wire 22 does not interfere with the urging element(s) and the rear movement of the tensile coil spring 135 is not influenced.

The urging element in this embodiment is the tensile coil spring 135 formed by coiling a spring wire rod, and as shown in FIG. 16, is locked to the locking hole 133 in the rotating member 130 and the locking hole 134 in the projecting part 115d of the side frame 15. Thereby, the tensile coil spring 135 urges the rotating member 130 to the front side of the seat back frame 1. The tensile coil spring 135 is disposed to be located on the vehicle lower side of the shaft part 32.

In this embodiment, the locking hole 134 for the tensile coil spring 135 is formed in the enlarged part in which the width in the vehicle longitudinal direction of the side frame 15 is the greatest as described above, and the tensile coil spring 135 is disposed at a position corresponding to this enlarged part of the side frame 15. If the tensile coil spring 135 serving as the urging element is provided at the position corresponding to the portion in which the width in the vehicle longitudinal direction of the side frame 15 is the greatest as described above, the space efficiency for arranging the urging element is high, and the amount of sinking of the passenger is easily secured.

Figure 19:
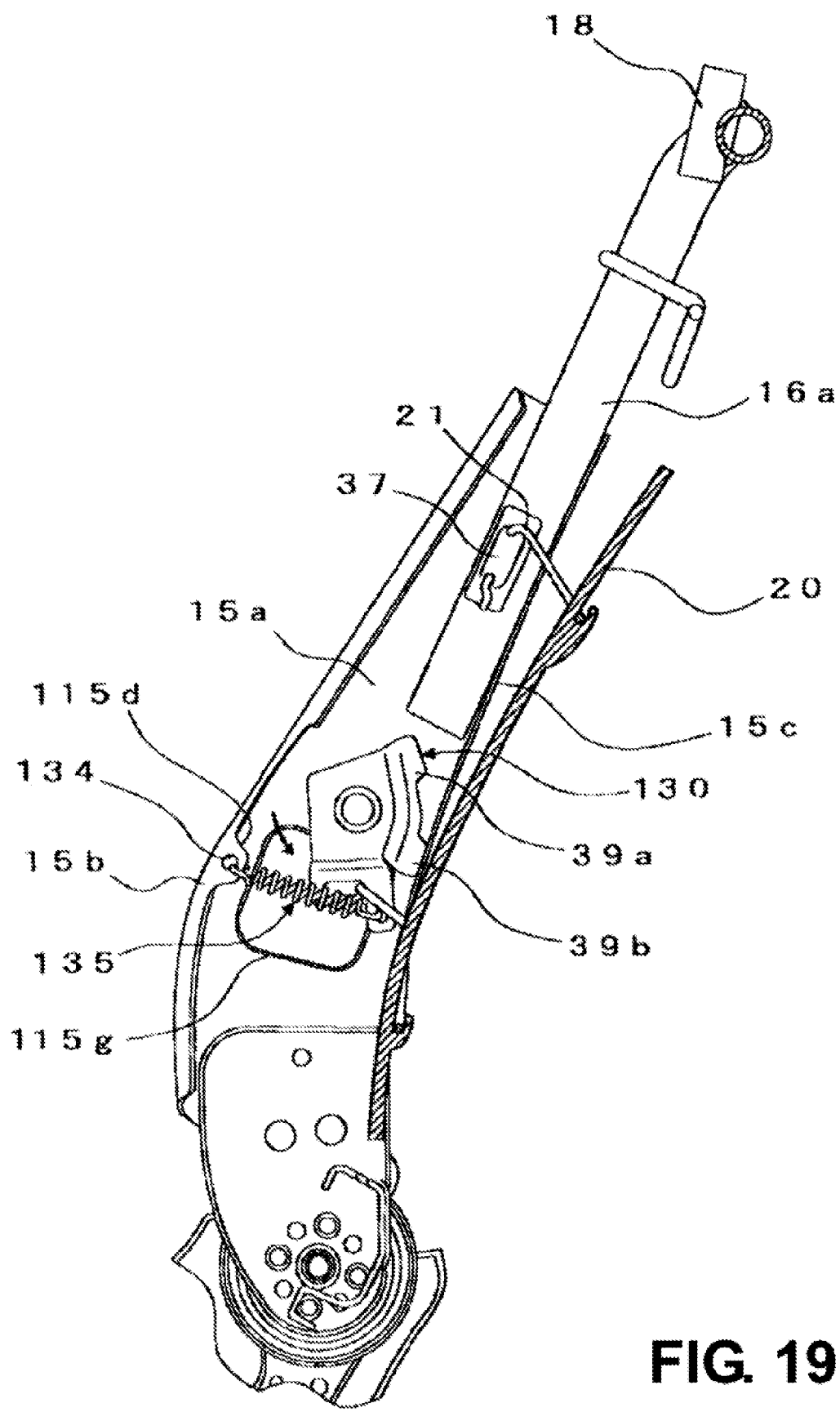
FIG. 19 is a schematic cross-sectional view of a seat back frame after the movement of a shock reducing member in accordance with a second member.
Figure 20A:
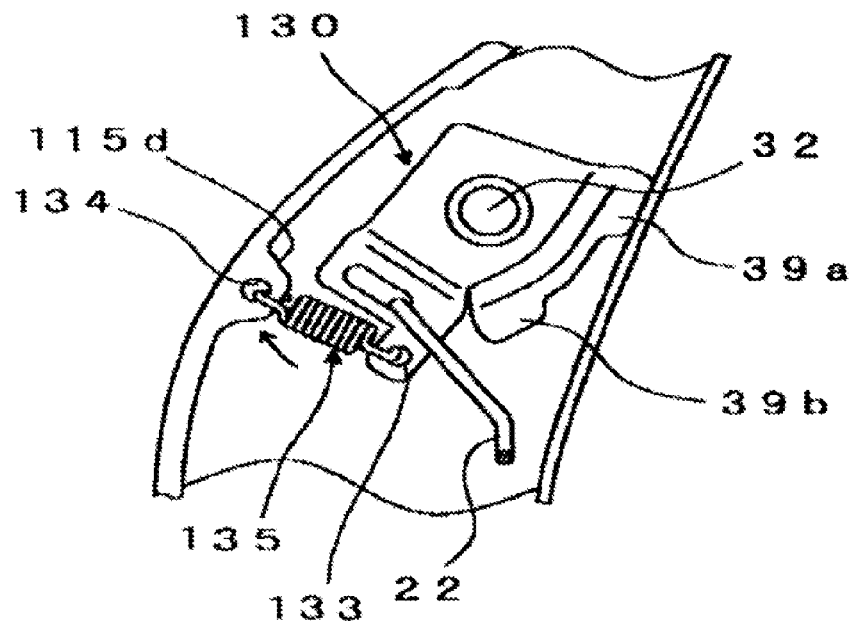
FIGS. 20A, B are explanatory side views showing a state of a shock reducing member before and during rear-end collision in accordance with a second embodiment.
Figure 20B:
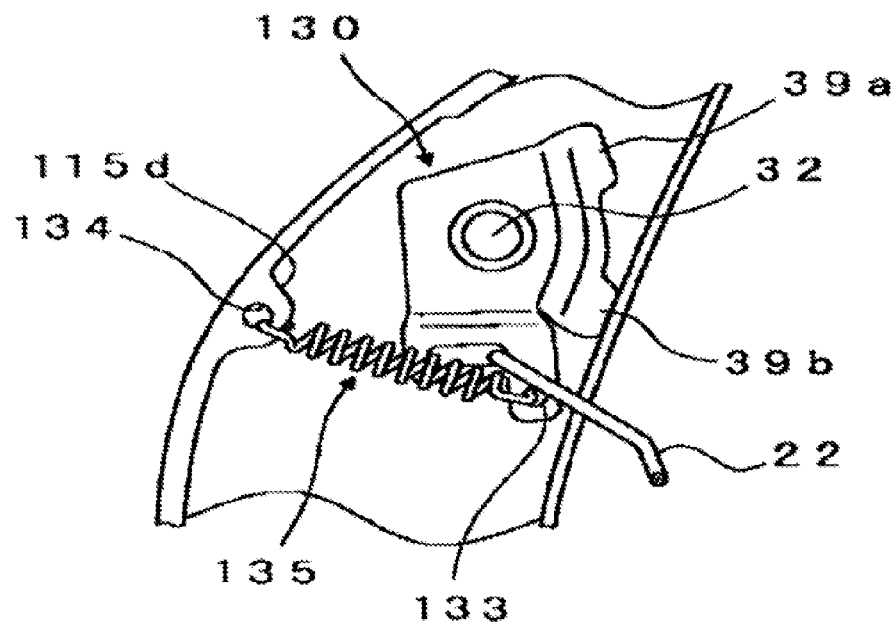

As for the rotating member 130 at the time of rear-end collision, FIG. 18 shows the rotating member 130 before rotating, FIG. 19 shows the rotating member 130 after rotating, and in FIGS. 20A, B, FIG. 20A shows the state before rear-end collision and FIG. 20B shows the state after rear-end collision. Hereunder, the rotating characteristics of the rotating member 130 at the time of rear-end collision are explained with reference to FIGS. 18 to 20.

At the initial position before rotating of the rotating member 130, one end part of the tensile coil spring 135 is locked to the locking hole 133 formed in the rotating member 130, and the other end part thereof is locked to the locking hole 134 formed in the projecting part 115d of the side frame 15. The tensile coil spring 135 is disposed to be located on the vehicle lower side of the shaft part 32, and the lower part of the rotating member 130 is urged to the vehicle front side.

Specifically, in the initial state, the tensile coil spring 135 somewhat extends, and thereby the rotating member 130 is urged to the rotating direction indicated by an arrow mark shown in FIG. 20A by the spring force of the tensile coil spring 135, and the connecting member (the wire 22) connected to the rotating member 130 is urged to the front side. At this time, the stopper 39a of the rotate inhibiting part 39 comes into contact with the rear edge part 15c of the side frame 15 to inhibit the rotating member 130 from being rotated in the arrow-marked direction by the tensile coil spring 135.

When a tension not lower than the predetermined value is produced in the wire 22 by rear-end collision, and the rotating member 130 begins to rotate against the urging force of the tensile coil spring 35, the tensile coil spring 35 extends, and the locking hole 133 provided in the rotating member 130 moves to the rear while rotating around the rotate center of the shaft part 32. The rotating member 130 is rotated until the stopper part 39b of the rotate inhibiting part 39 comes into contact with the rear edge part 15c of the side frame 15 to inhibit the rotating of the rotating member 130. Thereby, the pressure receiving member 20 is moved significantly to the rear of the seat frame 1 from the state shown in FIG. 18 to the state shown in FIG. 19, so that the passenger can be allowed to sink significantly in the seat back S1.

In this embodiment, since the tensile coil spring 135 is always located on the vehicle lower side of the rotate center during the time from before the rotating to after the rotating of the rotating member 130, at the time of rotating, the rotating member 130 and the tensile coil spring 135 do not interfere with each other.

Even if the rotating member 130 and the tensile coil spring 135 are configured in this manner, if an impact load is applied to the pressure receiving member 20, the rotating member 130 can be rotated to move the pressure receiving member 20 sufficiently to the rear. Therefore, when a rear-end collision occurs, the passenger can be allowed to sink in the cushion pad 1a of the seat back S1 with certainty and efficiently.

Third Embodiment

FIGS. 21 to 24 show a third embodiment in accordance with the present invention. In this embodiment, the same symbols are applied to members, arrangements, and the like that are essentially the same as those in the first embodiment, and the explanation of these members, arrangements, and the like is omitted.

In this embodiment, a torsion spring 235 is used as an urging element.

Figure 21:
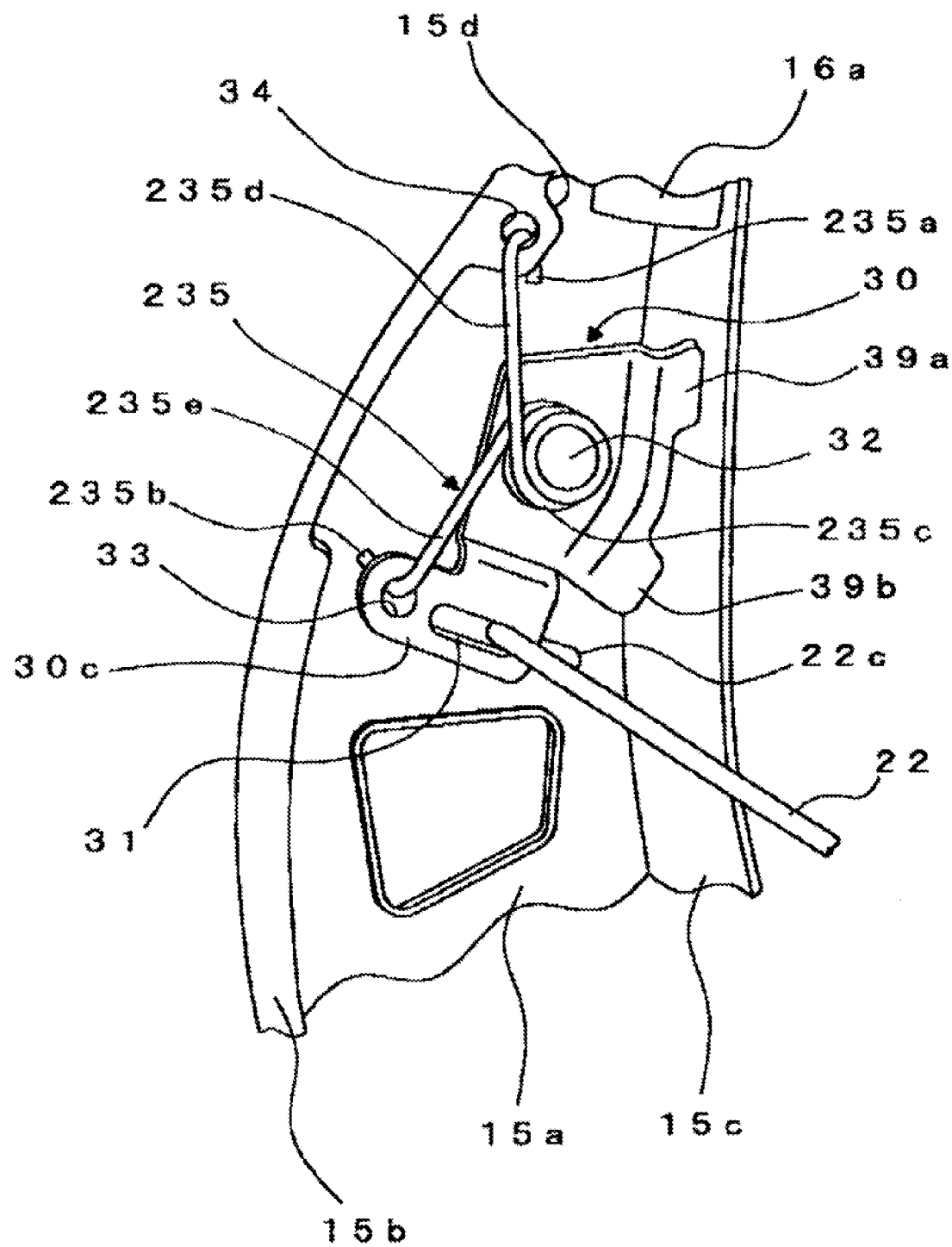
FIG. 21 is an enlarged perspective view showing the relationship between a shock reducing member and an urging element(s) in accordance with a third embodiment.

As shown in FIG. 21, the torsion spring 235 is configured so that an engagement part (an upper spring part) 235d is formed to extend to the vehicle upper side of the shaft part 32 from the one end side of a coil part 235c formed by coiling a spring wire rod, and an engagement part (a lower spring part) 235e is formed so as to extend to the vehicle lower side of the shaft part 32 from the other end side thereof.

For the torsion spring 235, the coil part 235c is disposed at the outer periphery of the rotating shaft (the shaft part 32) of the rotating member 30, and in both end parts of the engagement parts 235d and 235e, hook parts 235a and 235b for locking the engagement parts 235d and 235e are formed, respectively, one hooking part being bent at an acute angle, and the other hooking part being bent approximately at right angles. The torsion spring 235 is configured so that the hook parts 235a and 235b are locked to the locking hole 34 in the projecting part 15d of the side frame 15 and the locking hole 33 in the rotating member 30, respectively, by which the rotating member 30 is urged to the front side of the seat back frame 1. In this embodiment, the shaft part 32 is disposed in a portion corresponding to the side of the waist of the passenger in the state in which the passenger is seated.

As described below, if an impact load not lower than the predetermined value is applied to the pressure receiving member 20, a rearward tension is produced in the wire 22, and the rotating member 30 is rotated. However, at the time of rotating of the rotating member 30, a gap between the coil part 235c of the torsion spring 235 and the shaft part 32 decreases, and a frictional force is created, so that an effect of inhibiting the rotating of the rotating member 30 is achieved.

In this embodiment, as shown in FIG. 21, the engagement part 235d serving as the upper spring part extending to the vehicle upper side of the shaft part 32 is formed to be located on the seat inside of the engagement part 235e serving as the lower spring part extending to the vehicle lower side of the shaft part 32. However, the configuration can be made such that the engagement part 235d on the upper side (the upper spring part) is disposed on the seat outside of the engagement part 235e on the lower side (the lower spring part). Since the shaft part 32 of the rotating member 30 of this embodiment is disposed at the position corresponding to the side of the waist of the passenger, if the upper spring part is disposed on the seat outside of the lower spring part, that is, on the side on which the upper spring part separates from the passenger, the interference of the passenger with the upper spring part that is prone to interfere with the passenger can preferably be restrained.

The torsion spring 235 of this embodiment is configured so that the lengths of the engagement part 235d on the upper side (the upper spring part) and the engagement part 235e on the lower side (the lower spring part) are approximately equal to each other. However, if the torsion spring 235 is configured so that the lengths of the engagement part 235d on the upper side and the engagement part 235e on the lower side are different from each other (one is long, and the other is short), when the torsion spring 235 is mounted, a mistake in the mounting direction can be prevented, so that the mounting workability is improved.

Also, if the engagement part 235d on the upper side (the upper spring part) and the engagement part 235e on the lower side (the lower spring part) are made symmetrical in shape, when the torsion spring 235 is mounted, a mistake in the up-and-down direction can be prevented, so that the mounting workability is improved.

Figure 22:
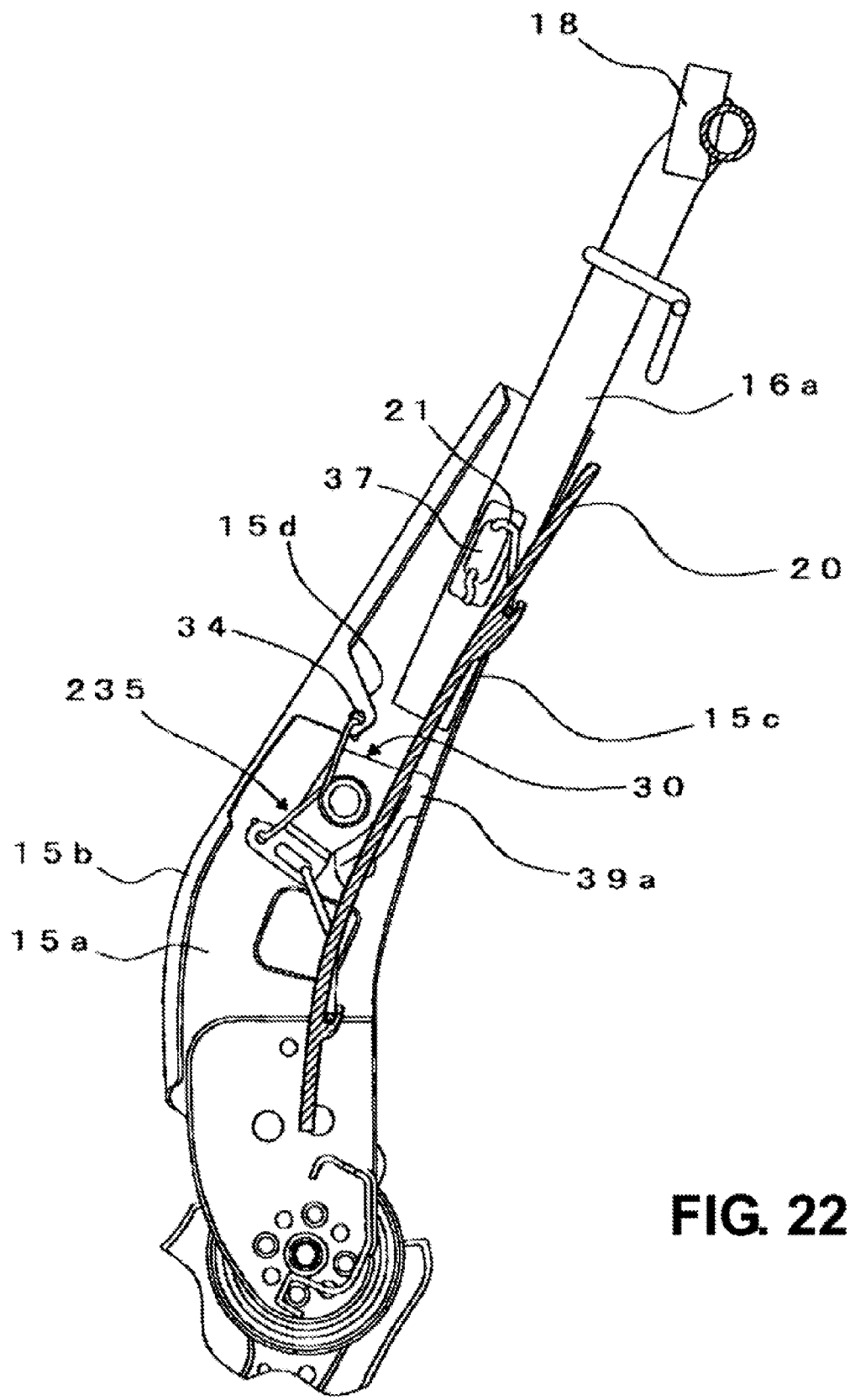
FIG. 22 is a schematic cross-sectional view of a seat back frame before the movement of a shock reducing member in accordance with a third embodiment.
Figure 23:
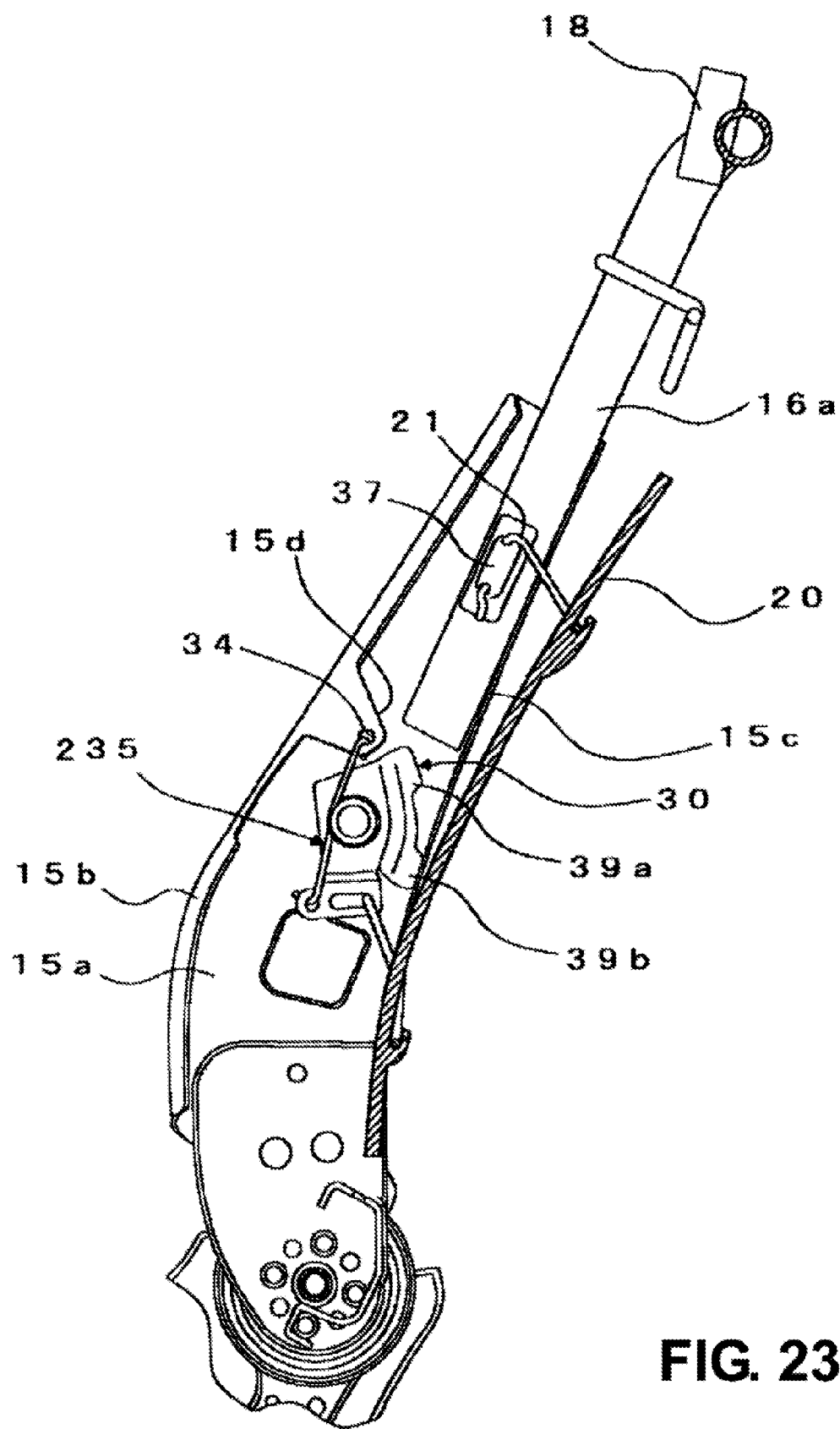
FIG. 23 is a schematic cross-sectional view of a seat back frame after the movement of a shock reducing member in accordance with a third member.
Figure 24A:
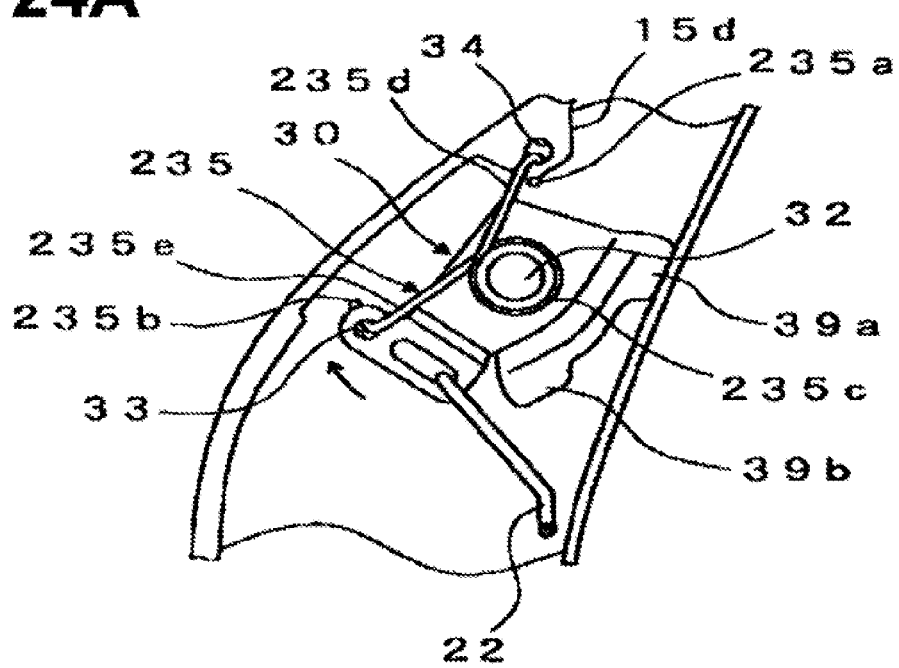
FIGS. 24A, B are explanatory side views showing a state of a shock reducing member before and during rear-end collision in accordance with a third embodiment.
Figure 24B:
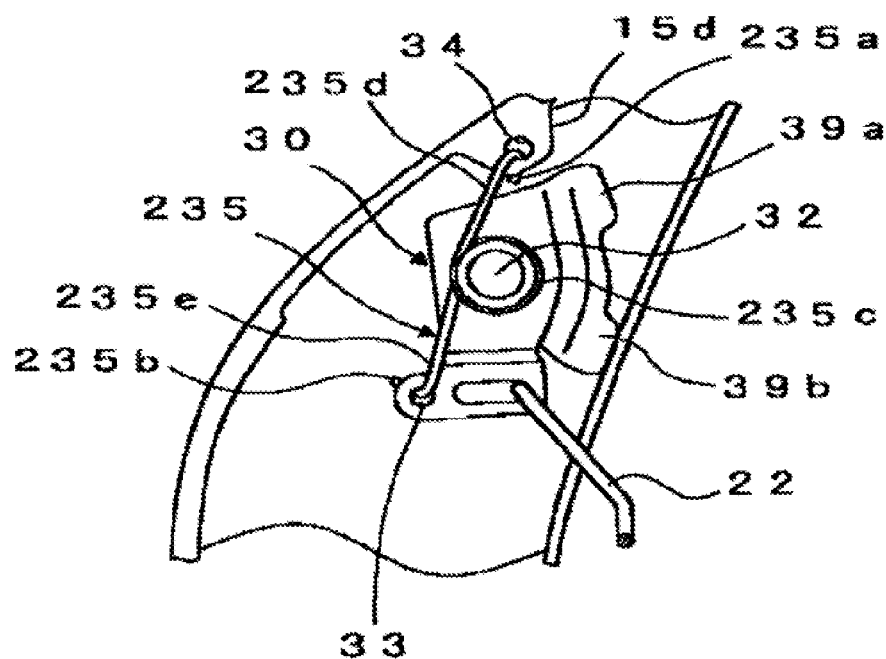

As for the rotating member 30 at the time of rear-end collision, FIG. 22 shows the rotating member 30 before rotating, FIG. 23 shows the rotating member 30 after rotating, and in FIGS. 24A, B, FIG. 24A shows the state before rear-end collision and FIG. 24B shows the state during rear-end collision. Hereunder, the rotating characteristics of the rotating member 30 at the time of rear-end collision are explained with reference to FIGS. 22 to 24B.

At the initial position before rotating of the rotating member 30, one end part of the torsion spring 235 is locked to the locking hole 33 on the rotating member 30 side, and the other end part thereof is locked to the locking hole 34 formed in the projecting part 15d of the side frame 15. The torsion spring 235 urges the rotating member 30 to the vehicle front.

Specifically, in the initial state, the torsion spring 235 somewhat exerts a force in the winding direction, and thereby the rotating member 30 is urged to the rotating direction indicated by an arrow mark shown in FIG. 24A by the spring force, and the connecting member (the wire 22) connected to the rotating member 30 is urged to the front side. At this time, the stopper 39a of the rotate inhibiting part 39 comes into contact with the rear edge part 15c of the side frame 15 to inhibit the rotating member 30 from being rotated in the arrow-marked direction by the tensile coil spring 135.

When a tension not lower than the predetermined value is produced in the wire 22 by rear-end collision, and the rotating member 30 begins to rotate against the urging force of the torsion spring 235, the torsion spring 235 exerts a force in the winding direction, and the locking hole 33 provided in the rotating member 30 moves to the rear while rotating around the rotate center of the shaft part 32. The rotating member 30 is rotated until the stopper part 39b of the rotate inhibiting part 39 comes into contact with the rear edge part 15c of the side frame 15 to inhibit the rotating of the rotating member 30. Thereby, the pressure receiving member 20 is moved greatly to the rear of the seat frame 1 from the state shown in FIG. 22 to the state shown in FIG. 23, so that the passenger can be allowed to sink significantly in the seat back S1.

Even if the configuration is made such that the torsion spring 235 is used as the urging element, if an impact load is applied to the pressure receiving member 20, the rotating member 130 can be rotated to move the pressure receiving member 20 sufficiently to the rear. Therefore, when a rear-end collision occurs, the passenger can be allowed to sink in the cushion pad 1a of the seat back S1 with certainty and efficiently.

FIGS. 25 to 28 are enlarged explanatory views similar to FIG. 21, showing examples in which the torsion spring 235 or the rotating member 30 of this embodiment is different.

Figure 25:
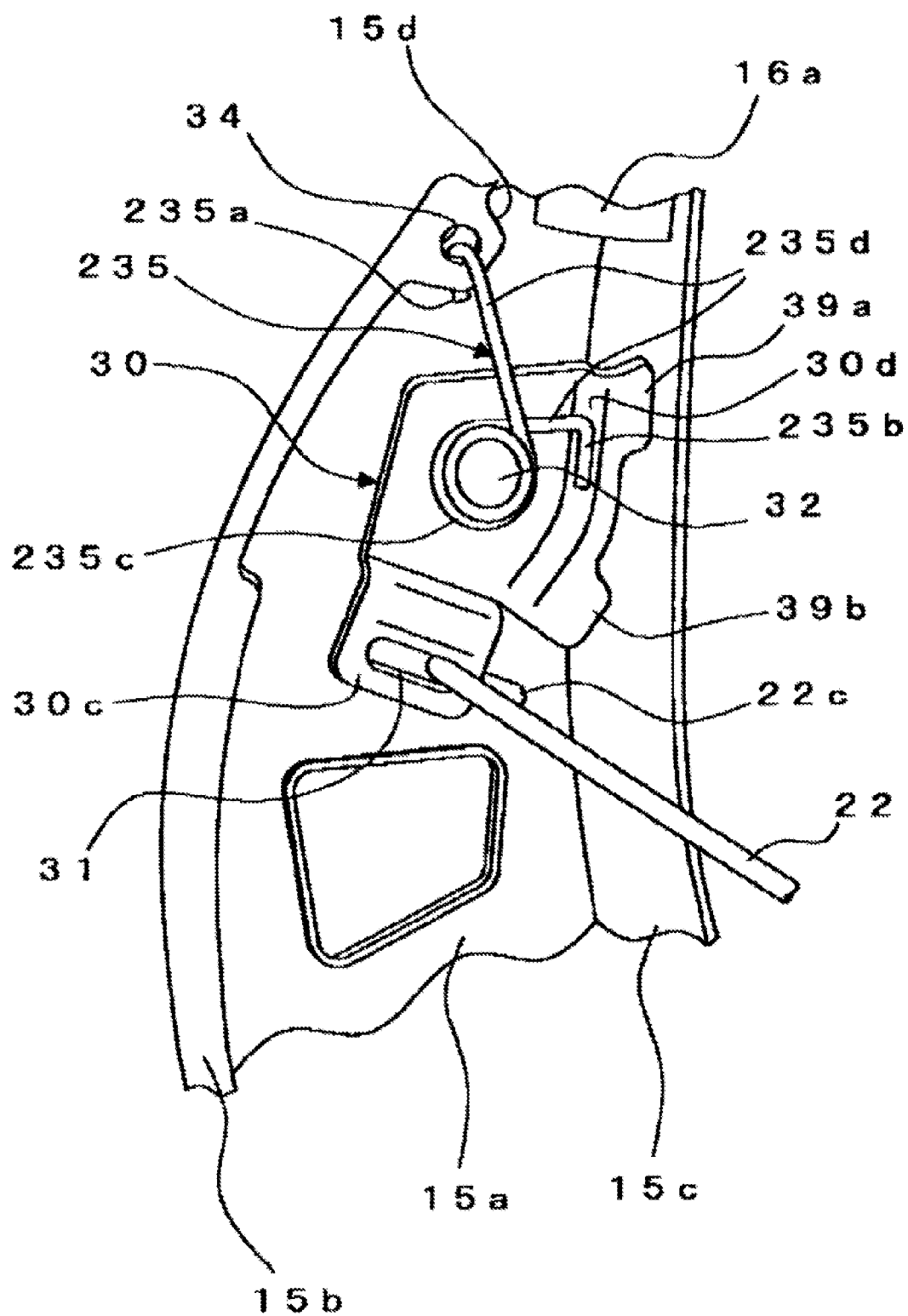
FIG. 25 is an enlarged perspective view similar to FIG. 21, showing another example of a third embodiment.

In the example shown in FIG. 25, the hook part 235b side that is a portion locked to the rotating member 30 serving as the shock reducing member of the torsion spring 235 is located on the vehicle rear side of the shaft part 32 of the rotating member 30. As this example, as shown in FIG. 25, the hook part 235b side is mounted by shortening the engagement part 235d on the rotating member 30 side and by engaging the hook part 235b with the second rising part 30d of the rotating member 30 to regulate the hook part 235b.

By this configuration, the torsion spring 235 can be disposed so as to overlap on the rotating member 30, so that the arrangement region for arranging other members and the like of the side part, which is generally a small region, can be secured, and additionally, the torsion spring 235 and the rotating member 30 can be decreased in size.

Also, the locking hole 33 need not be formed in the rotating member 30, and therefore the rotating member 30 can be formed to be small. Since the locking hole 33 is not formed, not only the interference with the arrangement of other members and the like can be prevented, but also the region for other members can be secured.

Figure 26:
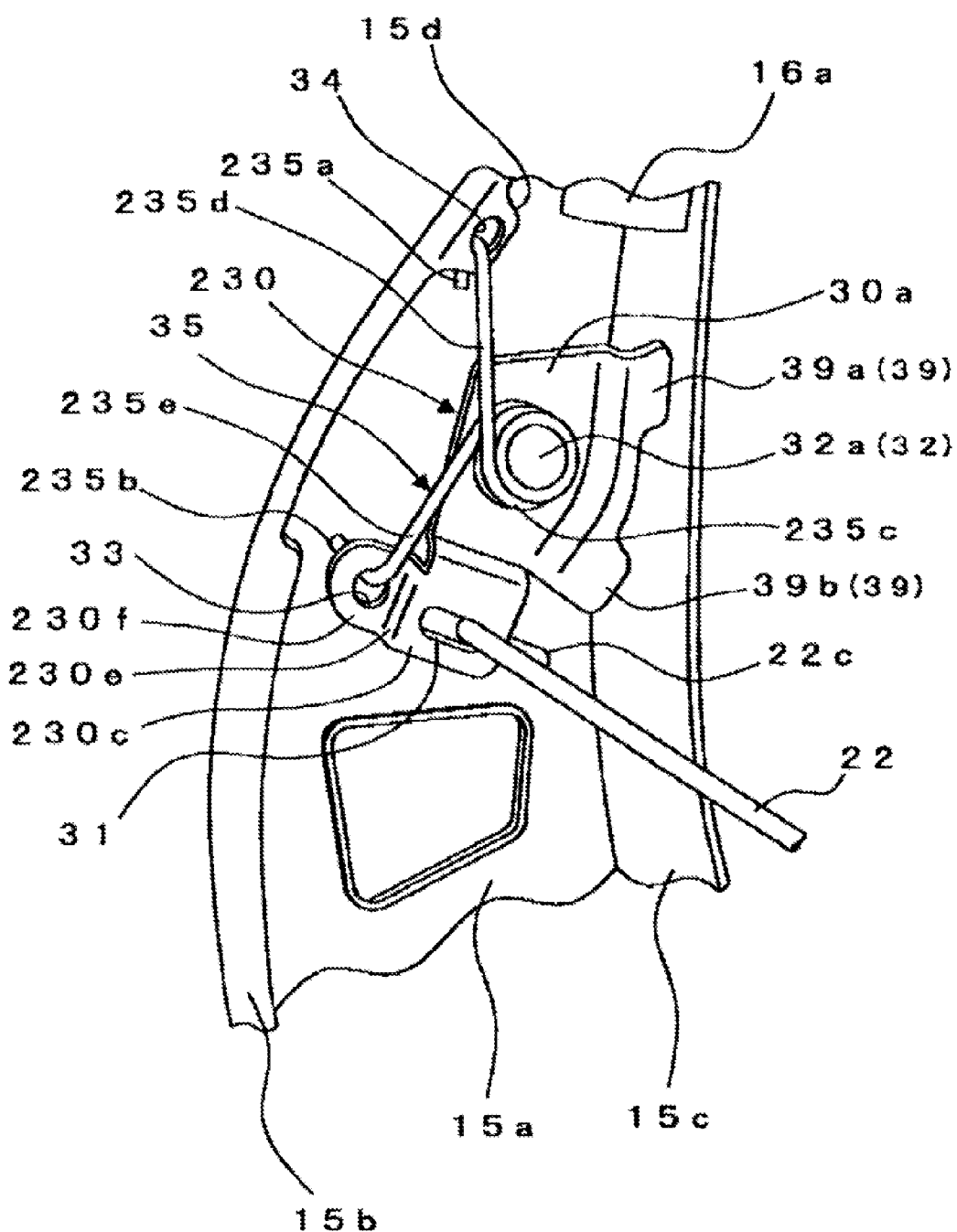
FIG. 26 is an enlarged perspective view similar to FIG. 21, showing another example of a third embodiment.

In the example shown in FIG. 26, in a rotating member 230, the locking part 31 for the wire 22 is formed in a formation part 230c serving as a raised part that rises to the seat inside from the base part 30a and is formed to be higher in the inside direction than the base part 30a.

The rotating member 230 of this example is formed with a lowering part 230e continuous with the vehicle front side of the formation part 230c so that the lowering part 230e is directed to the side plate 15a side of the side frame 15, and is further formed with a formation part 230f that is continuous with the lowering part 230e and forms a plane substantially parallel with the base part 30a. The formation part 230f is formed with the locking hole 33 for the torsion spring 235. The formation part 230f is formed between the base part 30a and the formation part 230c in the direction of separation from the side plate 15a of the side frame 15, that is, in the seat inside direction. Further, the formation part 230f is formed to be located in the side plate 15a direction, that is, on the seat outside of the stopper parts 39a and 39b of the rotate inhibiting part 39 serving as a raised part that rises to the seat inside from the base part 30a and is formed to be higher than the base part 30a.

In this example, the projecting part 15d formed in the front edge part 15b of the side frame 15 is bent to the side plate 15a direction, that is, to the seat outside direction from the front edge part 15b, and the locking hole 34 for the torsion spring 235 is formed in the projecting part 15d. The projecting part 15d is bent to the seat outside direction so that the engagement position of the torsion spring 235 in the locking hole 34 is located to the side plate 15a direction, that is, on the seat outside of the formation part (raised part) 230c of the rotating member 230 and the stopper parts 39a and 39b of the rotate inhibiting part 39 (raised part).

The hook parts 235b and 235a of the torsion spring 235 are locked to the locking holes 33 and 34 configured as described above, respectively, and further the shaft member 32a of the shaft part 32 is located on the seat outside of the formation part (raised part) 230c of the rotating member 230 and the stopper parts 39a and 39b of the rotate inhibiting part 39 (raised part) 39. Thus, the torsion spring 235 is disposed on the seat outside of the end part (end face) on the inside of the portions in which the rotating member 230 rises to the seat inside (the formation part 230c, the stopper parts 39a and 39b), that is, on the side separating from the passenger, so that the interference of the torsion spring 235 with the passenger can be avoided.

Figure 27:
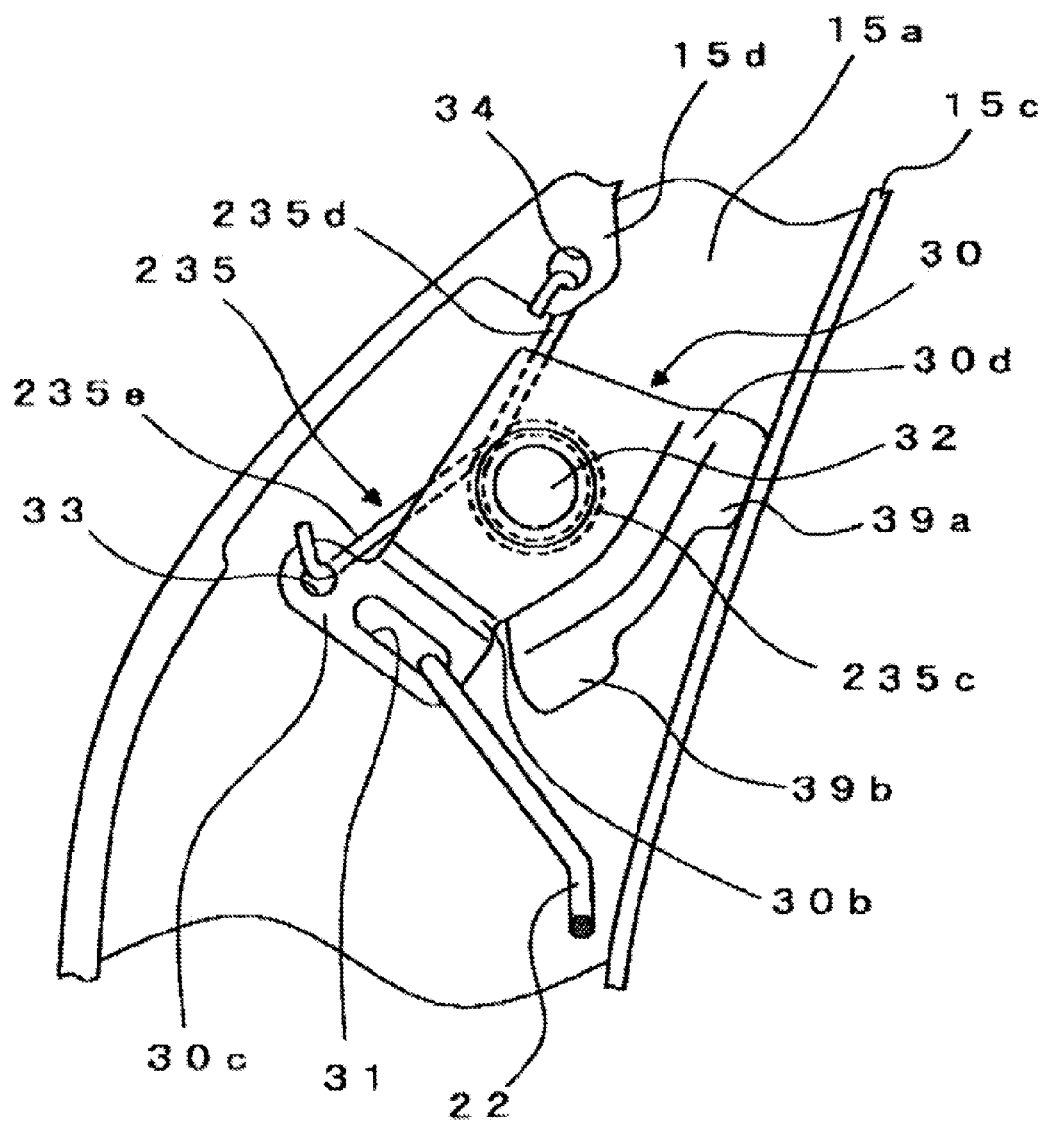
FIG. 27 is an enlarged side view similar to FIG. 21, showing another example of a third embodiment.

In the example shown in FIG. 27, the coil part 235c of the torsion spring 235 is disposed at the outer periphery of the shaft part 32 in a portion located between the side plate 15a of the side frame 15 and the rotating member 30, and the torsion spring 235 is disposed between the side frame 15 and the rotating member 30. If the torsion spring 235 is disposed by effectively utilizing the space between the side frame 15 and the rotating member 30 as described above, the interference of the torsion spring 235 and the rotating member 30 with the passenger can be prevented with certainty.

In the example shown in FIG. 27, an example in which the coil part 235c of the torsion spring 235 is disposed at the outer periphery of the shaft part 32 located between the side plate 15a and the rotating member 30 has been shown. However, if the coil part 235c is disposed around a rising (height) portion of the first rising part 30b continuous with the formation part 30c and the second rising part 30d continuous with the stopper parts 39a and 39b, the space of the rising portion can be utilized effectively, and the rotating member 30 can be disposed closer to the side plate 15a. Therefore, the configuration can be made such that the torsion spring 235 and the rotating member 30 are kept away from the passenger. In this case, if the first rising part 30b and the second rising part 30d of the rotating member 30 are formed in a shape following an arc approximately concentric with the outer periphery of the shaft part 32, the coil part 235c of the torsion spring 235 can be made easy to dispose.

Figure 28:
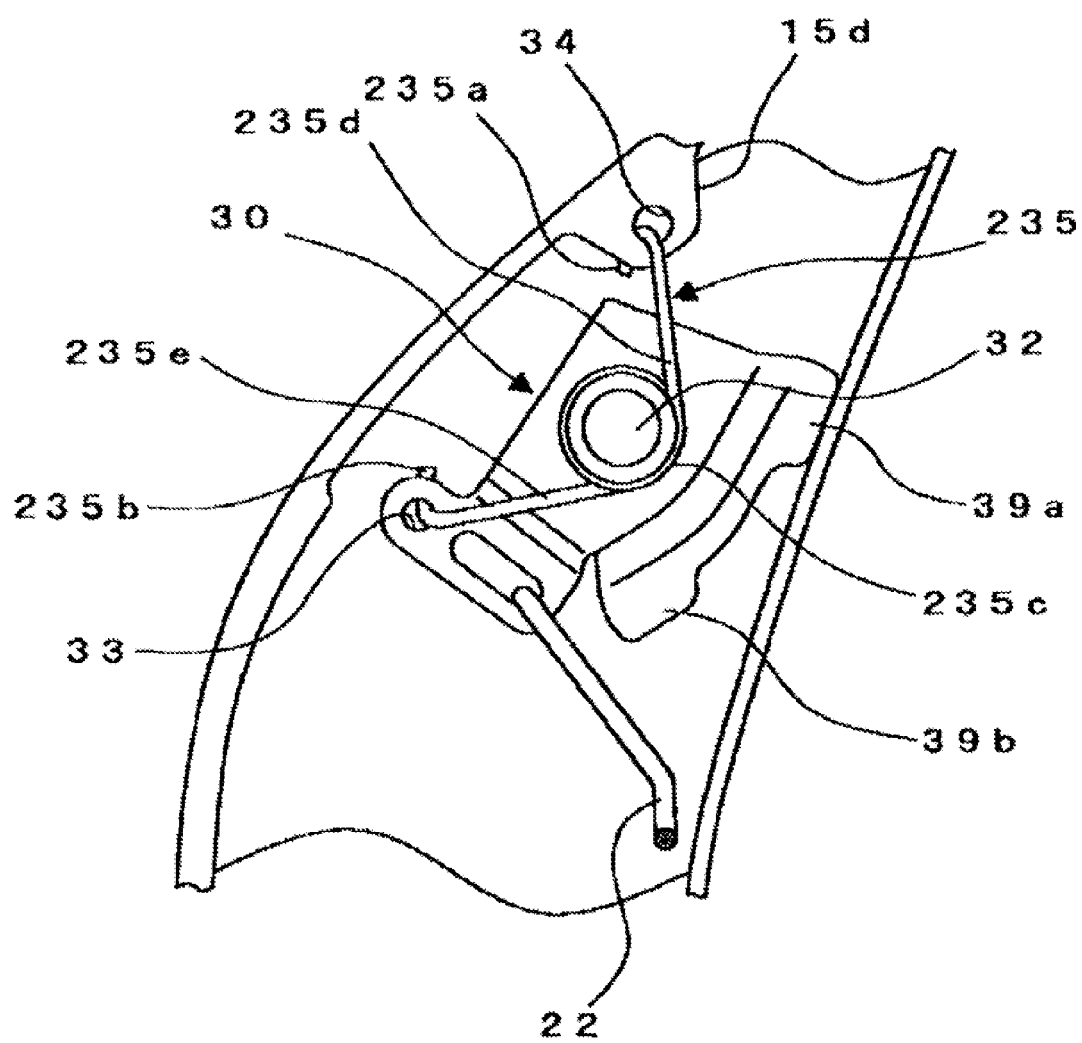
FIG. 28 is an enlarged side view similar to FIG. 21, showing another example of a third embodiment.

In the example shown in FIG. 28, the torsion spring 235 is disposed at an orientation opposed to that in the above-described embodiment in the vehicle longitudinal direction. Specifically, the engagement parts 235d and 235e extend upward and downward from the vehicle rear side of the coil part 235c mounted at the outer periphery of the shaft part 32, and are locked to the locking holes 34 and 33, respectively. If the torsion spring 235 is disposed in this manner, a tension not lower than the predetermined value is produced via the wire 22. Therefore, as the rotating member 30 rotates to the vehicle rear, the gap between the coil part 235c of the torsion spring 235 and the shaft part 32 widens slightly, and the resistance decreases, so that the rotating member 30 rotates smoothly.

By configuring the urging element by using the torsion spring as described above in this example and modified examples thereof, the urging element can be disposed in a compact manner. Therefore, the degree of freedom in designing can be secured, and additionally, the interference of the urging element with the passenger at the time of rear-end collision can be restrained.

Fourth Embodiment

FIGS. 29 to 33 show a fourth embodiment in accordance with the present invention. In this embodiment, the same symbols are applied to members, arrangements, and the like that are essentially the same as those in the first embodiment, and the explanation of these members, arrangements, and the like is omitted.

In this embodiment, a plurality of urging elements for urging the shock reducing member to the vehicle front are provided.

Figure 29:
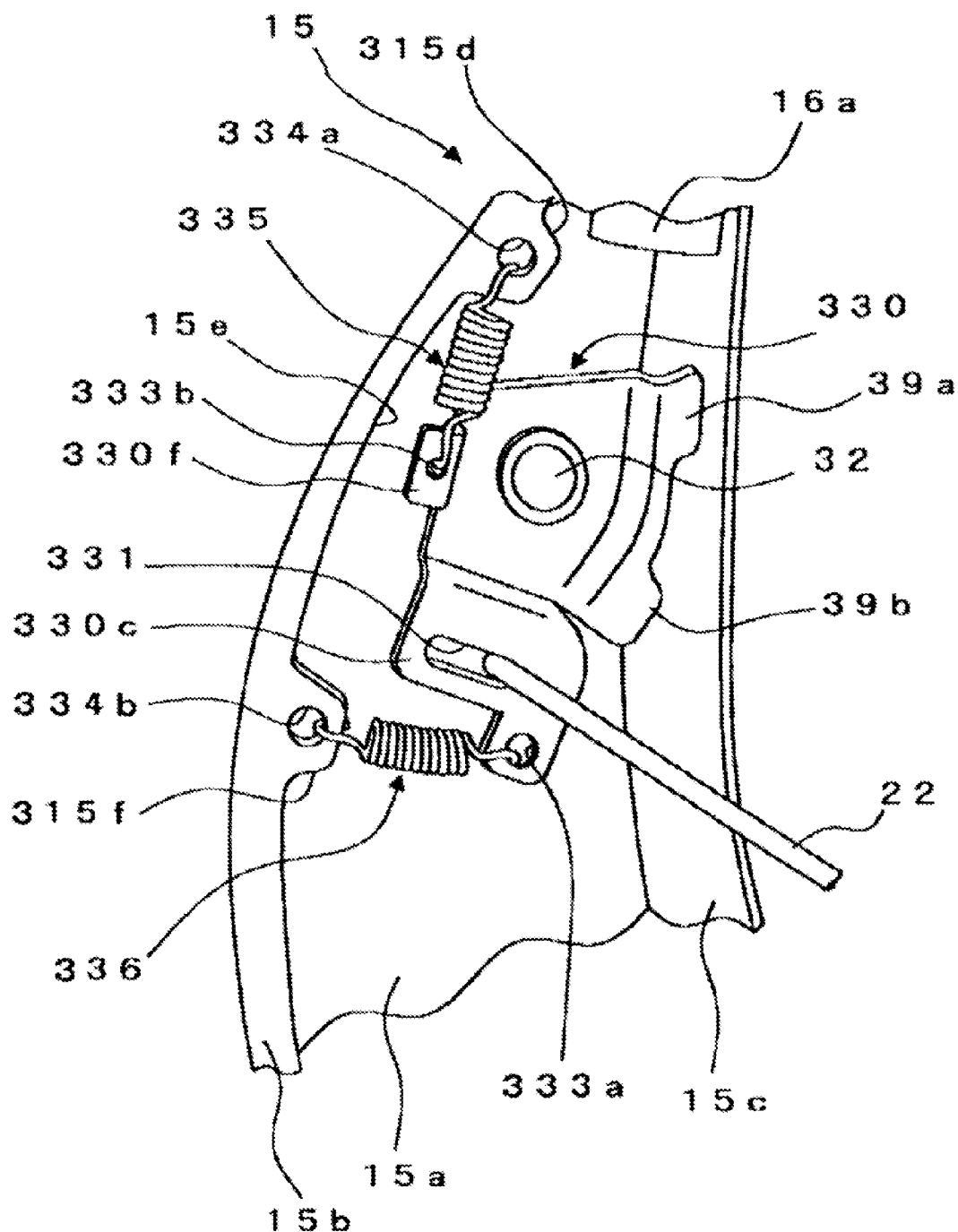
FIG. 29 is an enlarged perspective view showing the relationship between a shock reducing member and an urging element(s) in accordance with a fourth embodiment.

As shown in FIG. 29, in this embodiment, projecting parts 315d and 315f projecting to the rear edge part 15c direction are formed in the front edge part 15b of the side frame 15, and the projecting parts 315d and 315f are formed with locking holes 334a and 334b serving as mounting parts for locking the urging elements, respectively.

As shown in FIG. 29, a rotating member 330 of this embodiment is configured to be connected to tensile coil springs 335 and 336 serving as a plurality of urging elements for urging the wire 22 serving as the connecting member to urge the pressure receiving member 20 to the front side of the seat back frame 1 via the wire 22.

The rotating member 330 of this embodiment includes the rotatable shaft part 32, a locking part 331 serving as a connecting part of the connecting member formed at a position at a predetermined distance from the shaft part 32, locking holes 333a and 333b serving as mounting parts for the plurality of urging elements, and the rotate inhibiting part 39 (the stopper parts 39a and 39b) for inhibiting the rotating.

Figure 30:
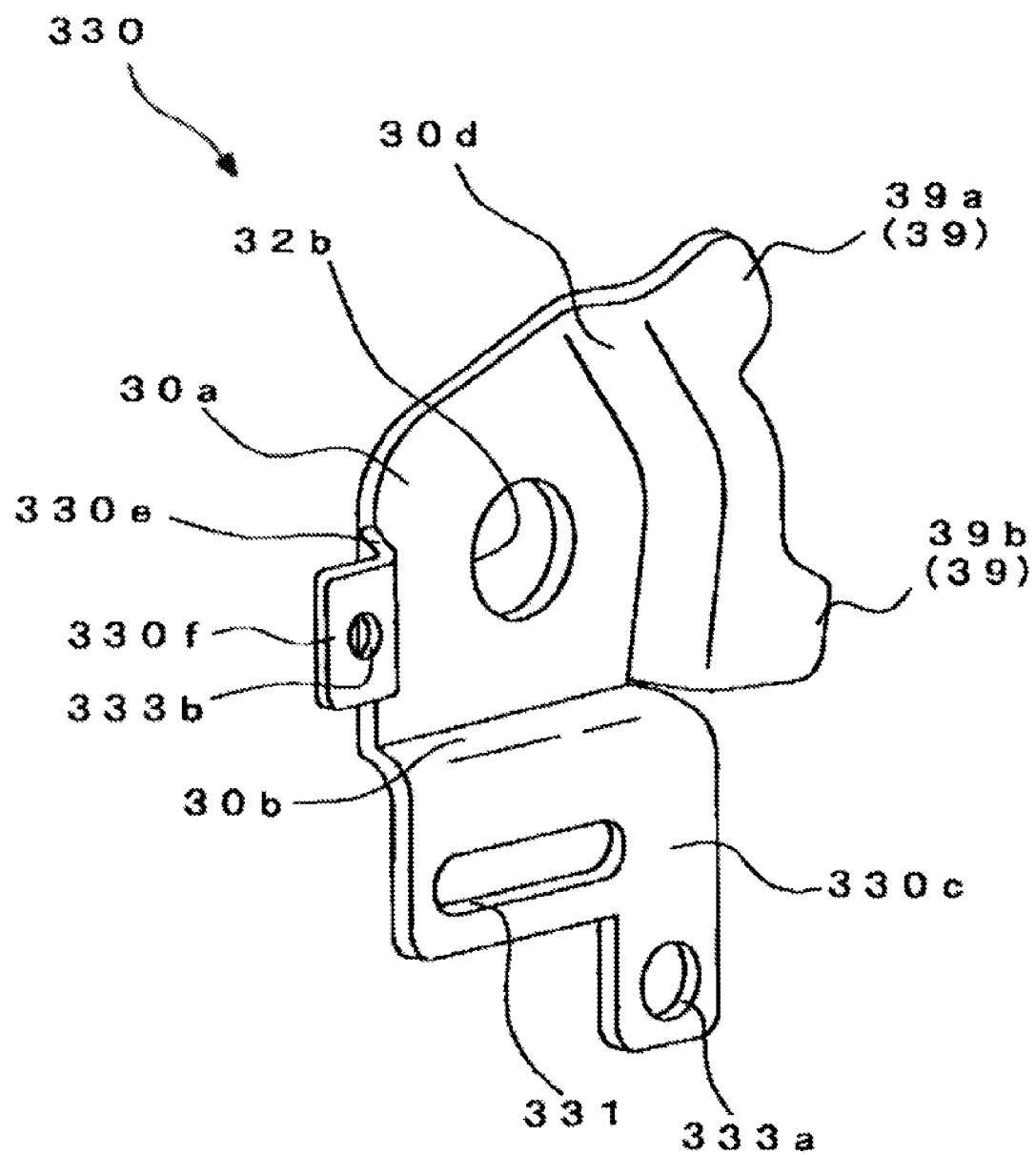
FIG. 30 is a perspective view of a shock reducing member in accordance with a fourth embodiment.

As shown in FIG. 30, the mounting parts (the locking holes 333a and 333b) for the urging elements formed in the rotating member 330 of this embodiment are formed at two places to lock the end parts of the tensile coil springs 335 and 336 serving as the urging elements. The first locking hole 333a is provided in a formation part 330c in which the locking part 331 is formed, and is formed at a distance larger than the distance between the shaft hole 32b and the locking part 331. The second locking hole 333b is formed in a formation part 330f on the vehicle front side via a third rising part 330e rising from the base part 30a at a position on the vehicle front side of the shaft part 32 of the rotating member 330.

In the rotating member 330, the aforementioned locking part 331 for the wire 22 is provided between the locking holes 333a and 333b, and is configured so that when the wire 22 is locked to the locking part 331, the wire 22 is disposed between the locking holes 333a and 333b. Thus, the wire 22 is mounted by effectively utilizing a space between the mounting parts for the tensile coil springs 335 and 336 serving as the plurality of urging elements. Therefore, this configuration contributes further to the reduction in size.

As shown in FIG. 29, the tensile coil springs 335 and 336 serving as the urging elements of this embodiment are formed by the same tensile coil springs each formed by coiling a spring wire rod. If the same members are used in this manner, the parts can be used commonly, and in the assembling work, mistaken assembling of the tensile coil springs 335 and 336 can be prevented. The coil springs 335 and 336 are locked to the locking holes 333b and 333a in the rotating member 330 and the locking holes 334a and 334b in the projecting parts 315d and 315f of the side frame 15, respectively, by which the rotating member 330 is urged to the front side of the seat back frame 1. In both the end parts of the tensile coil springs 335 and 336, hooks for locking are formed in a semicircular shape.

Since the tensile coil springs 335 and 336 are disposed in plural numbers as described above, the tensile coil springs 335 and 336 can be decreased in size, and accordingly the rotating member 330 is also decreased in size, and can be kept away from the passenger side and not to become a hindrance to the passenger. Further, the tensile coil spring 335 is locked to the locking hole 333b in the formation part 330f formed via the third rising part 330e rising from the base part 30a at a position on the vehicle front side of the shaft part 32 of the rotating member 330. That is to say, the tensile coil spring 335 close to the shaft part 32 having a convex shape is disposed so as not to overlap on the shaft part 32, which is a rotating shaft. Therefore, the tensile coil spring 335 can be disposed close to the rotating member 330, and the configuration can be made such that the tensile coil spring 335 is kept away from the passenger side.

Also, since the tensile coil springs 335 and 336 are disposed by being distributed to the vehicle upper side and the vehicle lower side of the shaft part 32 of the rotating member 330 separately, a space above and below the shaft part 32 can be utilized effectively, and the total of the urging elements and the shock reducing member can be decreased in size.

Also, the plurality of tensile coil springs 335 and 336 and the stopper parts 39a and 39b are provided by being distributed to the vehicle front side and the vehicle rear side of the shaft part 32 of the rotating member 330. That is to say, the tensile coil springs 335 and 336 are provided on the vehicle front side of the shaft part 32, and the stopper parts 39a and 39b are provided on the vehicle rear side of the shaft part 32. Thus, the rotate inhibiting part 39 (the stopper parts 39a and 39b) is formed at a position such that the rotate inhibiting part 39 does not interfere with the plurality of urging element(s) (the tensile coil springs 335 and 336).

Figure 31:
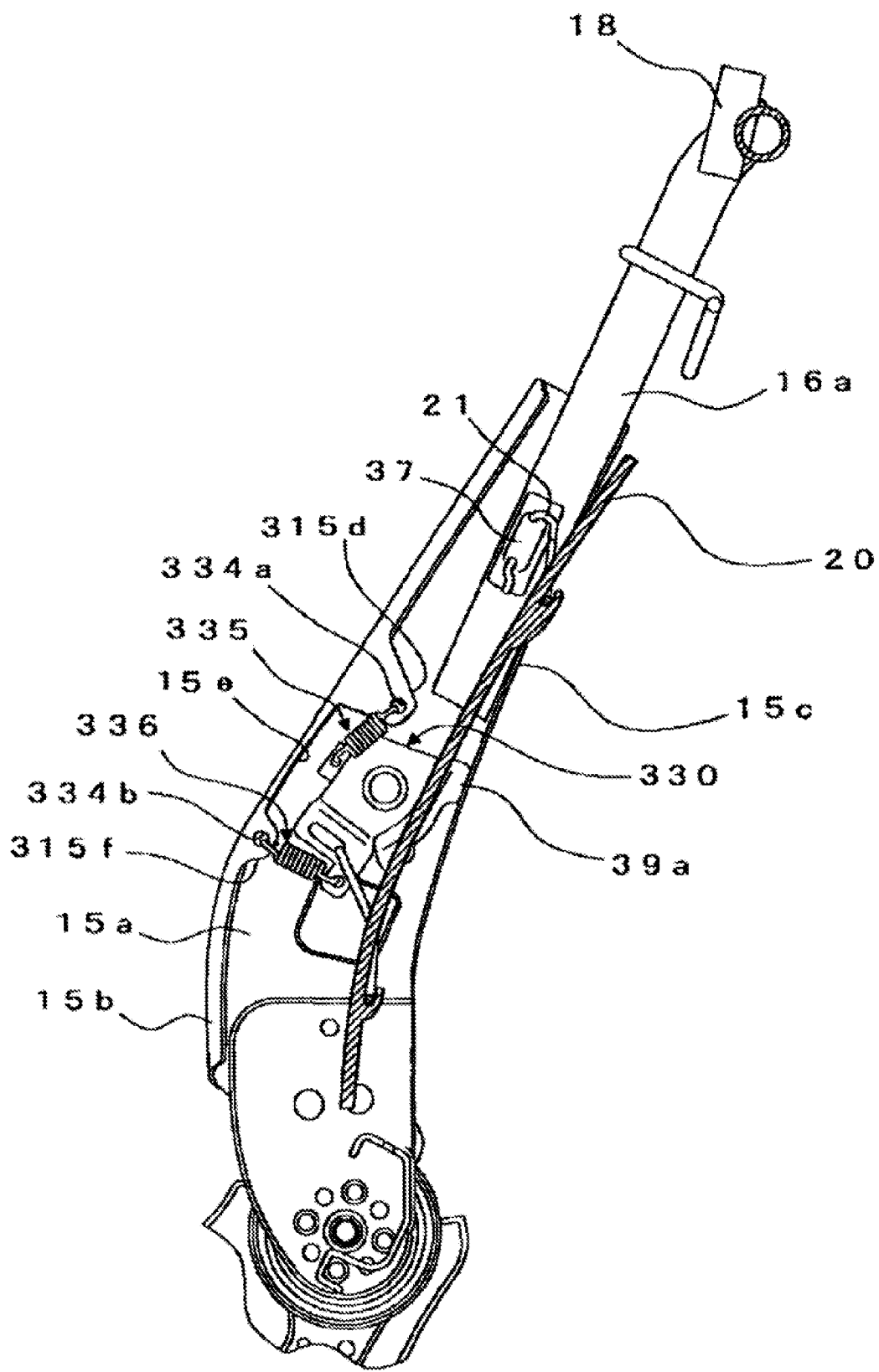
FIG. 31 is a schematic cross-sectional view of a seat back frame before the movement of a shock reducing member in accordance with a fourth embodiment.
Figure 32:
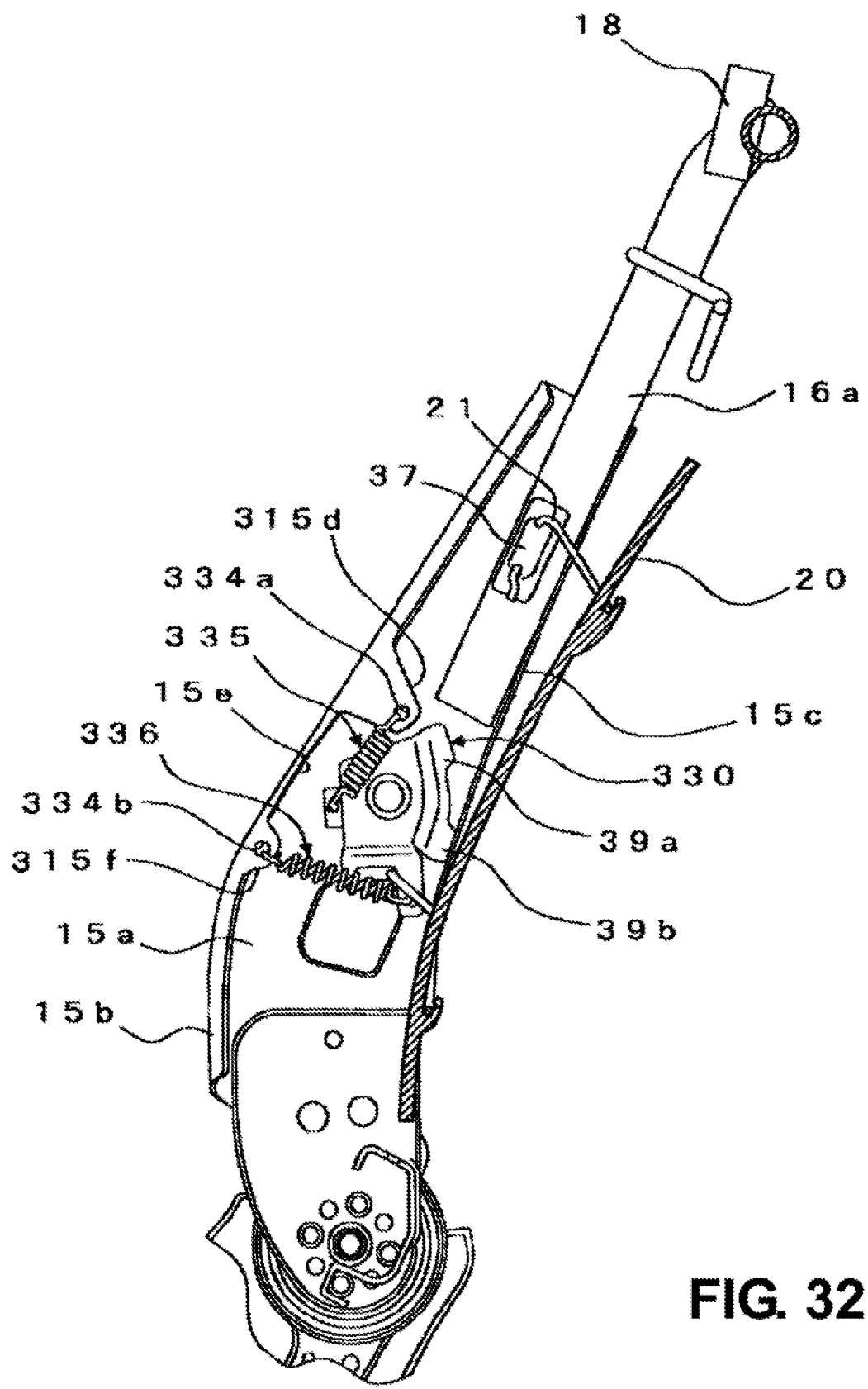
FIG. 32 is a schematic cross-sectional view of a seat back frame after the movement of a shock reducing member in accordance with a fourth member.
Figure 33A:
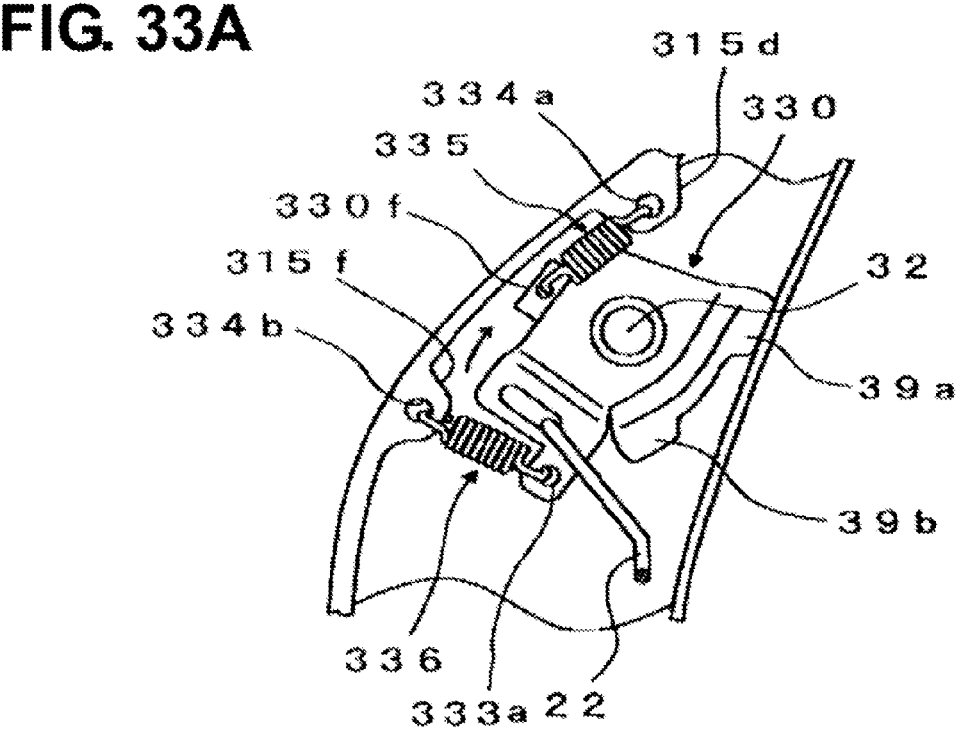
FIGS. 33A, B are explanatory side views showing a state of a shock reducing member before and during rear-end collision in accordance with a fourth embodiment.
Figure 33B:
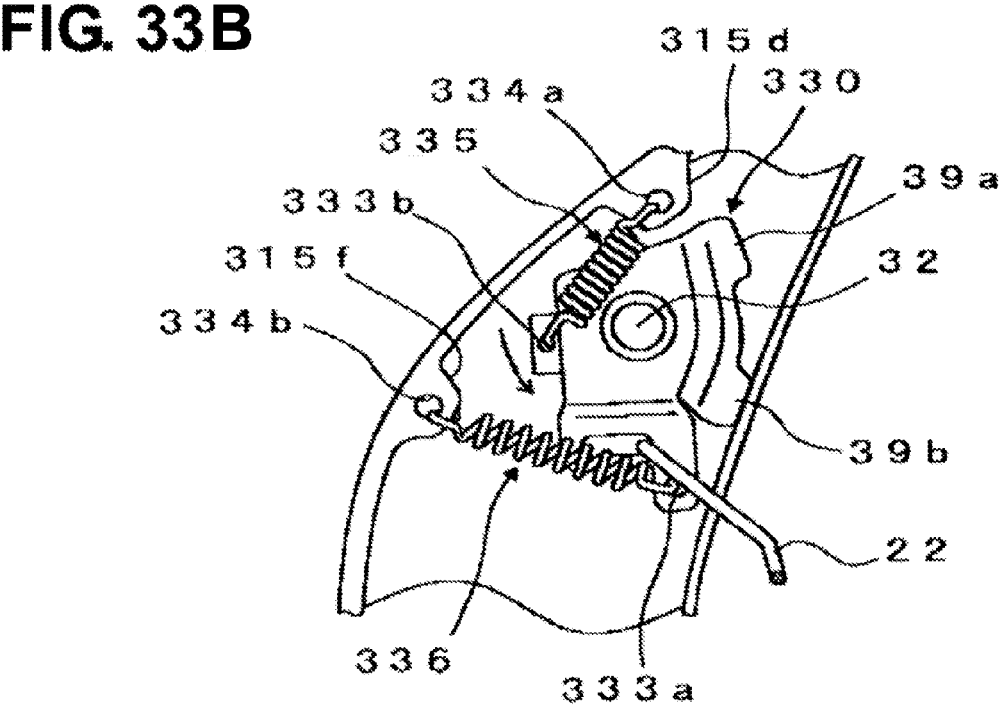

As for the rotating member 330 at the time of rear-end collision, FIG. 31 shows the rotating member 330 before rotating, FIG. 32 shows the rotating member 330 after rotating, and in FIGS. 33A, B, FIG. 33A shows the state before rear-end collision and FIG. 33B shows the state during rear-end collision. Hereunder, the rotating characteristics of the rotating member 330 at the time of rear-end collision are explained with reference to FIGS. 31 to 33B.

At the initial position before rotating of the rotating member 330, one end part of each of the tensile coil springs 335 and 336 is locked to the respective locking holes 333a and 333b formed in the rotating member 330, and the other end part thereof is locked to the respective locking holes 334a and 334b formed in the projecting parts 315d and 315f of the side frame 15 to urge the wire 22 to the vehicle front side.

Specifically, in the initial state, the tensile coil springs 335 and 336 somewhat extend, and thereby the rotating member 330 is urged to the rotating direction indicated by an arrow mark shown in FIG. 33A by the spring forces of the tensile coil springs 335 and 336, and the connecting member (the wire 22) connected to the rotating member 330 is urged to the front side. At this time, the stopper 39a of the rotate inhibiting part 39 comes into contact with the rear edge part 15c of the side frame 15 to inhibit the rotating member 330 from being rotated in the arrow-marked direction by the tensile coil springs 335 and 336.

When a tension not lower than the predetermined value is produced in the wire 22 by rear-end collision, and the rotating member 330 begins to rotate against the urging forces of the tensile coil springs 335 and 336, the tensile coil springs 335 and 336 extend, and the locking holes 333a and 333b provided in the rotating member 330 move to the rear while rotating around the rotate center of the shaft part 32. The rotating member 330 is rotated until the stopper part 39b of the rotate inhibiting part 39 comes into contact with the rear edge part 15c of the side frame 15 to inhibit the rotating of the rotating member 330. Thereby, the pressure receiving member 20 is moved significantly to the rear of the seat frame 1 from the state shown in FIG. 31 to the state shown in FIG. 32, so that the passenger can be allowed to sink significantly in the seat back S1.

Even if the configuration is made such that the plurality of urging elements are mounted, if an impact load is applied to the pressure receiving member 20, the rotating member 330 can be rotated to move the pressure receiving member 20 sufficiently to the rear. Therefore, when a rear-end collision occurs, the passenger can be allowed to sink in the cushion pad 1a of the seat back S1 with certainty and efficiently.

Figure 34:
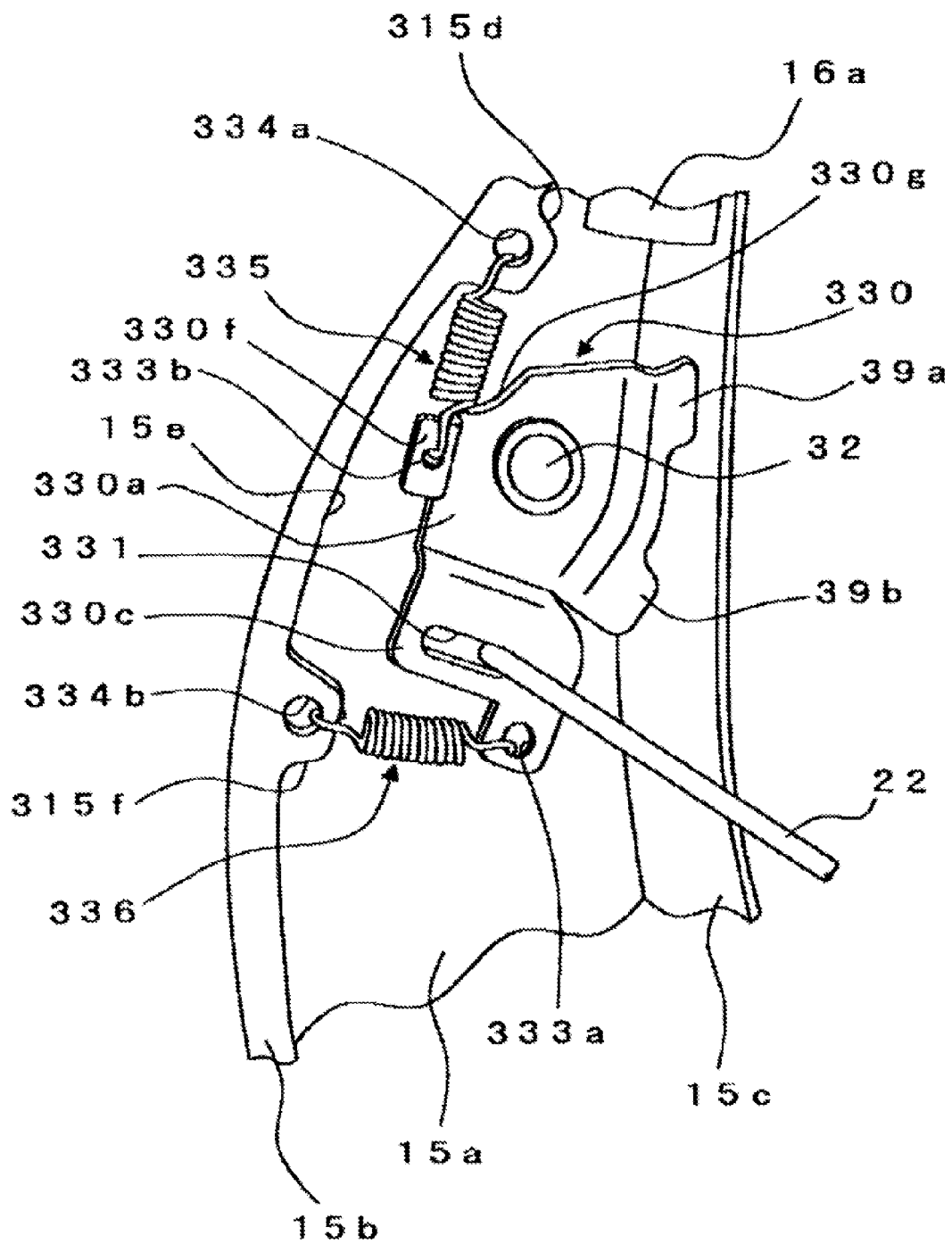
FIG. 34 is an enlarged perspective view similar to FIG. 29, showing another example of a fourth embodiment.

FIG. 34 is an enlarged explanatory view similar to FIG. 29, showing another example of the shock reducing member.

In this example, a base part 330a of the rotating member 330 is modified. Specifically, a notch part 330g is formed in a portion corresponding to the coil part of the tensile coil spring 335. By this configuration, the interference of the rotating member 330 with the tensile coil spring 335 can be prevented by the notch part 330g.

Figure 35:
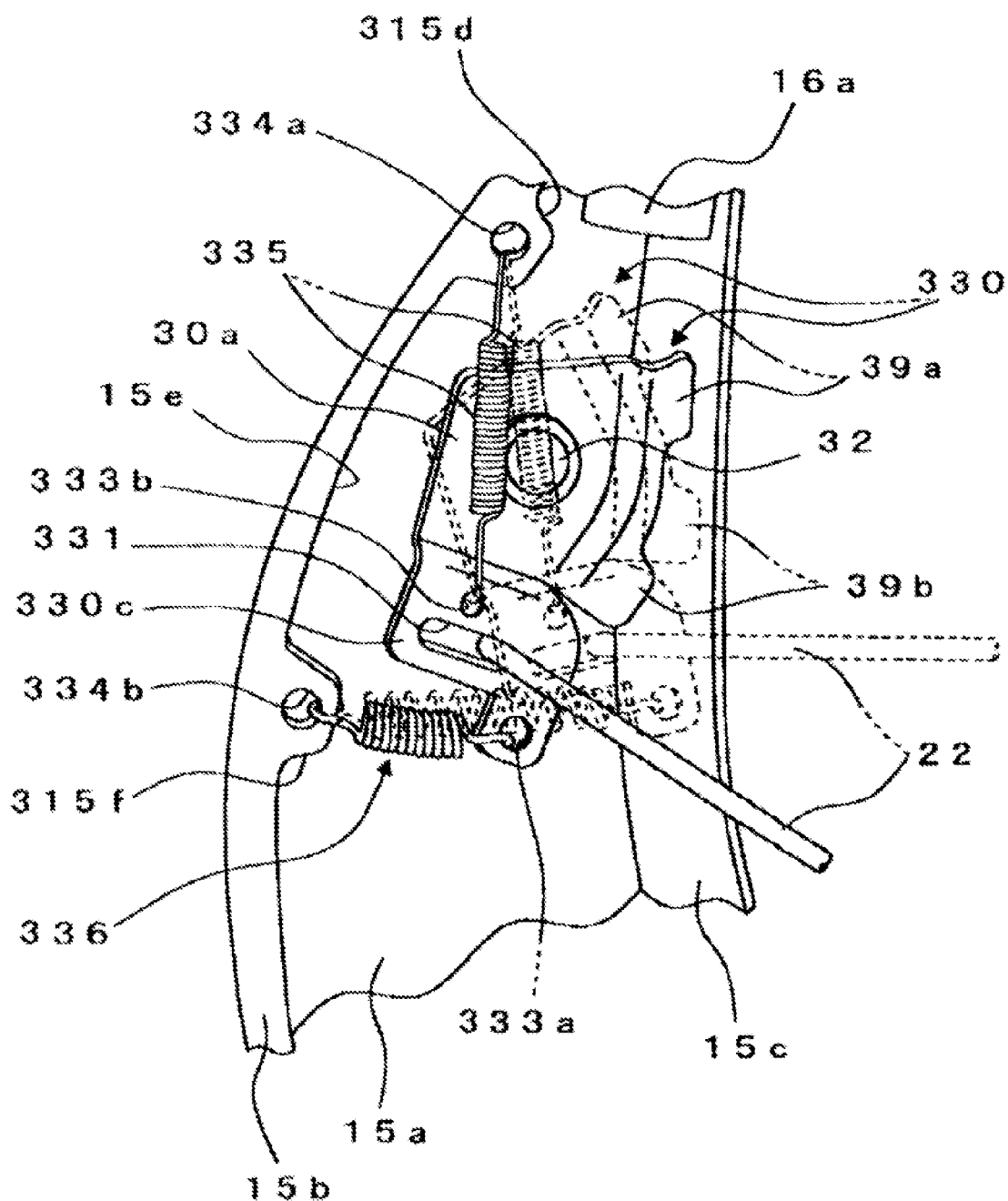
FIG. 35 is an enlarged perspective explanatory view similar to FIG. 29, showing another example of a fourth embodiment.

FIG. 35 is an explanatory view showing a state of the shock reducing member and the urging elements before and during rear-end collision, showing another example.

In this example, the locking hole 333b for the tensile coil spring 335 is provided between the shaft part 32 and the locking part 331, and the width (the diameter of coil part) of the tensile coil spring 335 is made narrower than that of the tensile coil spring 336. Specifically, the locking hole 333b is provided between the shaft part 32 and the locking part 331 in the formation part 330c, and the width in the transverse direction (perpendicular direction) with respect to the lengthwise direction of the tensile coil spring 335 is made narrower than that of the tensile coil spring 336.

The shaft part 32 constituting the rotating shaft of the rotating member 330 is formed in a convex shape directed to the seat inside direction of the base part 30a of the rotating member 330, and as described above, the plurality of tensile coil springs 335 and 336 are disposed. When the rotating member 330 rotates, even if one (in this example, the tensile coil spring 335) of the tensile coil springs 335 and 336 overlaps on the shaft part 32 having a convex part, this overlapping tensile coil spring 335 does not become a hindrance because the tensile coil spring 335 has a narrow width, so that the urging elements are kept away from the passenger side. Also, the tensile coil springs 335 and 336 can be decreased in size, and accordingly the rotating member 330 can also be decreased in size, and can be configured to be kept away from the passenger side and not to become a discomfort to the passenger.

Thus, the plurality of tensile coil springs 335 and 336 are disposed, and even if one tensile coil spring 335 overlaps on the rotate center of the shaft part 32 when the rotating member 330 rotates, the other tensile coil spring 336 can guide the rotating direction of the rotating member 330, so that the rotating member 330 is prevented from being stuck.

By using the plurality of urging elements as described above in this example and modified examples thereof, the urging elements can be decreased in size, and accordingly the shock reducing member can also be decreased in size. Therefore, the urging elements and the shock reducing member can be configured to be kept away from the passenger, so that it is possible to prevent passenger discomfort.

Fifth Embodiment

FIGS. 36 to 41 show a fifth embodiment in accordance with the present invention. In this embodiment, the same symbols are applied to members, arrangements, and the like that are essentially the same as those in the first embodiment, and the explanation of these members, arrangements, and the like is omitted.

Figure 38:
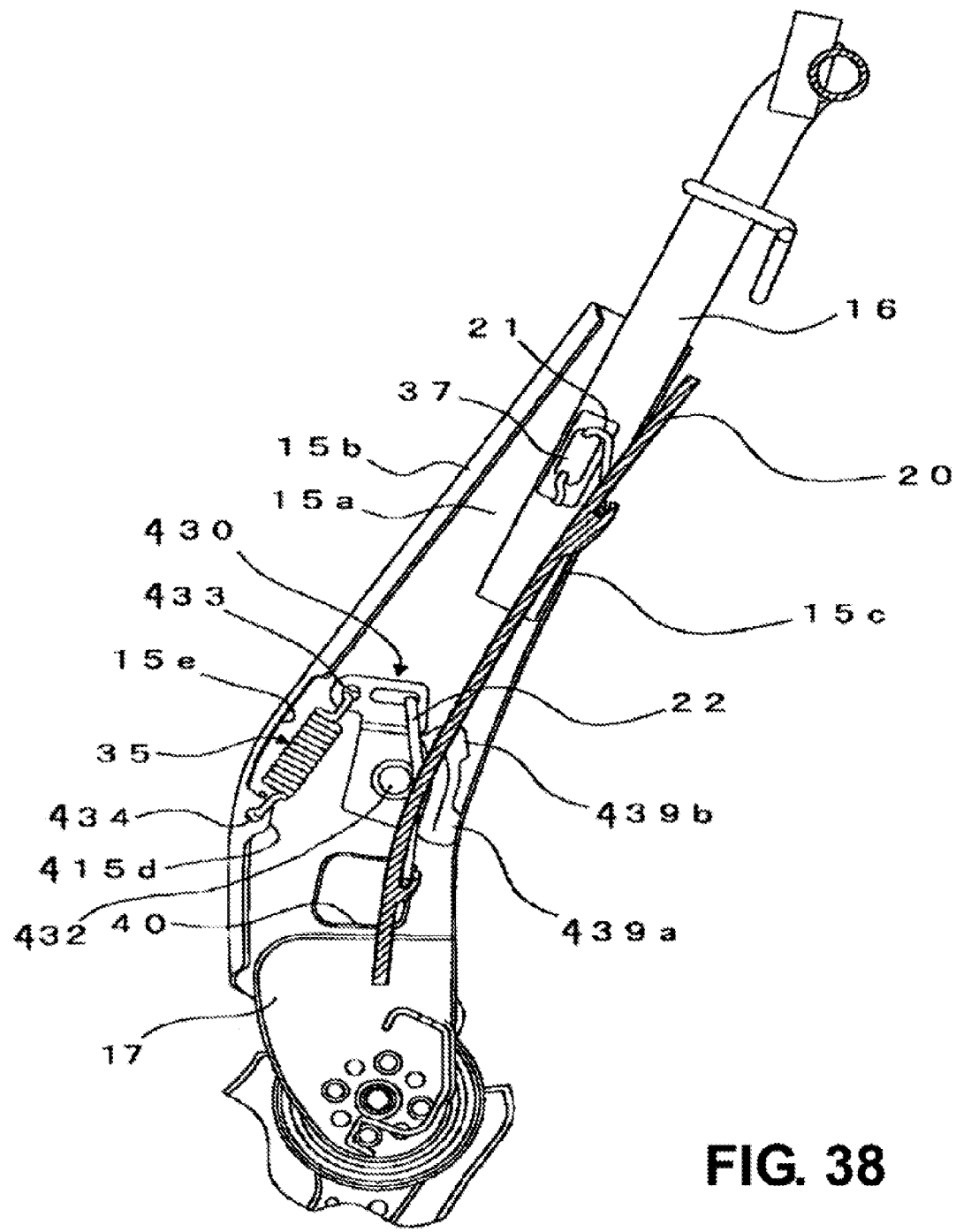
FIG. 38 is a schematic cross-sectional view of a seat back frame before the movement of a shock reducing member in accordance with a fifth embodiment.

As shown in FIG. 38, the side plates 15a on both sides of the side frame 15 of this embodiment each are formed with a hole 40 for wiring wire harness and the like for electric equipment (a motor and the like) at the lower position of the side frame 15 on the upper side of the lower frame 17. In this embodiment, a publicly known airbag system (not shown) is attached to the left outside of the side frames 15, and electric equipment (not shown) comprising a box body is attached to the right outside. These airbag system and electric equipment are attached to the side frames 15 by using fittings (not shown) such as machine screws, screws, or other fasteners.

Figure 36:
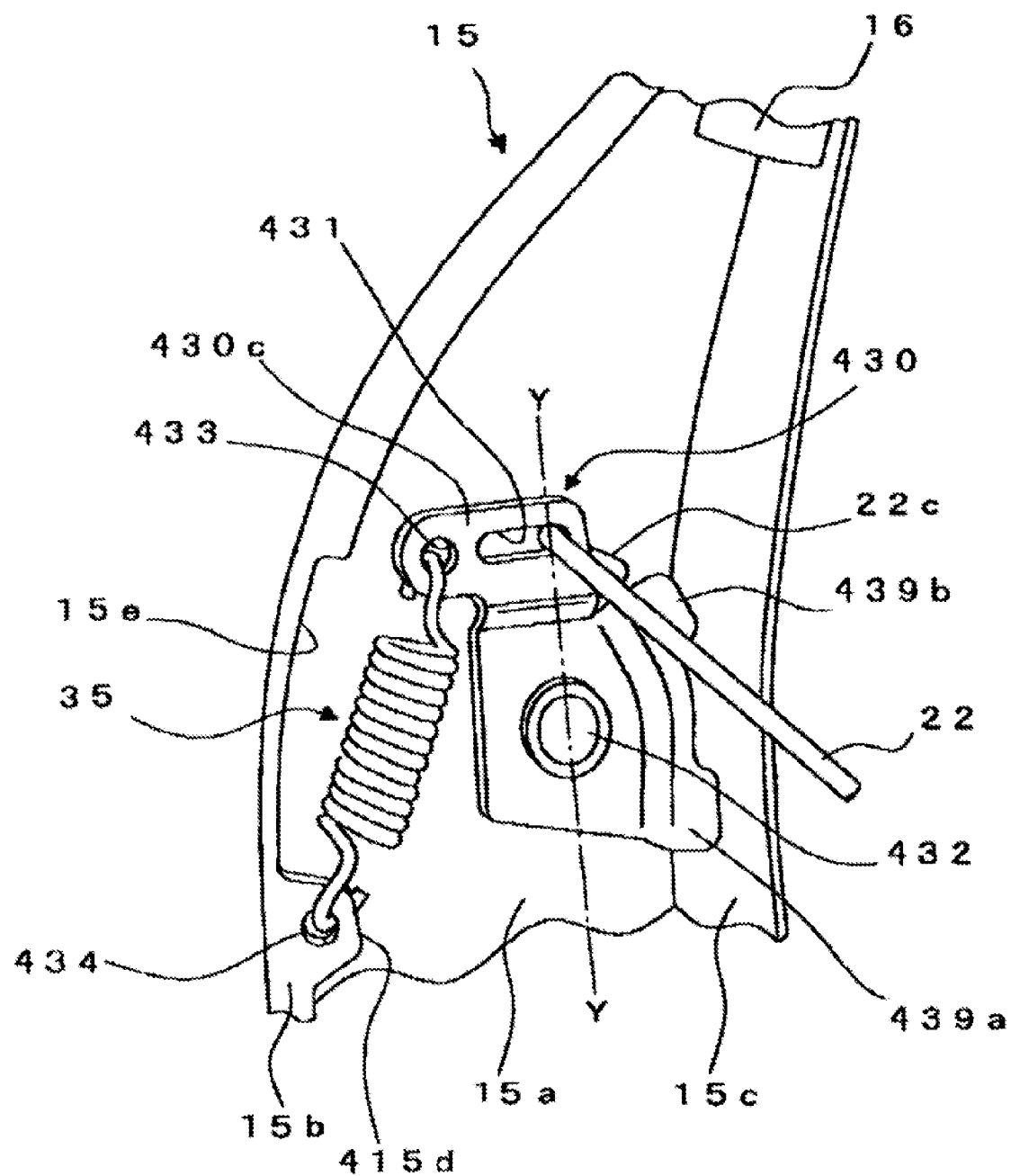
FIG. 36 is an enlarged perspective view showing the relationship between a shock reducing member and an urging element(s) in accordance with a fifth embodiment.

As shown in FIGS. 36 and 38, in this embodiment, in the front edge part 15b of the enlarged part in which the side frame 15 widens, a projecting part 415d projecting to the rear edge part 15c direction is formed, and the projecting part 415d is formed with a locking hole 434 serving as a mounting part for mounting the tensile coil spring 35 serving as the urging element. The locking hole 434 is formed between a shaft part 432 of a rotating member 430 and the hole 40 on the upper side of the aforementioned hole (harness insertion hole) 40 for wiring wire harness and the like. By this configuration, the mounting part of the urging element is provided at a position at which the hole 40 liable to decrease the rigidity is avoided, and the urging element can be disposed in a compact manner.

Figure 37:
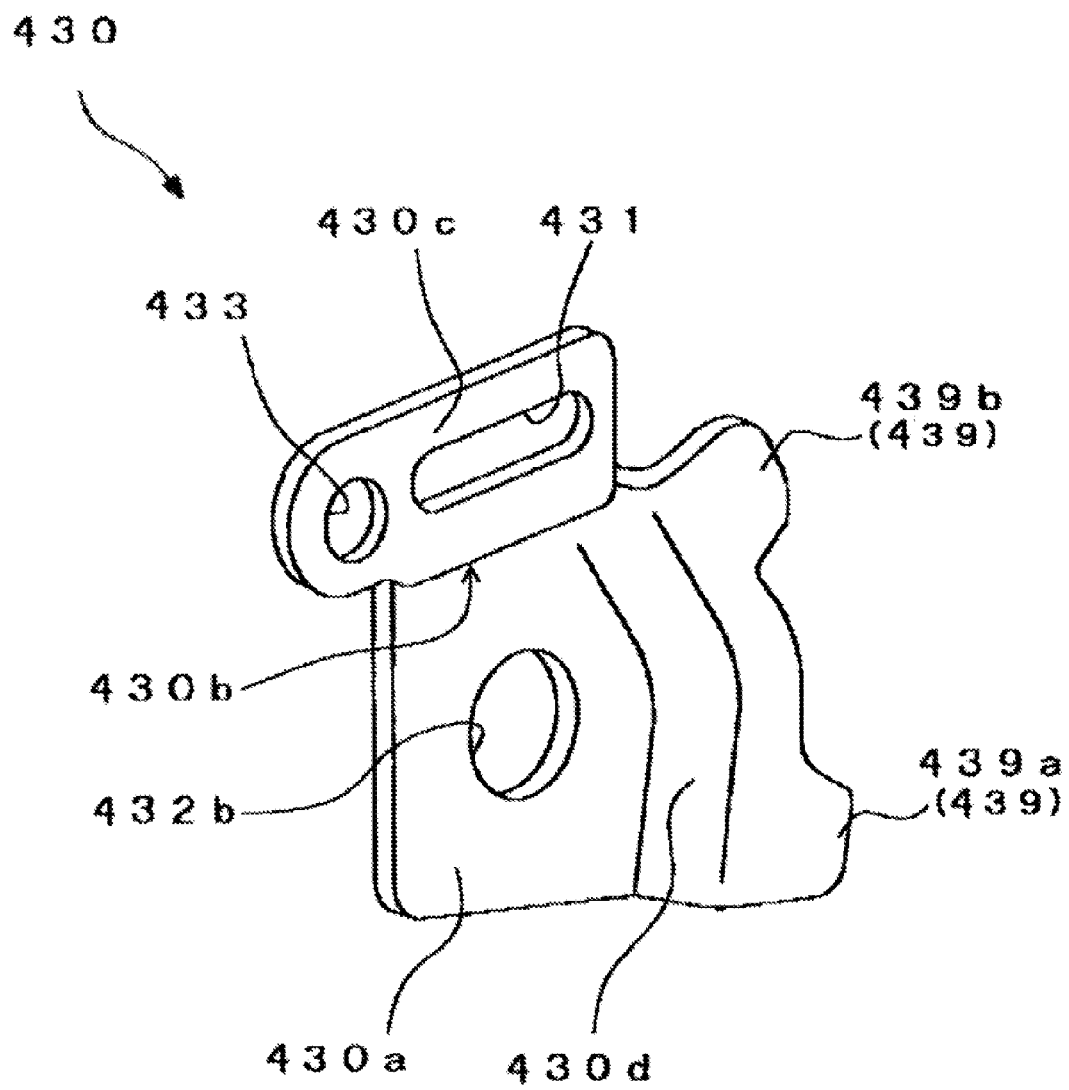
FIG. 37 is a perspective view of a shock reducing member in accordance with a fifth embodiment.

The rotating member 430 of this embodiment is explained with reference to FIGS. 36 and 37.

In the rotating member 430 of this embodiment, a first rising part 430b is formed so as to rise upward from a base part 430a with the up-and-down direction thereof being reversed to that of the rotating member 30 of the first embodiment, and a formation part 430c is formed so as to extend to the outer periphery direction from the first rising part 430b. The formation part 430c is formed with a locking part 431 serving as a connecting part of the connecting member (the wire 22) and a locking hole 433 serving as a mounting part for the urging element (the tensile coil spring 35).

Thus, the locking part 431 of the connecting member and the locking hole 433 of the urging member are formed above the shaft part 432 (a shaft hole 432b) serving as the rotating shaft. In the case where the side frame is formed so that the width in the vehicle longitudinal direction thereof is wider toward the lower side like the side frame 15 of this embodiment, if the shaft part 432 serving as the rotating shaft is provided below the locking part 431 serving as the connecting part of the connecting member (the wire 22) and the locking hole 433 serving as the mounting part of the urging element (the tensile coil spring 35), the arrangement region can be secured, so that this configuration is advantageous in terms of space.

Also, the locking hole 433 is formed on the vehicle front side of the locking part 431. That is to say, as shown in FIG. 36, the locking hole 433 is formed at a position on the vehicle front side of the line Y connecting the shaft part 432 to the position at which the wire 22 is hooked to the locking part 431.

A rotate inhibiting part 439 (stopper parts 439a and 439b) is configured so that the stopper part 439a for setting the initial position before rotating is formed on the lower side and the stopper part 439b for setting the stop position after rotating is formed on the upper side at a predetermined interval with respect to the stopper 439a, with the up-and-down direction thereof being reversed to that of the rotate inhibiting part 39 of the first embodiment. As in the first embodiment, the stopper parts 439a and 439b are formed as extension parts at two places extending further to the outer periphery direction from a second rising part 430d, which rises from the base part 430a continuously with the outer periphery side of the base part 430a, with a concave part being provided therebetween.

Figure 39:
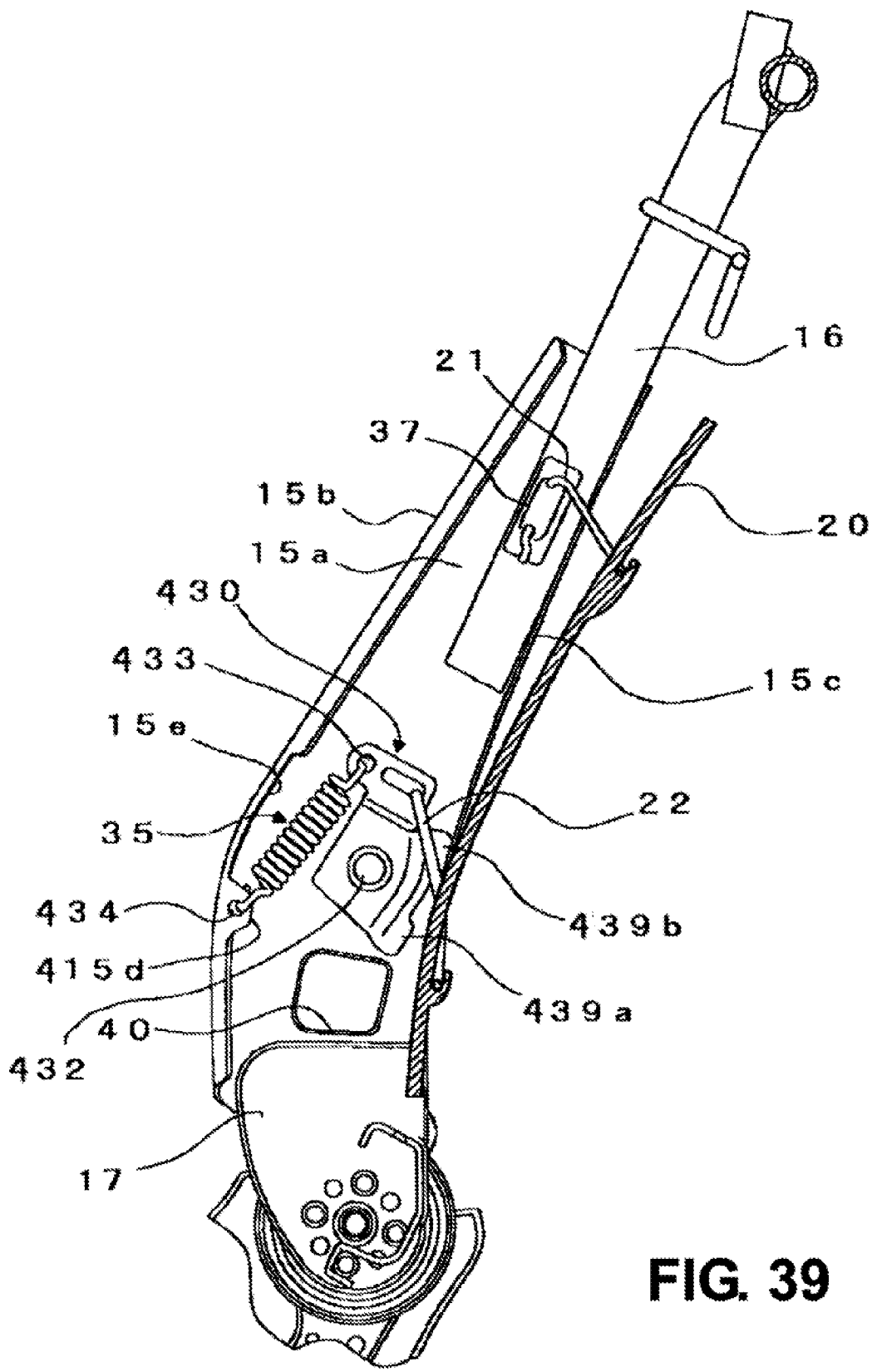
FIG. 39 is a schematic cross-sectional view of a seat back frame after the movement of a shock reducing member in accordance with a fifth member.
Figure 40:
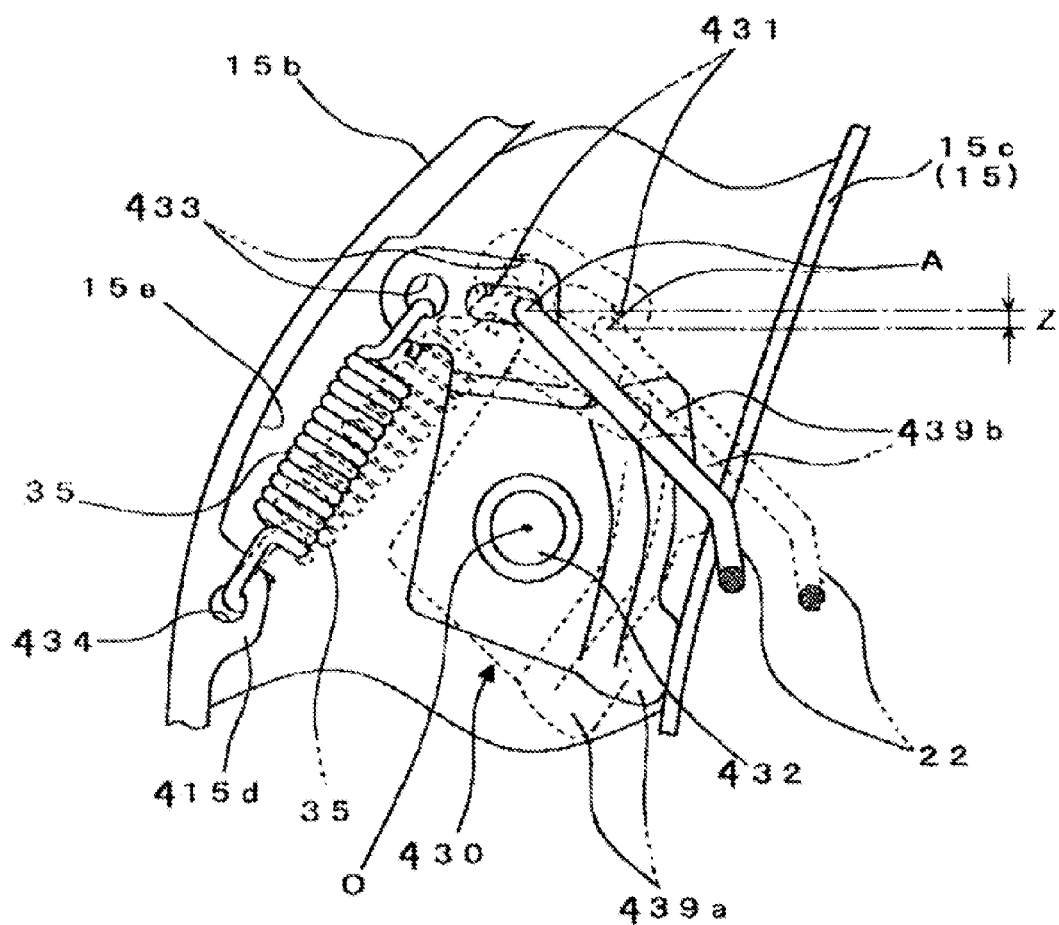
FIG. 40 is a side explanatory view showing a state of a shock reducing member before and during rear-end collision in accordance with a fifth embodiment.
Figure 41A:
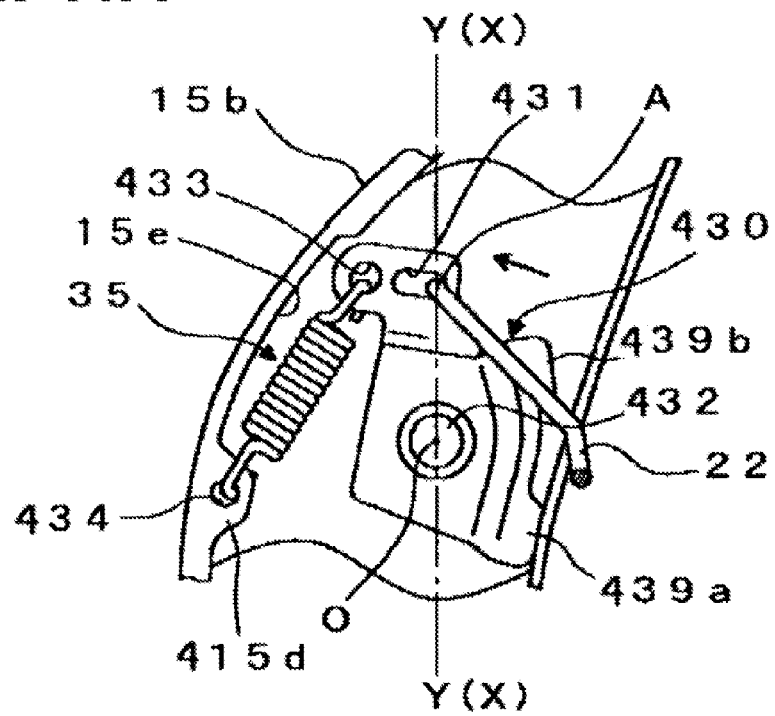
FIGS. 41A, B are explanatory side views showing a state of a shock reducing member before and during rear-end collision in accordance with a fifth embodiment.
Figure 41B:
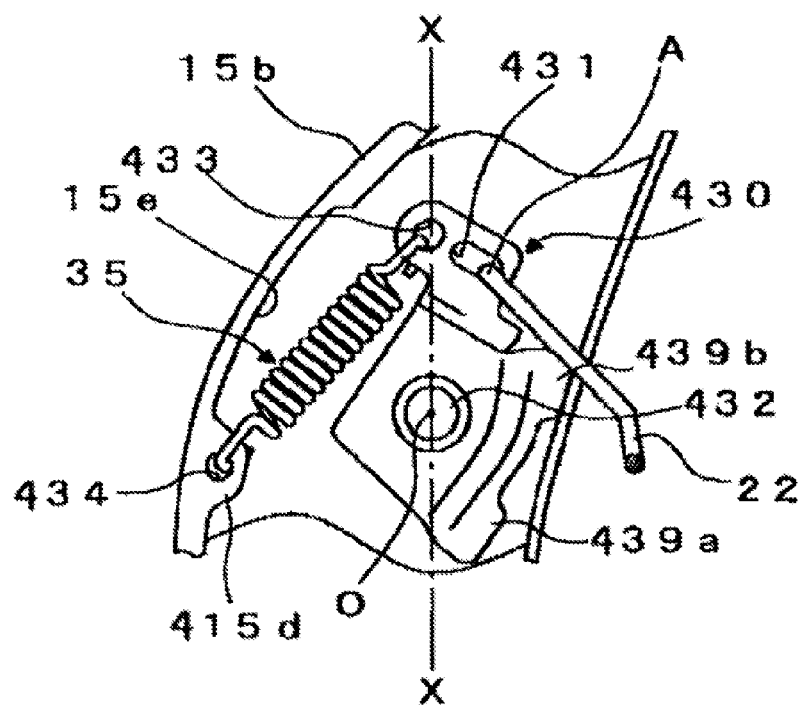

As for the rotating member 430 at the time of rear-end collision, FIG. 38 shows the rotating member 430 before rotating, FIG. 39 shows the rotating member 430 after rotating, in FIG. 40, a dashed line indicates the state before rear-end collision and a solid line indicates the state during rear-end collision, and in FIGS. 41A, B, FIG. 41A shows the state before rear-end collision and FIG. 41B shows the state during rear-end collision. Hereunder, the rotating characteristics of the rotating member 430 at the time of rear-end collision are explained with reference to FIGS. 38 to 41B.

At the initial position before rotating of the rotating member 430, the locking part 431 for locking the wire 22 and the locking hole 433 for locking the upper end part of the tensile coil spring 35 are disposed to be located on the vehicle front side of a position almost the same as a line X perpendicular to the ground plane passing through the rotate center O of the shaft part 432, and the lower end part of the tensile coil spring 35 is locked to the locking hole 434 formed in the projecting part 415d of the side frame 15 located below the rotating member 430. In this embodiment, the line Y connecting the rotate center O of the shaft part 432 to the position A at which the wire 22 is hooked to the locking part 431 and the line X perpendicular to the ground plane passing through the rotate center O of the shaft part 432 are at the same position, and the locking hole 433 is located on the vehicle front side.

Specifically, in the initial state, the tensile coil spring 35 somewhat extends, and thereby the rotating member 430 is urged to the rotating direction indicated by an arrow mark shown in FIG. 41A by the spring force of the tensile coil spring 135, and the connecting member (the wire 22) connected to the rotating member 430 is urged to the front side. At this time, the stopper part 439a of the rotate inhibiting part 439 comes into contact with the rear edge part 15c of the side frame 15 to inhibit the rotating member 430 from rotating.

When a tension not lower than the predetermined value is produced in the wire 22 by rear-end collision, and the rotating member 430 begins to rotate against the urging force of the tensile coil spring 35, the tensile coil spring 35 extends, and the locking hole 433 provided in the rotating member 430 moves to the rear while rotating around the rotate center O of the shaft part 432. At this time, since the position A at which the wire 22 is hooked to the locking part (the connecting part) 431 of the wire 22 is a position almost the same as the line X perpendicular to the ground plane passing through the rotate center O of the shaft part 432 in the initial state, as shown in FIG. 41B, when the rotating member 430 rotates, the locking part 431 moves to the rear position side from the line X. That is to say, the locking part (the connecting part) 431 of the wire 22 moves in the downward direction. As indicated by the dashed line in FIG. 40, the rotating member 430 is rotated until the stopper part 439b of the rotate inhibiting part 439 comes into contact with the rear edge part 15c of the side frame 15 to inhibit the rotating of the rotating member 430. At this time, the position A at which the wire 22 is hooked to the locking part (the connecting part) 431 of the wire 22 moves to a lower position through the distance Z shown in FIG. 40. Thereby, the pressure receiving member 20 is moved greatly to the rear of the seat frame 1 from the state shown in FIG. 38 to the state shown in FIG. 39, so that the passenger can be allowed to sink significantly in the seat back S1. By this configuration, the passenger is moved easily in the sinking direction, and even in the case where the shock is great, the floating of the passenger can be restrained.

Even in the case where the rotating shaft (the shaft part 432) of the rotating member 430 is configured to be located below the locking part 431 of the wire 22 and the locking hole 433 of the tensile coil spring 35, if an impact load is applied to the pressure receiving member 20, the rotating member 430 can be rotated to move the pressure receiving member 20 sufficiently to the rear. Therefore, when a rear-end collision occurs, the passenger can be allowed to sink in the cushion pad 1a of the seat back S1 with certainty and efficiently.

Figure 42:
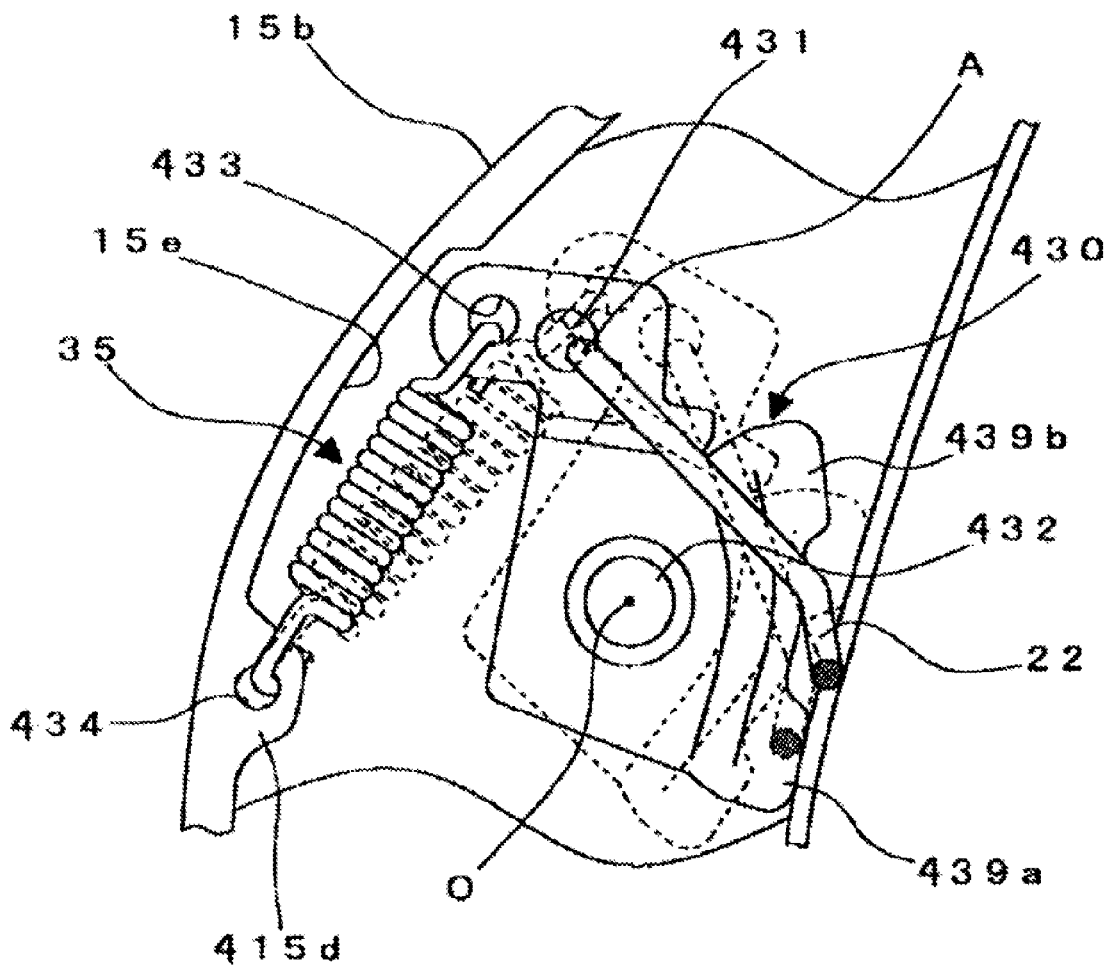
FIG. 42 is an explanatory side view showing a state of a shock reducing member before and during rear-end collision, showing another example of a fifth embodiment.
Figure 43A:
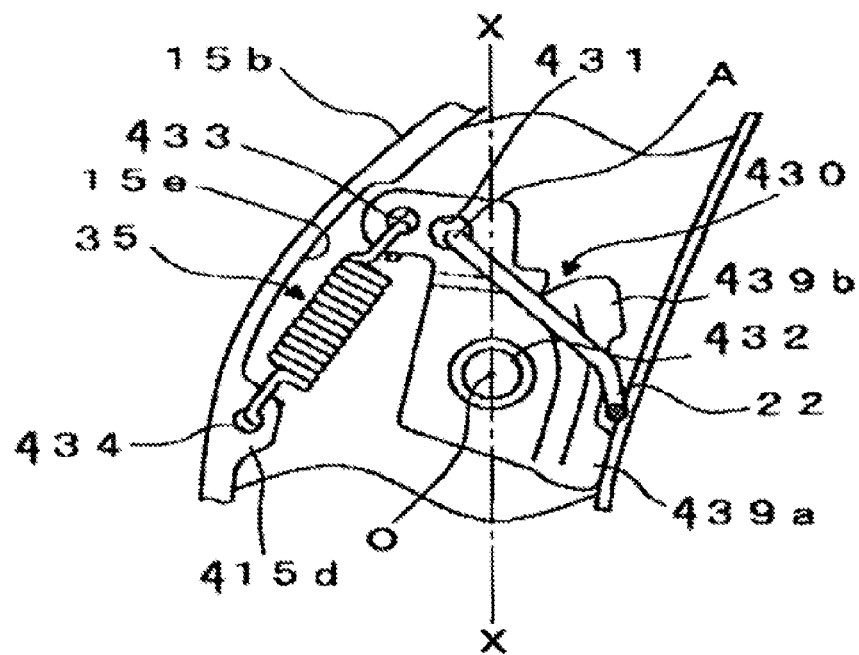
FIGS. 43A, B are explanatory side views showing a state of a shock reducing member before and during rear-end collision, showing another example of a fifth embodiment.

FIGS. 42 and 43 are explanatory views showing states of the shock reducing member, the urging elements, and the connecting member before and during rear-end collision, showing another example of the fifth embodiment.

In this example, the position A at which the wire 22 is hooked to the locking part 431 is located on the vehicle front side of the line X perpendicular to the ground plane passing through the rotate center O of the shaft part 432. Other configurations are the same as those of the above-described embodiment.

Figure 43B:
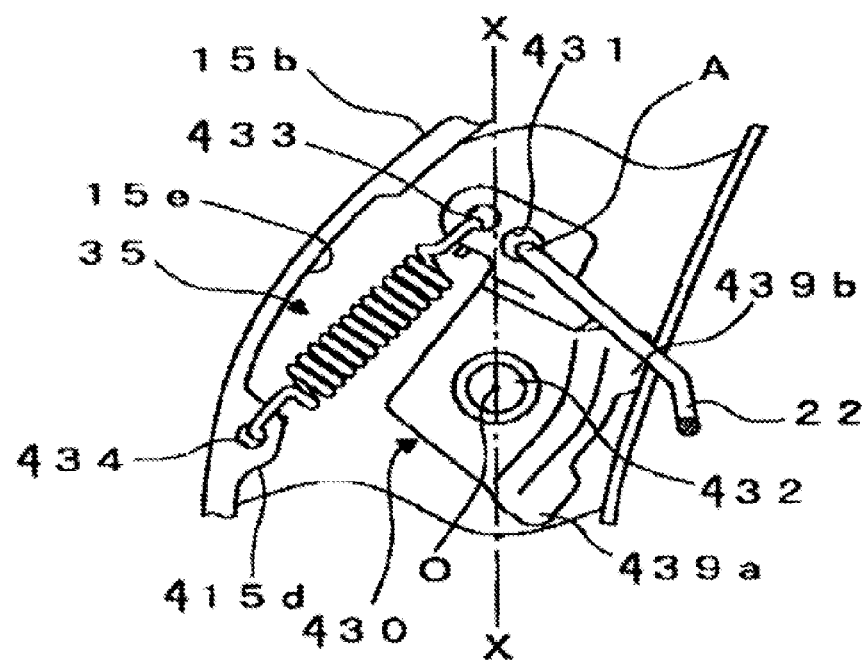

According to this example, when a tension not lower than the predetermined value is produced in the wire 22 by rear-end collision, and the rotating member 430 begins to rotate against the urging force of the tensile coil spring 35, the tensile coil spring 35 extends, and the locking hole 433 provided in the rotating member 430 moves to the rear while rotating around the rotate center O of the shaft part 432. Since the position A at which the wire 22 is hooked to the locking part 431 is a position on the vehicle front side of the line X perpendicular to the ground plane passing through the rotate center O of the shaft part 432 in the initial state, when the rotating member 430 rotates, the rotating member 430 rotates so as to draw an arc to the upward direction before reaching the line X, and when the rotating member 430 rotates to the rear beyond the line X, as shown in FIG. 43B, the rotating member 430 moves to the rear position side of the line X. That is to say, the locking part (the connecting part) 431 of the wire 22 moves in the upward direction, becoming horizontal on the line X, and moves in the downward direction beyond the line X. As indicated by the dashed line in FIG. 42, the rotating member 430 is rotated until the stopper part 439b of the rotate inhibiting part 439 comes into contact with the rear edge part 15c of the side frame 15 to inhibit the rotating of the rotating member 430.

By this configuration, the passenger is moved easily to the rear in association with the movement of the passenger, and even in the case where the shock is great, the floating of the passenger can be restrained.

Figure 44:
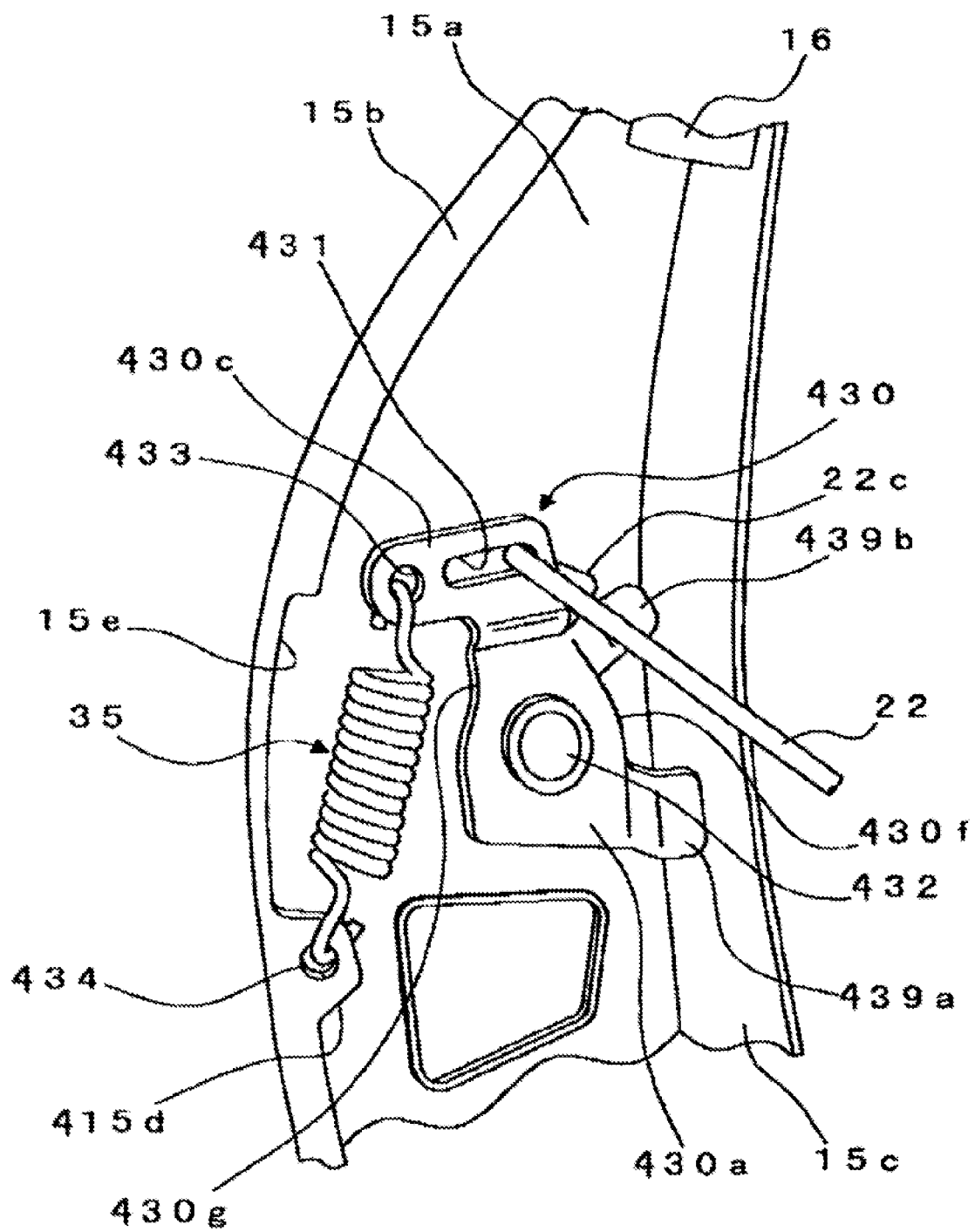
FIG. 44 is an enlarged perspective view similar to FIG. 36, showing another example of a fifth embodiment.

FIG. 44 is an enlarged explanatory view showing the relationship among the shock reducing member, the urging elements, and the connecting member, showing still another example of the fifth embodiment.

In this example, as shown in FIG. 44, the base part 430a of the rotating member 430 is modified. Specifically, a notch part 430f is formed at the position opposed to the wire 22 serving as the connecting member. More specifically, the configuration is made such that the second rising part 430d between the stopper part 439a and the stopper part 439b of the rotate inhibiting part 439 is cut greatly to prevent the interference with the wire 22. Since the interference of the rotating member 430 with the wire 22 can be prevented as described above, the wire 22 and the rotating member 430 can be disposed close to each other, so that this configuration contributes to the reduction in size.

Further, in this example, in the base part 430a of the rotating member 430, a notch part 430g is formed in a portion corresponding to the position opposed to the position at which the coil part of the tensile coil spring 35 is disposed so that the width of the base part 430a is narrow as compared with the embodiment shown in FIG. 36. This notch part 430g is formed so that a gap between the tensile coil spring 35 and the rotating member 430 can be secured on the vehicle upper side. By this configuration, the interference with the tensile coil spring 35 can be prevented by the notch part 430g. Since the interference can be prevented in this manner, the tensile coil spring 35 and the rotating member 430 can be disposed close to each other, so that this configuration contributes to the reduction in size.

Figure 45:
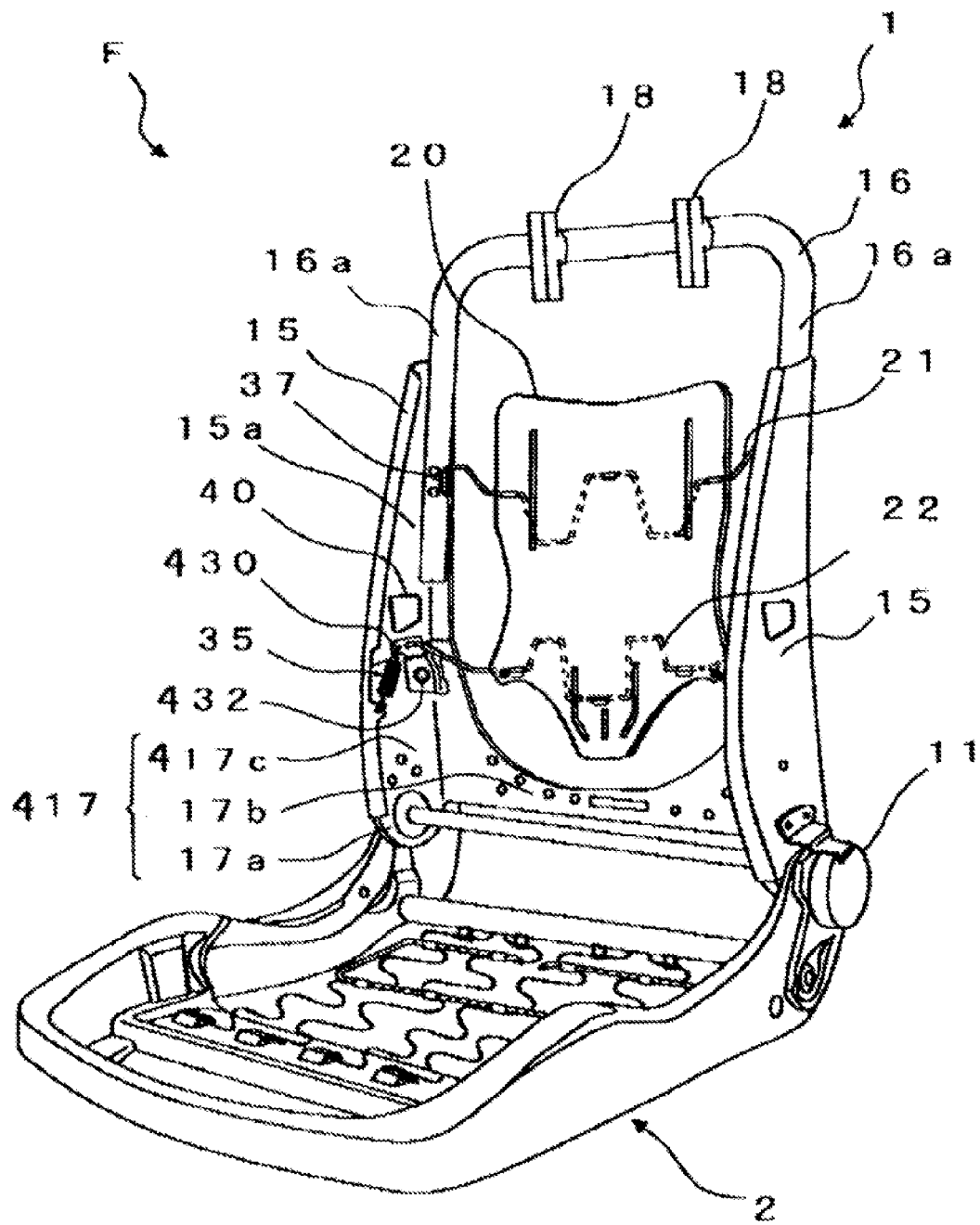
FIG. 45 is a schematic perspective view of a seat frame, showing another example of a fifth embodiment.

FIG. 45 is a schematic perspective view of the seat frame, showing still another example of the fifth embodiment.

In this example, as shown in FIG. 45, there is provided an upper extension part 417c in which each end part of a lower frame 417 by which the lower end parts of the side frames 15 are connected is extended upward, and the shaft part 432 serving as the rotating shaft of the rotating member 430 is attached to the upper extension part 417c. At this time, the shaft part 432 can be attached to only the extension part 417c of the lower frame 417. However, if the shaft part 432 is attached to a portion in which the side frame 15 and the extension part 417c of the lower frame 417 overlap on each other, the mounting rigidity of the shaft part 432 is improved significantly.

Further, as shown in FIG. 45, the hole 40 used as a harness insertion hole for electric equipment (airbag, motor, etc.) is formed between the side portion 16a of the pipe-form upper frame 16 and the rotating member 430. Thus, the harness insertion hole may be formed by effectively utilizing a space above the rotating member 430.

As described above, by using the shock reducing member configured so that the rotating shaft is located below the connecting part of the connecting member and the mounting part of the urging member as in this example and modified examples thereof, the shock reducing member and the pressure receiving member can be moved in association with the movement of the passenger. Thereby, the passenger is moved easily to the rear, the sense of discomfort of the passenger can be prevented, and the load transmission efficiency for sinking movement can be improved.

In any of the above-described embodiments, when rear-end collision occurs, the pressure receiving member 20 is moved to the rear by using the shock reducing member and the urging member, and thereby the passenger can be allowed to sink significantly in the seat back S1. At this time, the back (the upper body) of the passenger moves to the rear on account of sinking, but the position of the headrest S3 is unchanged. Therefore, the gap between the headrest S3 and the head is narrowed, so that the head can be supported by the headrest S3, by which an effect of effectively reducing the shock applied to the neck is achieved.

In the above-described embodiments, the examples in which the shock reducing member is provided on each side frames have been explained. However, the configuration may be such that the shock reducing member is provided on one side of the side frame only. In this case, the side frame in which the shock reducing member is not provided can be configured so that the connecting member (the wire) is directly locked.

In the above-described embodiments, as a specific example, the seat back S1 of the automobile front seat has been explained. However, it is a matter of course that the present invention can also be applied to the seat back of a rear seat.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A vehicle seat comprising:
 a seat back frame comprising side parts located on both sides and an upper part disposed above;
 a headrest disposed above the seat back frame;
 a pressure receiving member connected to the seat back frame via a connecting member, the pressure receiving member being movable independently from the headrest;
 a shock reducing member which is disposed at least on one side of the both-side side parts of the seat back frame and is connected to the connecting member and is rotatable around a rotating shaft independently from the headrest; and an urging element(s) disposed by attaching end parts thereof to a mounting part formed in the shock reducing member and a mounting part formed in the seat back frame,
wherein
the mounting part formed in the seat back frame is formed integrally with the side part of the seat back frame, the side part of the seat back frame extending above and below the end parts of the urging element; and
the mounting part formed in the shock reducing member is disposed in front of a vertical plane passing through an axis of the rotating shaft of the shock reducing member.

2. The vehicle seat according to claim 1, wherein the mounting part formed in the seat back frame is disposed above the rotating shaft of in the shock reducing member.

3. The vehicle seat according to claim 1, wherein:
the side part comprises a side frame having a U-shaped cross section in which both end parts of a plate body disposed in a vehicle longitudinal direction are bent to a seat inside direction; and
the shock reducing member is disposed inside a portion having a U-shaped cross section of the side frame from a frontal view.

4. The vehicle seat according to claim 1, wherein:
each of the seat back frame and the shock reducing member is formed with a plurality of mounting parts for mounting a plurality of urging elements; and
the urging elements are disposed in plural numbers.

5. The vehicle seat according to claim 4, wherein the plurality of urging elements are disposed at positions at which the urging elements do not always overlap on a member constituting the rotating shaft in a rotating range of the shock reducing member.

6. The vehicle seat according to claim 4, wherein:
at least one of the plurality of urging elements is disposed at a position at which the urging element overlaps on a member constituting the rotating shaft when the shock reducing member rotates; and
the urging element which overlaps on the member constituting the rotating shaft has a width narrower than the widths of other urging elements.

7. The vehicle seat according to claim 1, wherein:
the shock reducing member has a connecting part for connecting the connecting member; and
the rotating shaft of the shock reducing member is formed at a lower position of at least one of the connecting part formed in the shock reducing member and the mounting part formed in the shock reducing member.

8. The vehicle seat according to claim 7, wherein when a predetermined impact load higher than the usual seating load is applied to the pressure receiving member, the connecting member moves the connecting part between the shock reducing member and the connecting member in the upward direction, and then moves it downward, by which the whole of the pressure receiving member is moved to the vehicle rear.

9. The vehicle seat according to claim 7, wherein when a predetermined impact load higher than the usual seating load is applied to the pressure receiving member, the connecting member moves the connecting part between the shock reducing member and the connecting member downward, by which the whole of the pressure receiving member is moved to the vehicle rear.

10. The vehicle seat according to claim 1, wherein the mounting part formed in the shock reducing member is disposed below the rotating shaft of the shock reducing member.

11. The vehicle seat according to claim 1, wherein:
the mounting part formed in the seat back frame is disposed above the rotating shaft of the shock reducing member; and
the mounting part formed in the shock reducing member is disposed below the rotating shaft of the shock reducing member.

12. A vehicle seat comprising:
a seat back frame comprising side parts located on both sides and an upper part disposed above;
a headrest disposed above the seat back frame;
a pressure receiving member connected to the seat back frame via a connecting member, the pressure receiving member being movable independently from the headrest;
a shock reducing member which is disposed at least on one side of the both-side side parts of the seat back frame and is connected to the connecting member and is rotatable around a rotating shaft independently from the headrest; and
an urging element(s) disposed by attaching end parts thereof to a mounting part formed in the shock reducing member and a mounting part formed in the seat back frame,
wherein
at least one of the mounting part formed in the shock reducing member and the mounting part formed in the seat back frame is formed integrally with the shock reducing member or integrally with the side part of the seat back frame;
the seat back frame formed with the mounting part is a side frame;
the side frame has a front edge part folded to an inside in a U shape from an end part located on a vehicle front side; and
the mounting part is formed in an extension part formed by extending the front edge part to the rear.

13. A vehicle seat comprising:
a seat back frame comprising side parts located on both sides and an upper part disposed above;
a headrest disposed above the seat back frame;
a pressure receiving member connected to the seat back frame via a connecting member, the pressure receiving member being movable independently from the headrest;
a shock reducing member which is disposed at least on one side of the both-side side parts of the seat back frame and is connected to the connecting member and is rotatable around a rotating shaft independently from the headrest; and
an urging element(s) disposed by attaching end parts thereof to a mounting part formed in the shock reducing member and a mounting part formed in the seat back frame,
wherein
at least one of the mounting part formed in the shock reducing member and the mounting part formed in the seat back frame is formed integrally with the shock reducing member or integrally with the side part of the seat back frame; and
the urging element(s) is always located on the vehicle lower side of the rotating shaft of the shock reducing member during the time from before an operation to after an operation of the shock reducing member in response to a rear-end collision.

14. The vehicle seat according to claim 13, wherein:
the side part is mounted with a pipe member;
the side part has an enlarged part enlarged to a vehicle front of the pipe member; and
the shock reducing member and the urging element(s) are disposed in the enlarged part.

15. The vehicle seat according to claim 13, wherein:
the shock reducing member has a connecting part for connecting the connecting member; and
the mounting part of the urging element(s) formed in the shock reducing member is provided on a vehicle lower side of the connecting part.

16. A vehicle seat comprising:
a seat back frame comprising side parts located on both sides and an upper part disposed above;
a headrest disposed above the seat back frame;
a pressure receiving member connected to the seat back frame via a connecting member, the pressure receiving member being movable independently from the headrest;
a shock reducing member which is disposed at least on one side of the both-side side parts of the seat back frame and is connected to the connecting member and is rotatable around a rotating shaft independently from the headrest; and
an urging element(s) disposed by attaching end parts thereof to a mounting part formed in the shock reducing member and a mounting part formed in the seat back frame,
wherein
at least one of the mounting part formed in the shock reducing member and the mounting part formed in the seat back frame is formed integrally with the shock reducing member or integrally with the side part of the seat back frame; and
the urging element(s) is configured so that one end thereof is locked to a mounting part formed in the seat back frame, the other end thereof is locked to a mounting part formed in the shock reducing member, and a coil part consists of a torsion spring disposed at an outer periphery of the rotating shaft of the shock reducing member.

17. The vehicle seat according to claim 16, wherein:
the shock reducing member has a raised part raised in a seat inside direction; and
the torsion spring is disposed on a seat outside of an inner end of the raised part.

18. The vehicle seat according to claim 16, wherein the torsion spring is disposed between the side part and the shock reducing member.

19. A vehicle seat comprising:
a seat back frame comprising side parts located on both sides and an upper part disposed above;
a headrest disposed above the seat back frame;
a pressure receiving member connected to the seat back frame via a connecting member, the pressure receiving member being movable independently from the headrest;
a shock reducing member which is disposed at least on one side of the both-side side parts of the seat back frame and is connected to the connecting member and is rotatable around a rotating shaft independently from the headrest; and
an urging element(s) disposed by attaching end parts thereof to a mounting part formed in the shock reducing member and a mounting part formed in the seat back frame,
wherein:
the mounting part formed in the seat back frame is formed integrally with the side art of the seat back frame the side cart of the seat back frame extending above and below the end parts of the urging element; and
the mounting part formed in the seat back frame is bounded by a front and a rear vertical plane that pass through a frontmost tangent point and a rearmost tangent point respectively on an outer surface of the rotating shaft of the shock reducing member.

20. A vehicle seat comprising:
a seat back frame comprising side parts located on both sides and an upper part disposed above;
a headrest disposed above the seat back frame;
a pressure receiving member connected to the seat back frame via a connecting member, the pressure receiving member being movable independently from the headrest;
a shock reducing member which is disposed at least on one side of the both-side side parts of the seat back frame and is connected to the connecting member and is rotatable around a rotating shaft independently from the headrest; and
an urging element(s) disposed by attaching end parts thereof to a mounting part formed in the shock reducing member and a mounting part formed in the seat back frame,
wherein:
the mounting part formed in the seat back frame is formed integrally with the side art of the seat back frame the side cart of the seat back frame extending above and below the end parts of the urging element;
the shock reducing member is provided with a connecting member mounting portion for mounting the connecting member; and
the connecting member mounting portion is disposed in front of a vertical plane passing through an axis of the rotating shaft of the shock reducing member when the shock reducing member is in an initial position before rotating in response to a rear-end collision.

* * * * *

UNITED STATES PATENT AND TRADEMARK OFFICE
CERTIFICATE OF CORRECTION

PATENT NO. : 8,550,552 B2  
APPLICATION NO. : 12/691069  
DATED : October 8, 2013  
INVENTOR(S) : Kenichi Nitsuma Page 1 of 1

It is certified that error appears in the above-identified patent and that said Letters Patent is hereby corrected as shown below:

IN THE CLAIMS:

In Claim 19, Column 36, lines 15-16, replace "with the side art of the seat back frame the side cart of the seat back frame extending above and below" with -- with the side part of the seat back frame, the side part of the seat back frame extending above and below --

In Claim 20, Column 36, lines 42-43, replace "with the side art of the seat back frame the side cart of the seat back frame extending above and below" with -- with the side part of the seat back frame, the side part of the seat back frame extending above and below --

Signed and Sealed this  
Twentieth Day of May, 2014

Michelle K. Lee  
*Deputy Director of the United States Patent and Trademark Office*